(12) United States Patent
Otterson et al.

(10) Patent No.: US 8,910,951 B2
(45) Date of Patent: Dec. 16, 2014

(54) CASTER WHEEL ARRANGEMENTS

(75) Inventors: Daniel Leigh Otterson, Stacy, MN (US); Matthew Charles Burk, Forest Lake, MN (US); Daniel Edwin Maleitzke, Hugo, MN (US)

(73) Assignee: Smarte Carte, Inc., St. Paul, MN (US)

( * ) Notice: Subject to any disclaimer, the term of this patent is extended or adjusted under 35 U.S.C. 154(b) by 396 days.

(21) Appl. No.: 13/052,657

(22) Filed: Mar. 21, 2011

(65) Prior Publication Data

US 2012/0068423 A1 Mar. 22, 2012

Related U.S. Application Data

(60) Provisional application No. 61/315,970, filed on Mar. 21, 2010, provisional application No. 61/349,532, filed on May 28, 2010.

(51) Int. Cl.
*B60B 33/00* (2006.01)
*B62B 5/02* (2006.01)
*B62B 3/14* (2006.01)

(52) U.S. Cl.
CPC ............. *B60B 33/00* (2013.01); *B60Y 2200/86* (2013.01); *B62B 5/026* (2013.01); *B62B 3/1476* (2013.01); *B62B 5/02* (2013.01); *B60B 33/0028* (2013.01)
USPC .................................. 280/5.2; 16/18 B; 16/47

(58) Field of Classification Search
USPC ............ 16/18 B, 18 R, 19, 31 A, 47; 280/5.2, 280/5.28, 47.34, 43, 43.1; 180/8.1–8.3; 305/1
See application file for complete search history.

(56) References Cited

U.S. PATENT DOCUMENTS

| | | | | |
|---|---|---|---|---|
| 295,689 A * | 3/1884 | Thomas | ............................. | 16/19 |
| 350,636 A * | 10/1886 | Otis | ................................... | 16/47 |
| 937,043 A * | 10/1909 | Bilger | ............................. | 280/5.2 |
| 1,066,754 A * | 7/1913 | Rison | ............................. | 16/18 B |
| 1,712,485 A | 5/1929 | Tokita | | |
| 2,123,707 A | 7/1938 | Bloch | | |
| 2,197,273 A * | 4/1940 | Lindeman | ...................... | 280/771 |
| 2,575,846 A * | 11/1951 | Singer | .......................... | 280/5.24 |
| 2,612,379 A | 9/1952 | Vogel | | |
| 2,736,564 A | 2/1956 | Loam et al. | | |
| 2,810,925 A | 10/1957 | Meyerhoefer | | |
| 2,889,891 A * | 6/1959 | Gwinn | ........................ | 180/24.12 |
| 3,003,780 A * | 10/1961 | Lundahl | .......................... | 280/43 |
| 3,239,872 A | 3/1966 | Kitrell | | |
| 3,304,094 A * | 2/1967 | Wenger | .......................... | 280/5.2 |
| 3,724,022 A * | 4/1973 | Alberti et al. | ..................... | 16/45 |
| 4,230,046 A | 10/1980 | Smart | | |
| 4,467,496 A * | 8/1984 | Gregg | ............................. | 16/18 B |
| 4,534,433 A | 8/1985 | Burbank et al. | | |
| 4,566,550 A | 1/1986 | Misawa | | |
| 4,589,345 A * | 5/1986 | Fujita | .............................. | 105/170 |
| 5,273,296 A * | 12/1993 | Lepek | ............................. | 280/5.2 |
| 5,350,033 A * | 9/1994 | Kraft | ............................. | 180/167 |

(Continued)

*Primary Examiner* — Anne Marie Boehler
*Assistant Examiner* — Maurice Williams
(74) *Attorney, Agent, or Firm* — Merchant & Gould P.C.

(57) ABSTRACT

A caster wheel arrangement includes a base; a yoke rotatably mounted to the base via a kingpin; at least a first caster wheel rotatably mounted to the yoke; and an assist arrangement moveably mounted to the yoke. The assist arrangement facilitates travel of the caster wheel arrangement over a surface transition (e.g., a gap, a rise, etc.). Non-limiting example assist arrangements include a leading wheel, a leading variable radius wheel, a trailing wheel, a step member, and combinations thereof.

30 Claims, 49 Drawing Sheets

(56) References Cited

U.S. PATENT DOCUMENTS

| | | | |
|---|---|---|---|
| 5,815,885 A * | 10/1998 | Chen ................................ 16/47 |
| 5,833,249 A | 11/1998 | DeMartino |
| 5,964,473 A * | 10/1999 | Degonda et al. ........... 280/250.1 |
| 6,183,405 B1 * | 2/2001 | Schurig ........................... 492/45 |
| 6,386,552 B1 | 5/2002 | Bierma |
| 6,454,065 B1 | 9/2002 | Chen |
| 6,543,798 B2 * | 4/2003 | Schaffner et al. .......... 280/250.1 |
| 6,752,400 B2 | 6/2004 | Nakatsukasa et al. |
| 7,036,185 B2 | 5/2006 | Morndal et al. |
| 7,055,835 B2 * | 6/2006 | Wu ............................... 280/86.1 |
| 7,311,160 B2 * | 12/2007 | Lim ............................... 180/9.26 |
| 7,448,476 B2 | 11/2008 | Otterson |
| 7,677,345 B2 * | 3/2010 | Hosoda ........................ 180/218 |
| 7,837,201 B2 | 11/2010 | Cheng et al. |
| 7,857,108 B2 | 12/2010 | Amdahl et al. |
| 7,866,430 B2 | 1/2011 | Kakinuma et al. |
| 8,061,460 B2 * | 11/2011 | Scheck ........................... 180/8.1 |
| 8,186,463 B2 * | 5/2012 | Hunziker et al. ............ 180/65.1 |
| 2002/0074747 A1 * | 6/2002 | Heien ........................... 280/5.26 |
| 2003/0071427 A1 * | 4/2003 | Simione ..................... 280/47.34 |
| 2003/0122327 A1 | 7/2003 | Wu |
| 2005/0189732 A1 * | 9/2005 | Morndal et al. ................. 280/43 |
| 2006/0113733 A1 | 6/2006 | Kazaoka |
| 2006/0244249 A1 * | 11/2006 | Goertzen et al. .............. 280/755 |
| 2007/0056140 A1 | 3/2007 | Yamauchi |
| 2007/0220704 A1 * | 9/2007 | Willis ................................ 16/47 |
| 2009/0172915 A1 | 7/2009 | Hunziker |
| 2009/0194955 A1 * | 8/2009 | Kakinuma et al. ............. 280/5.2 |
| 2009/0212508 A1 * | 8/2009 | Kindberg et al. ............ 280/5.28 |
| 2010/0132156 A1 * | 6/2010 | Morris ............................... 16/19 |
| 2010/0251514 A1 | 10/2010 | Goldberg et al. |
| 2011/0023268 A1 * | 2/2011 | Smith ................................ 16/47 |
| 2011/0127732 A1 * | 6/2011 | Mann et al. .................... 280/5.2 |

* cited by examiner

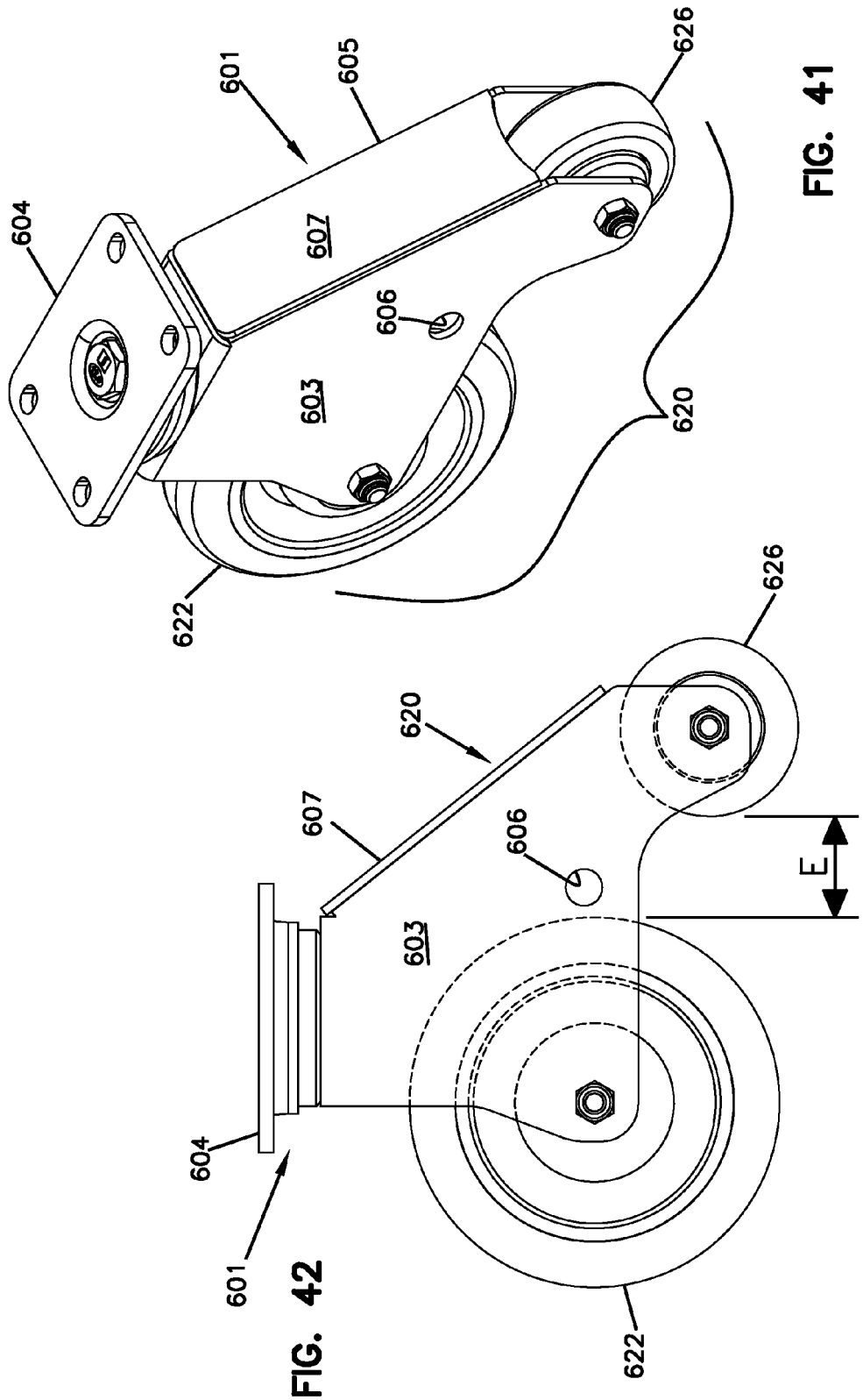

CASTER WHEEL ARRANGEMENTS

CROSS-REFERENCES TO RELATED APPLICATIONS

This application claims priority to U.S. Provisional Application Ser. No. 61/315,970, filed Mar. 21, 2010, and entitled "Caster Wheel Arrangements," and U.S. Provisional Application Ser. No. 61/349,532, filed May 28, 2010, and entitled "Caster Wheel Arrangements," the disclosures of which are hereby incorporated by reference herein.

BACKGROUND

FIG. 1 shows a wheel W transitioning a gap G and a rise R between a first surface S1 and a second surface S2. As the terms are used herein, a gap refers to a lateral spacing between surfaces and a rise refers to a height transition between surfaces. The wheel W has a wheel diameter D. When transitioning the gap G and the rise R between the surfaces S1 and S2, the wheel W sinks within the gap G, thereby increasing the vertical distance over which the wheel W must travel from the rise R to a distance R1.

Increasing the diameter D3 of the wheel W would aid in overcoming the gap G and the rise R. However, practical considerations limit the usefulness of the wheel W as the diameter D increases. For example, increasing the diameter D of the wheel W increases the amount of force necessary to push the wheel W forward. Further, increasing the diameter D of the wheel W also increases the turn radius and rotational inertia of the wheel W, thereby lessening maneuverability. Moreover, some wheel products may be designed to fit a particular wheel size or range of wheel sizes. Increasing the diameter of the wheel may require a redesign for the product.

One example environment in which a wheel may need to travel over such a surface transition is a train platform. A baggage cart, suitcase, or other wheeled object may need to travel between a platform and a train. Typically, a gap exists between the platform and the floor of the train. In different situations, the floor of the train may be lower than, flush with, or higher than the platform surface. Accordingly, one or more wheels will need to transition over the horizontal and/or vertical distance between the two surfaces.

For a user of a cart that has a caster wheel design with a dual wheel caster, a three inch gap transition on a floor surface—the maximum gap allowed by the ADA—can be a real challenge to traverse. The caster wheels may sink into the gap, especially if the cart is heavily loaded, thereby creating a rise that also needs to be traversed. When a dual wheel caster is presented to a surface having both a gap and a rise, the caster wheels may fall into the gap and the rise to be transitioned includes both the initial surface rise and the fallen distance.

Improvements are desired.

SUMMARY

The present disclosure relates to caster wheel arrangements including assist arrangements to aid in navigating transitions in terrain.

In accordance with some aspects of the disclosure, an example assist arrangement includes a leading wheel mounted forwardly of the main caster wheel(s). Generally, the leading wheel has a smaller diameter than the main caster wheel(s).

In accordance with some aspects of the disclosure, an example assist arrangement also includes a trailing wheel mounted rearwardly of the main caster wheel(s). Generally, the trailing wheel has a smaller diameter than the main caster wheel(s).

BRIEF DESCRIPTION OF THE DRAWINGS

FIG. 41 is a rear, top perspective view of the fifth example assist arrangement coupled to the support frame of FIG. 38;

FIG. 42 is a side elevational view of the fifth example assist arrangement and support frame of FIG. 41;

DETAILED DESCRIPTION

Caster wheel arrangements configured in accordance with the principles contained herein are suitable for mounting to a cart, stroller, wagon, or other transportation equipment to facilitate movement of the transportation equipment. For example, implementations of the caster wheel arrangements can enable movement of transportation equipment over a surface having a gap, rise, drop, or other obstacle in the path of the transportation equipment.

A caster wheel arrangement includes a support frame to which at least one primary wheel is rotatably mounted. In some implementations, the caster wheel arrangement includes two primary wheels mounted to the support frame about one or more axles. For example, the two wheels can be mounted in parallel and are configured to rotate about a common rotation axis. The support frame is configured to mount to the transportation equipment.

An assist arrangement can be mounted to the caster wheel arrangement to facilitate movement over a surface transition (e.g., a gap, a rise, a drop, etc.). For example, the assist arrangement may reduce the amount of force necessary to overcome a transition in a surface over which the caster wheel arrangement is rolling. In some implementations, the assist arrangement is mounted to the support frame of the caster wheel arrangement.

In some implementations, the support frame includes a yoke that is moveably coupled to a base so that the yoke can spin relative to the base about a spin axis. In general, the spin axis is vertical or substantially vertical. The base is configured to mount to the transportation equipment. For example, the base can include a flat surface that can be fastened (e.g., screwed, bolted, riveted, welded, or otherwise attached) to the transportation equipment. At least the primary wheels are mounted to the yoke. In certain implementations, the assist arrangement also may be mounted to the yoke.

Figure 3:
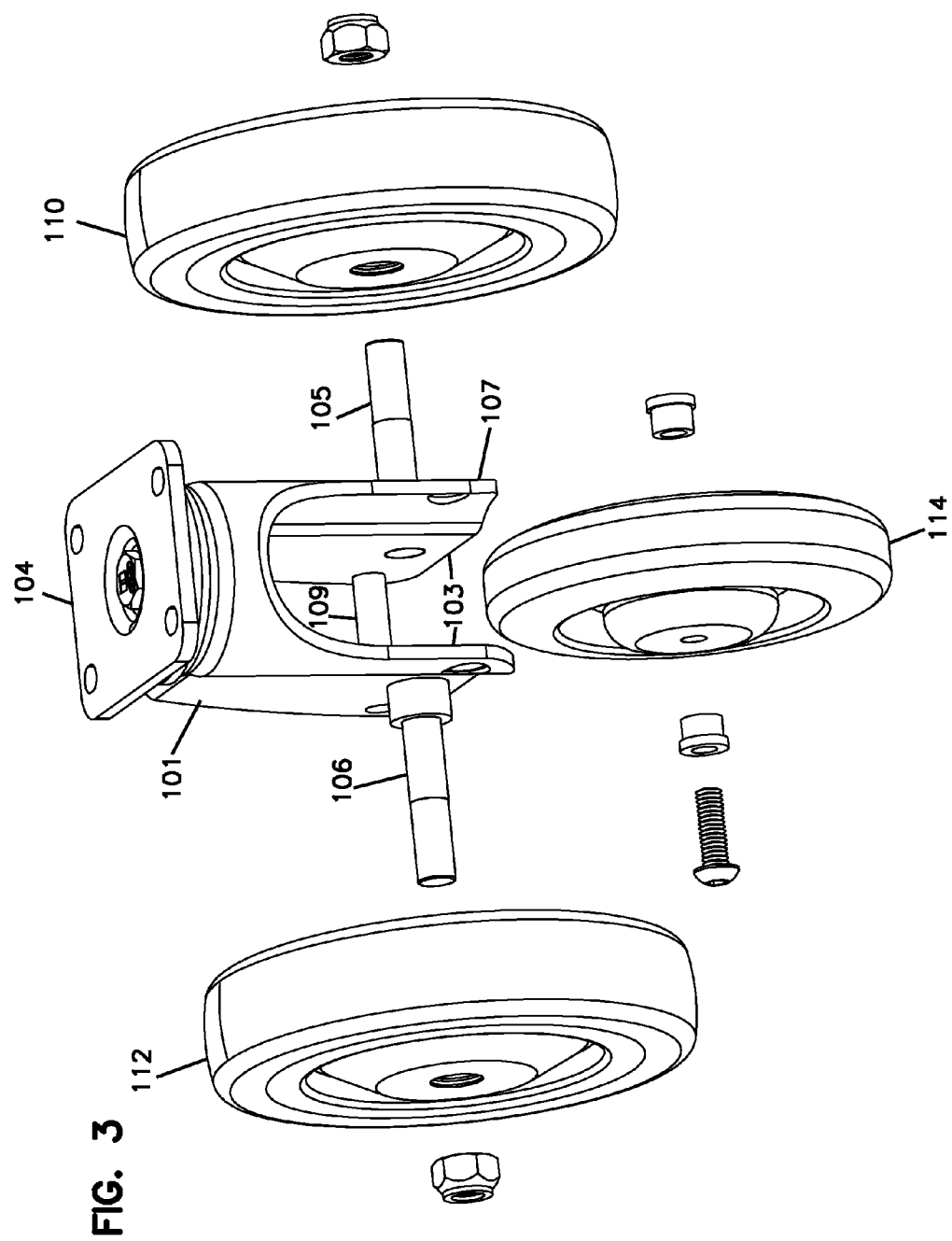
FIG. 3 is an exploded, perspective view of the caster wheel arrangement of FIG. 2 in which the various parts are visible.
Figure 4:
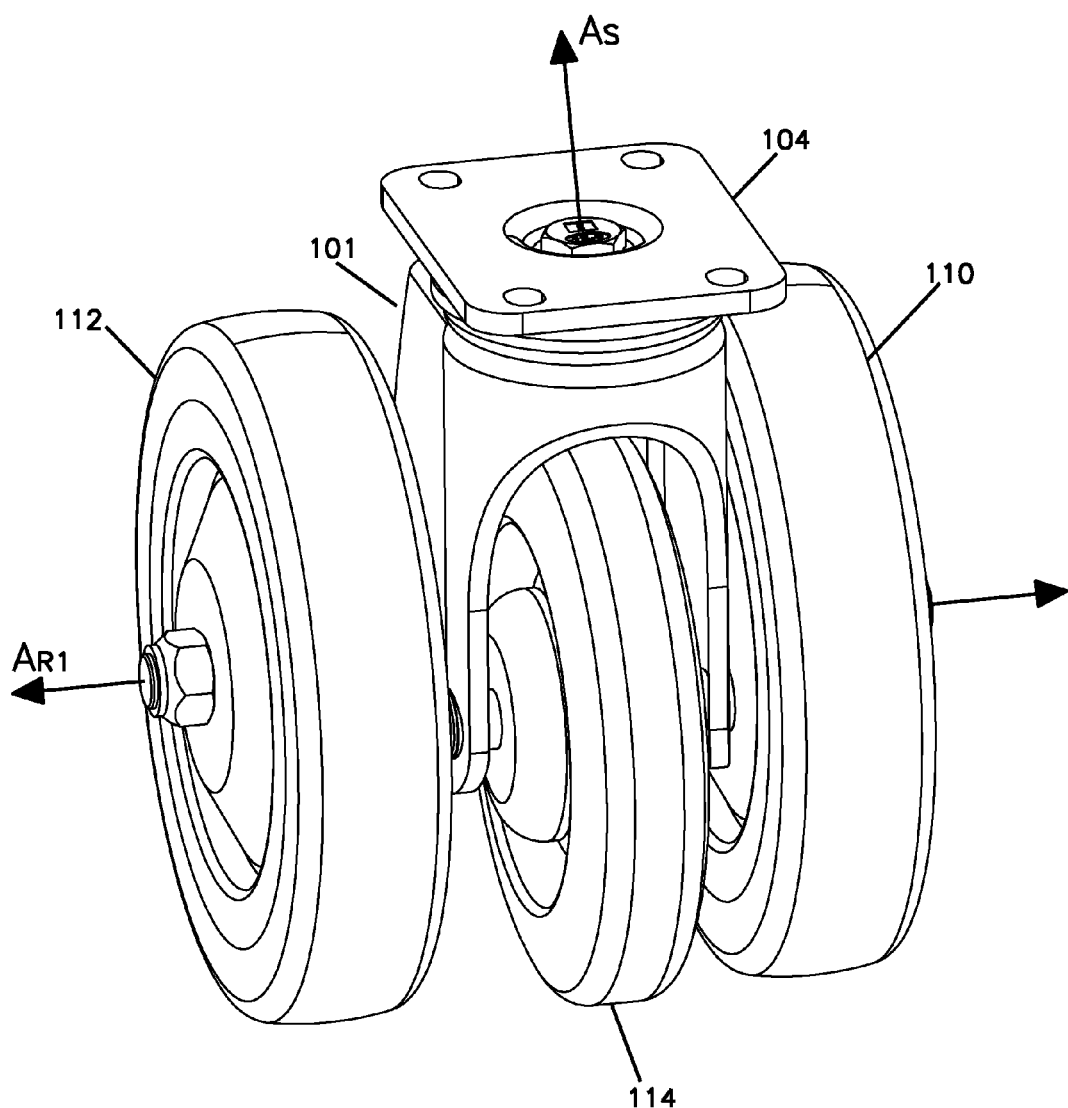
FIG. 4 is a front, top perspective view of the caster wheel arrangement of FIG. 2.

FIGS. 2-7 illustrate an example caster wheel arrangement 100 including a first example assist arrangement 120 configured in accordance with the principles of the disclosure. The first caster wheel arrangement 100 includes a support frame, which includes a yoke 101 that is mounted to a base 104 via a kingpin 102 so as to enable the yoke 101 to spin about the kingpin 102 relative to the base 104. One example spin axis $A_S$ about which the yoke 101 spins is shown in FIG. 4. In the example shown, the yoke 101 defines two legs 103 that extend away from the base 104. A peg 109 extends between the two legs 103 at a rear side of the yoke 101 (e.g., see FIGS. 3 and 6).

A first wheel 110 and a second wheel 112 are mounted to one or more axles attached to the yoke 101 (see FIG. 3). The wheels 110, 112 rotate about a first rotation axis $A_{R1}$ (FIG. 4). In some implementations, a first axle 105 is coupled to a first of the legs 103 and a second axle 106 is coupled to a second of the legs 103. In the example shown, each axle 105, 106 is a cantilever axle that extends outwardly from the respective leg 103. In another example implementation, a single rod can extend through the legs 103 of the yoke 101 to define the first and second axles 105, 106. In other implementations, the first and second wheels 110, 112 are otherwise mounted to rotate about a common axis $A_{R1}$. In some implementations, the kingpin 102 and/or the axles 105, 106 include ball bearings to aid in rotation.

In accordance with some aspects, suitable example caster wheels 110, 112 have a diameter $D_1$ (FIG. 5) ranging between about one inch and about eight inches. In accordance with certain aspects, suitable example caster wheels 110, 112 have a diameter $D_1$ ranging from about four inches to about seven inches. In one example implementation, suitable example caster wheels 110, 112 have a diameter $D_1$ of about five inches. In another example implementation, suitable example caster wheels 110, 112 have a diameter $D_1$ of about six inches.

The first caster wheel arrangement 100 also includes a first example assist arrangement 120 to facilitate navigating surface transitions. The first example assist arrangement 120 includes a third wheel 114 that is mounted to the yoke 101. In the example shown, the third wheel 114 is positioned between the first and second wheels 110, 112. For example, the third wheel 114 can be mounted between the legs 103 of the yoke 101 at a forward portion 107 of the yoke 101. In the example shown, attachment members 115 mount within openings 108 defined in the forward portion 107 of the yoke (see FIG. 3). One or more fasteners 116 couple a hub 117 of the third wheel 114 to the attachment members 115.

Figure 5:
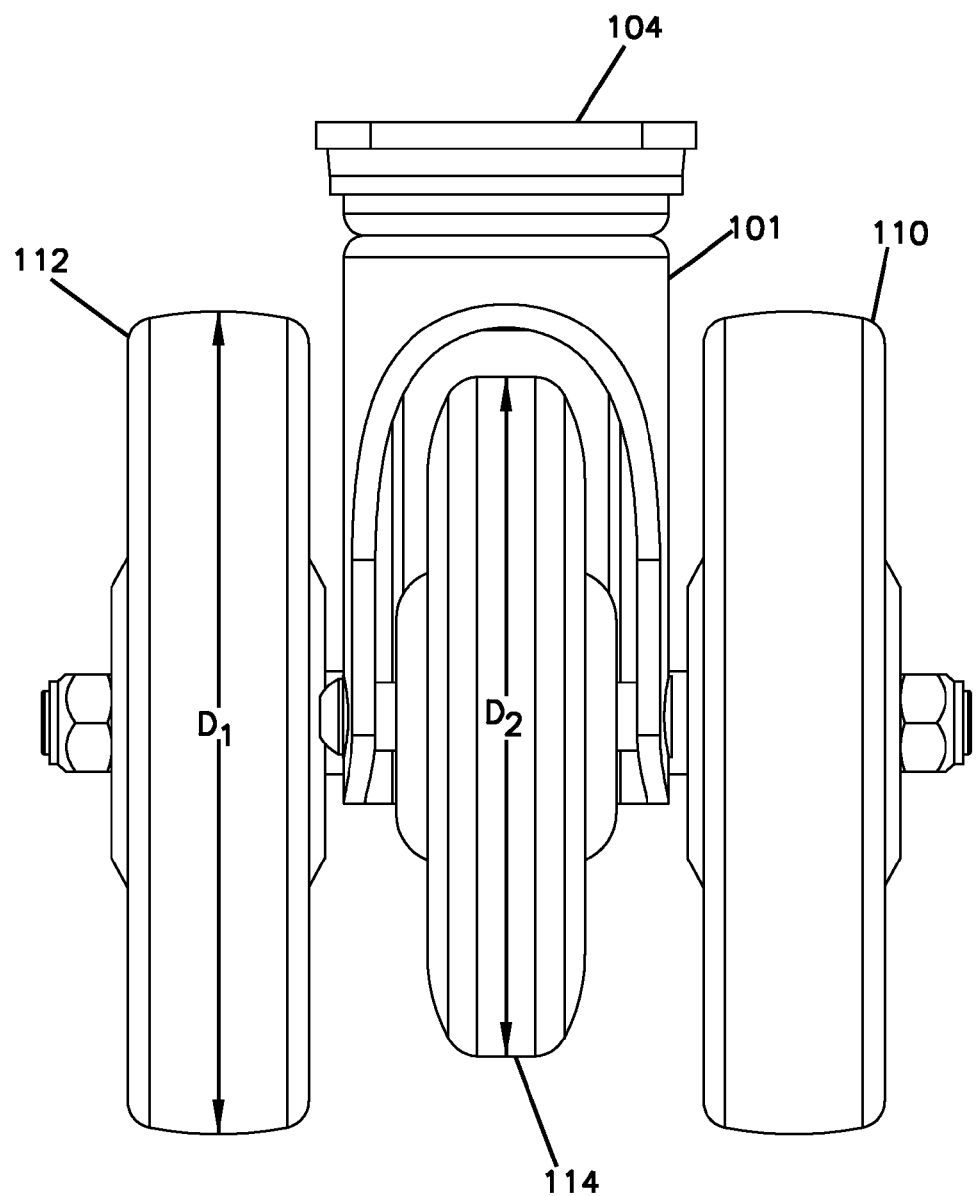
FIG. 5 is a front elevational view of the caster wheel arrangement of FIG. 2.
Figure 6:
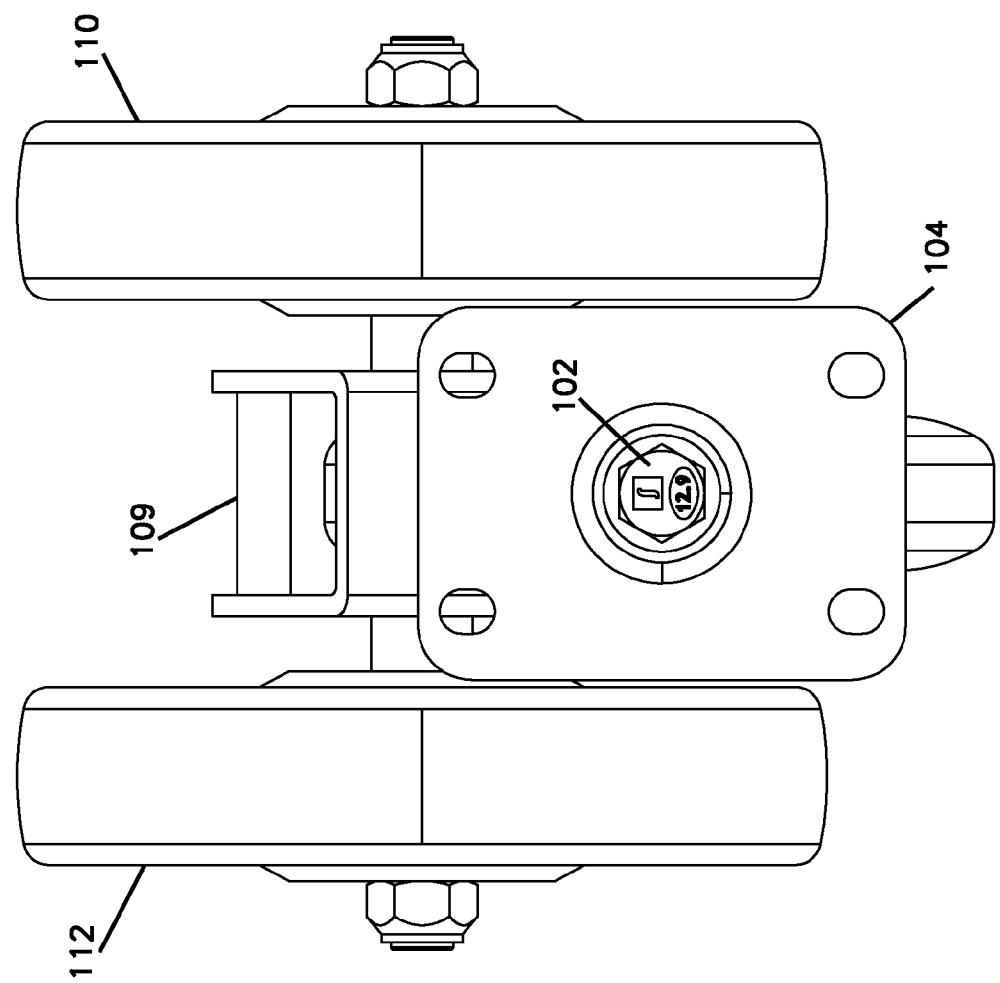
FIG. 6 is a plan view of the caster wheel arrangement of FIG. 2.

In some implementations, the third wheel 114 has a different diameter $D_2$ from a diameter $D_1$ of the first and second wheels 110, 112 (e.g., see FIG. 5). Typically, the diameter $D_2$ of the third wheel 114 is smaller than the diameter $D_1$ of the first and second wheels 110, 112. In some implementations, the diameter $D_2$ of the leading wheel 114 is selected based on the size of the yoke 101 and the expected surface transition dimensions as will be discussed in more detail below. In one example implementation, the diameter $D_1$ of the first and second wheels 110, 112 is about six inches and the diameter $D_2$ of the third wheel 114 is about five inches.

Figure 7:
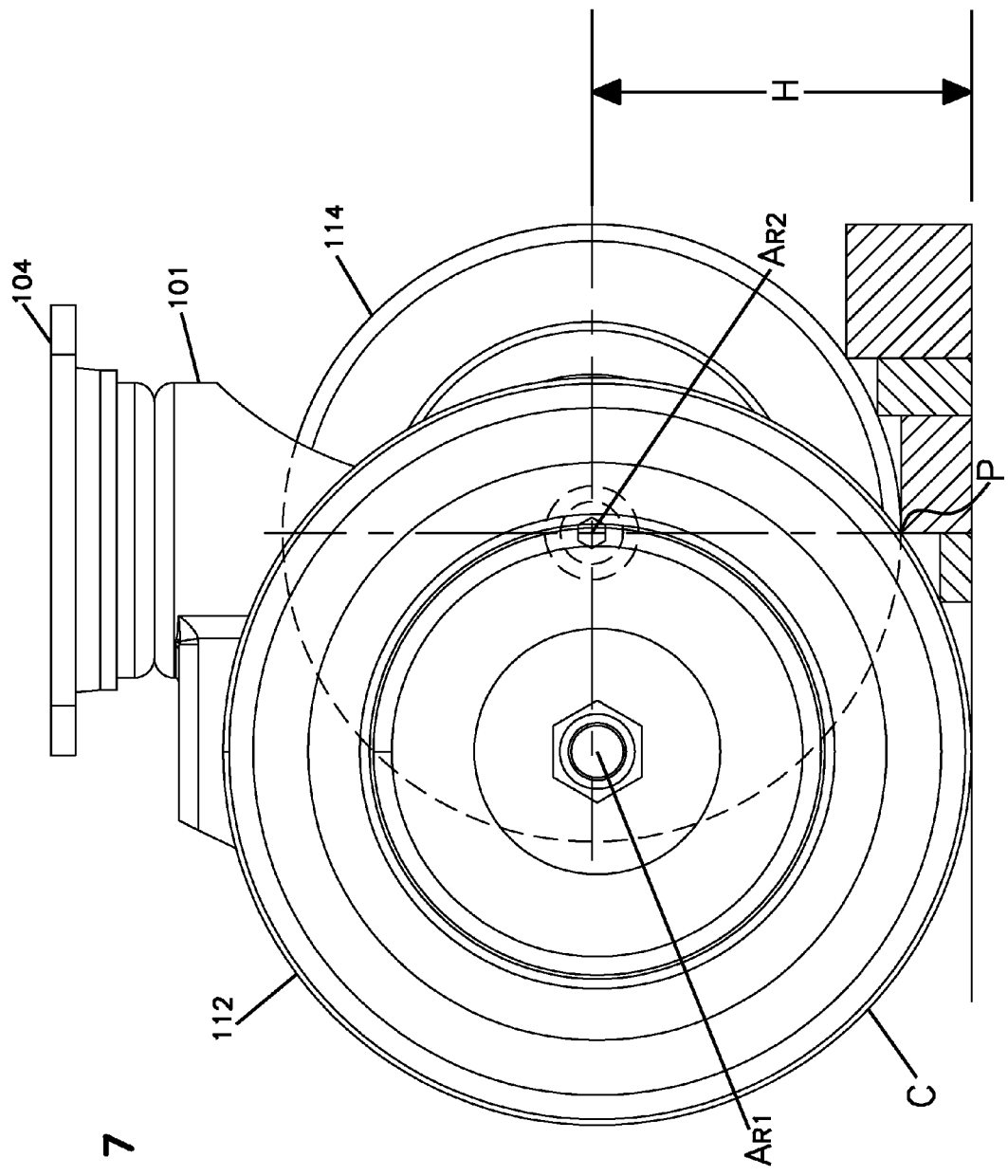
FIG. 7 is a side elevational view of the caster wheel arrangement of FIG. 2 in which a portion of the leading wheel is visible through the second wheel, the leading wheel traveling over a surface transition in accordance with the principles of the present disclosure.

The third wheel 114 rotates about a second rotation axis $A_{R2}$ (see FIG. 7). The second rotation axis $A_{R2}$ extends generally parallel to, but displaced from, the first rotation axis $A_{R1}$ of the first and second wheels 110, 112 (see FIG. 7). In different implementations, the second rotation axis $A_{R2}$ can be displaced horizontally and/or vertically from the first rotation axis $A_{R1}$. In some implementations, the position of the third wheel 114 relative to the primary wheels 110, 112 is selected so as to minimize the resistive force of the caster wheel arrangement 100 as the caster wheel arrangement 100 navigates the expected surface transition dimensions as will be discussed in more detail below.

Figure 1:
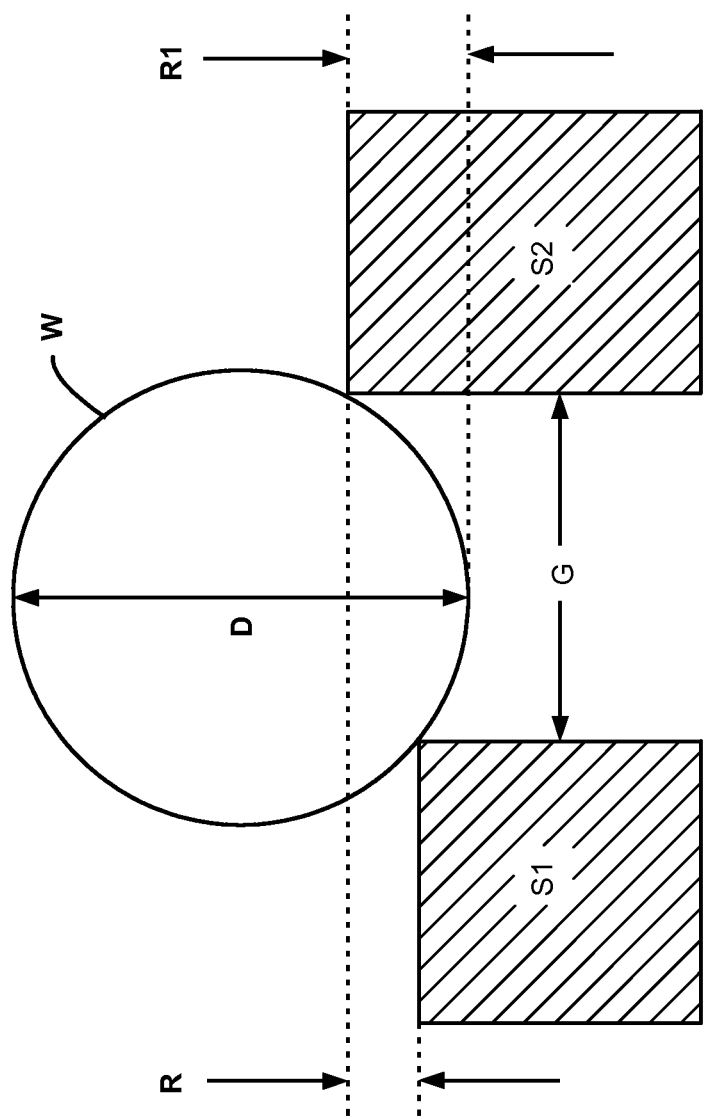
FIG. 1 is a schematic diagram showing a wheel traveling over a gap with a rise.
Figure 2:
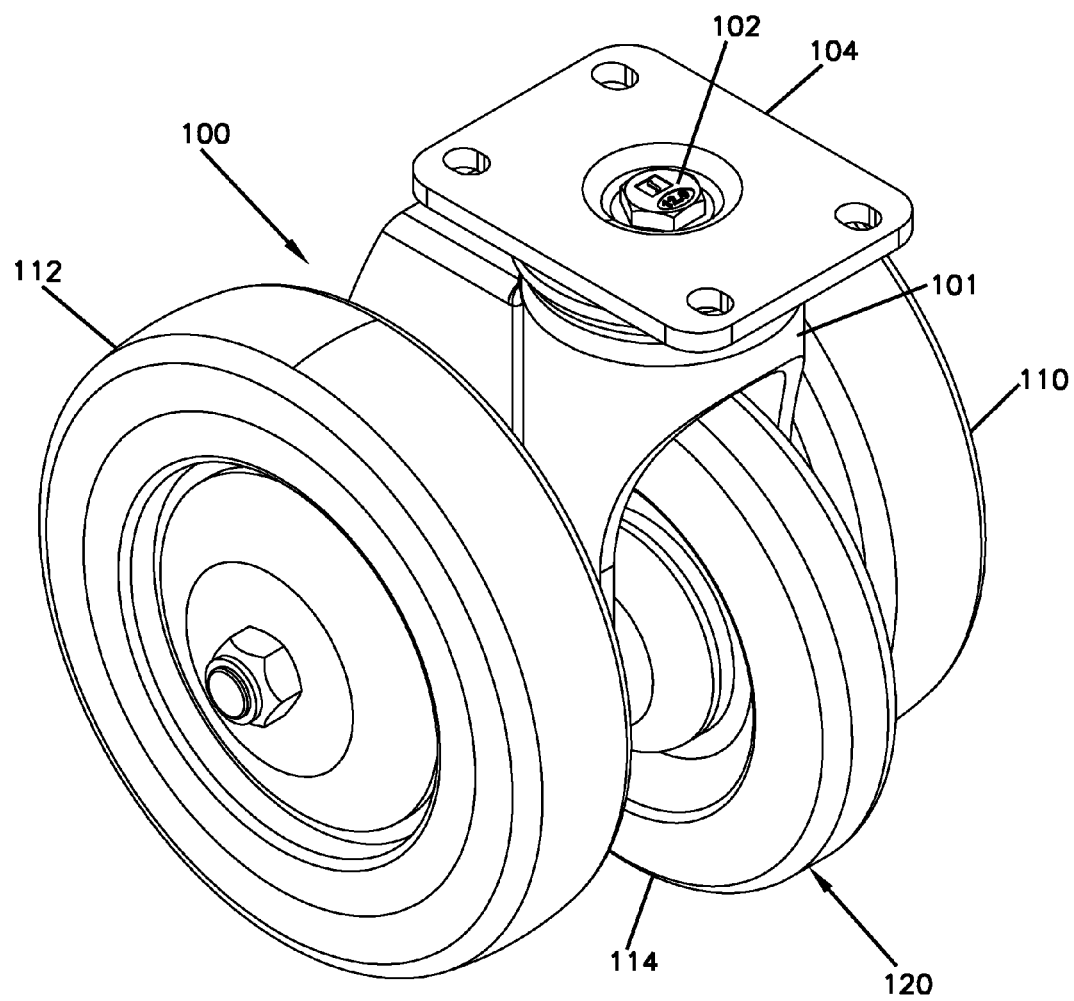
FIG. 2 is a front, top perspective view of an example caster wheel arrangement including a first example assist arrangement configured in accordance with the principles of the present disclosure.
Figure 8:
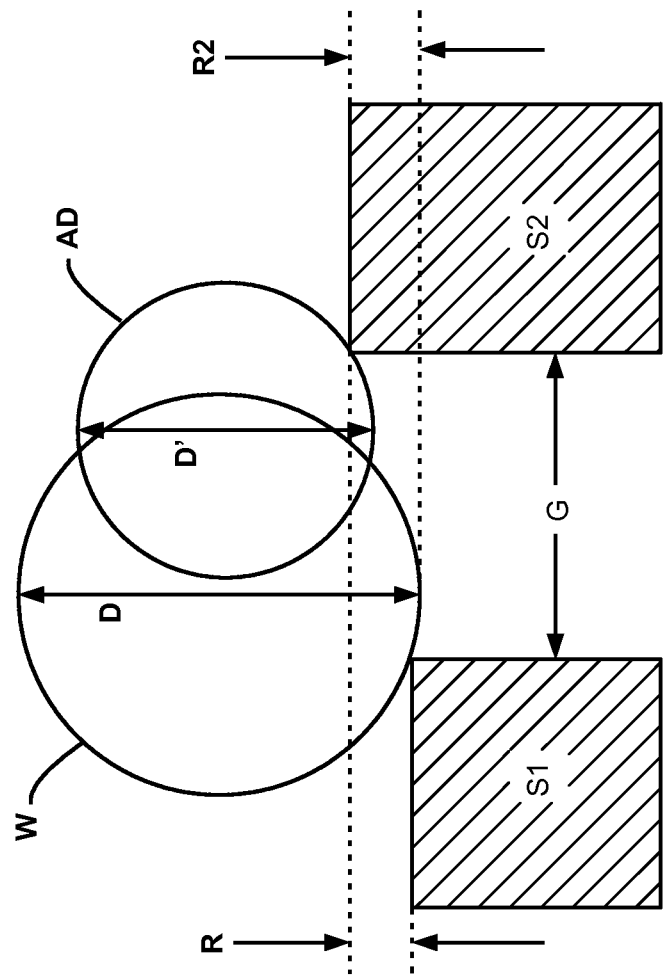
FIG. 8 is a schematic diagram showing a wheel having an assist arrangement traveling over the gap and rise of FIG. 1.

FIG. 8 shows an advantage of adding a wheel assist arrangement to a wheel arrangement (e.g., a single caster wheel arrangement, a dual caster wheel arrangement, a triple caster wheel arrangement, etc.) when the wheel arrangement is transitioning the gap G between a first surface S1 and a second surface S2. FIG. 8 is a schematic diagram showing a wheel assist arrangement AD cooperating with the wheel W of FIG. 1 to transition the gap G and the rise R between the first and second surfaces S1, S2.

In accordance with some aspects, an example gap G in a suitable environment can range between one (1) inch and five (5) inches. In accordance with some aspects, the example gap G in a suitable environment can range between two (2) inches and four (4) inches. For example, in accordance with an example implementation, the gap G in a suitable environment can range between two and one-half (2.5) inches and three and one-half (3.5) inches. In accordance with another example implementation, the gap G in a suitable environment can range between two and three-quarter (2¾) inches and (3) three inches.

In accordance with some aspects, an example rise R in a suitable environment can range between zero inches (i.e., flush) and six inches. For example, in accordance with some aspects, an example rise R in a suitable environment can range between flush and four inches. In accordance with an example implementation, the rise R in a suitable environment can range between zero and two inches. In accordance with another example implementation, the rise R in a suitable environment can range between zero and one inches.

In FIG. 8, the wheel assist arrangement AD has a diameter D' that is typically smaller than the diameter D of the primary wheel W. The wheel assist arrangement AD is mounted at a raised, forward position relative to the primary wheel W. When the wheel arrangement begins to transition the gap G and the rise R, the wheel assist arrangement AD hits the second surface S2 and inhibits the primary wheel W from falling into the gap G. Accordingly, the wheel assist arrangement AD inhibits an increase in the vertical distance the primary wheel W needs to travel to transition the rise R (i.e., R2 of FIG. 8 is less than R1 of FIG. 1).

Figure 9:
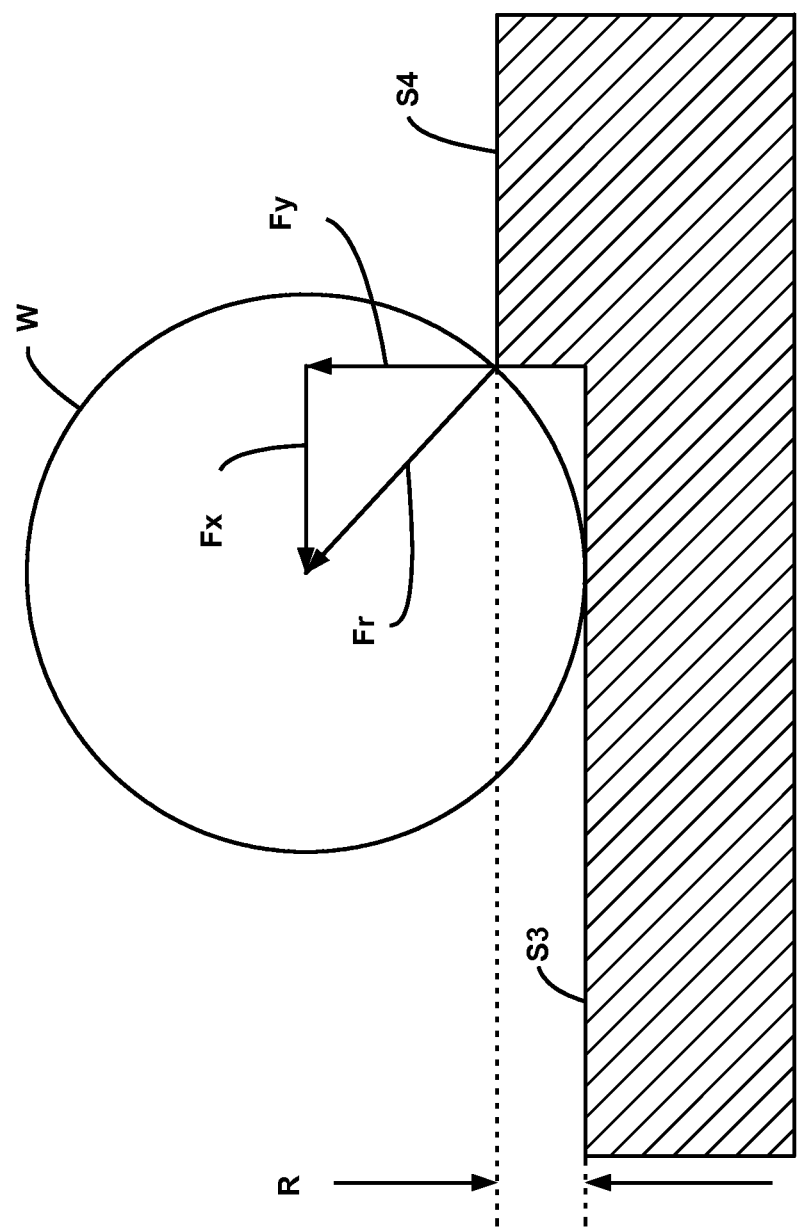
FIG. 9 is a schematic diagram showing the resistive forces generated when a wheel begins to travel over a surface transition.
Figure 10:
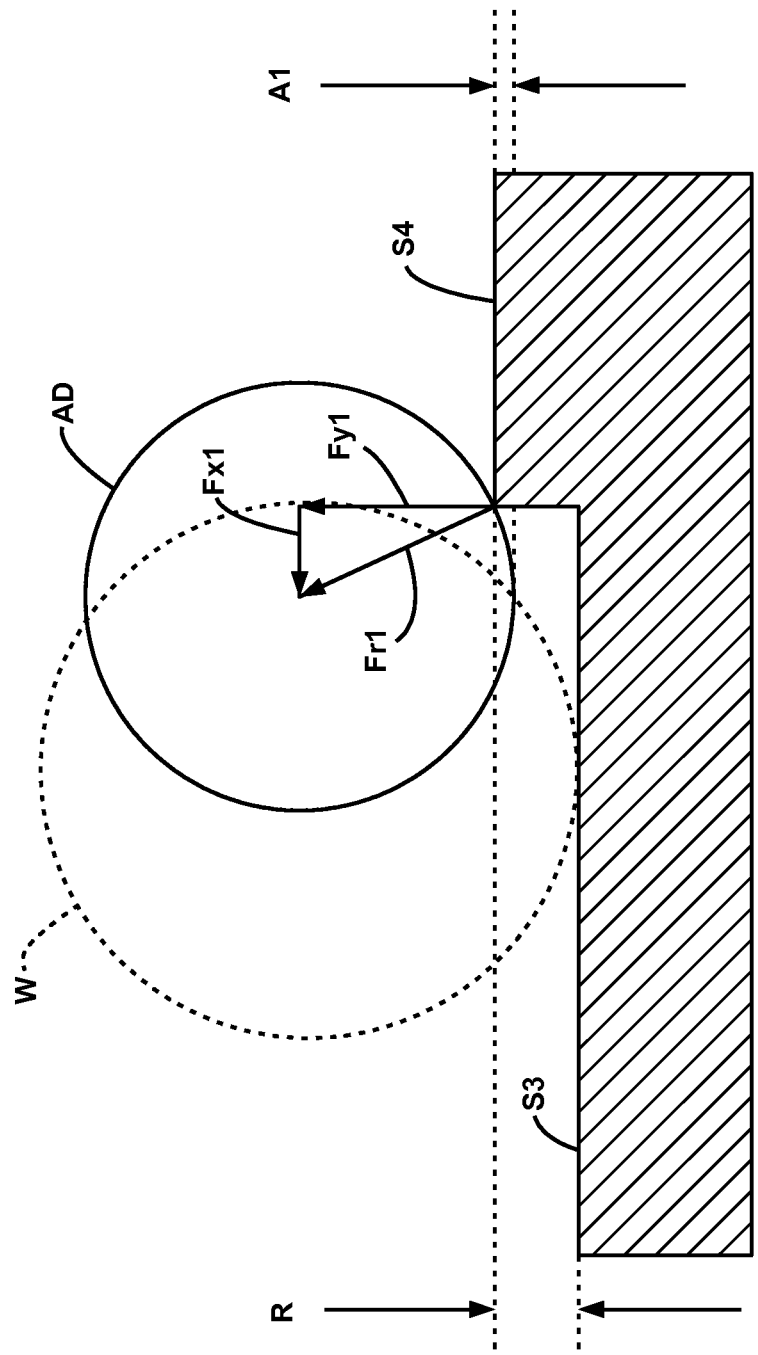
FIGS. 10 and 11 are schematic diagrams showing the resistive forces generated when a wheel arrangement including an assist arrangement travels over a surface transition in accordance with the principles of the present disclosure.
Figure 11:
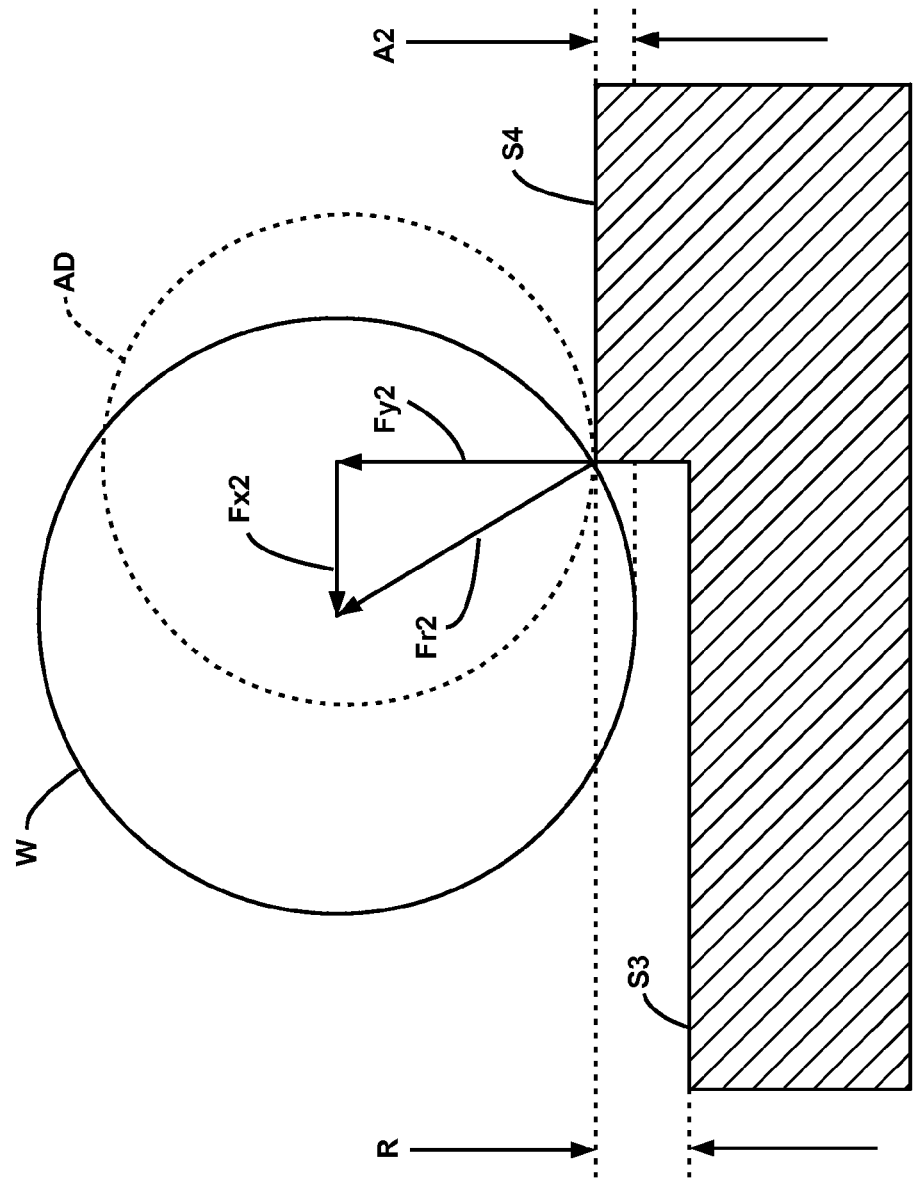

FIGS. 9-11 are schematic diagrams showing how the resistive force is determined for a wheel arrangement attempting to travel over a height transition R between a first surface S3 and a second surface S4. FIG. 9 shows a wheel W navigating over a rise R from the first surface S3 to the second surface S4. When the wheel W contacts the step between the surfaces S3 and S4, the wheel W experiences a resistive force Fr having a horizontal vector component Fx and a vertical vector component Fy. When the wheel W is a caster wheel on a baggage cart or other such transportation equipment, then the horizontal force component Fx determines the amount of force that a user must apply to the transportation equipment to move the wheel W over the step.

FIGS. 10 and 11 show how to calculate the resistive force for a wheel arrangement W including an assist arrangement AD. In FIG. 10, the wheel assist arrangement AD contacts the step between surface S3 and surface S4. However, since the wheel assist arrangement AD is raised above the surface S3, less force is required to transition the wheel assist arrangement AD onto the second surface S4. The horizontal vector component Fx1 of the wheel assist arrangement AD is smaller than the horizontal vector component Fx of the wheel W of FIG. 9. In FIG. 11, the wheel W reaches the step. However, since the wheel assist arrangement AD has already transitioned the step, the wheel assist arrangement AD raises the wheel W off the surface S3. Accordingly, the force required to push the wheel W over the step is less than it was without the assist arrangement AD (i.e., the horizontal force component Fx2 is smaller than the horizontal force component Fx (see FIG. 9).

Figure 12:
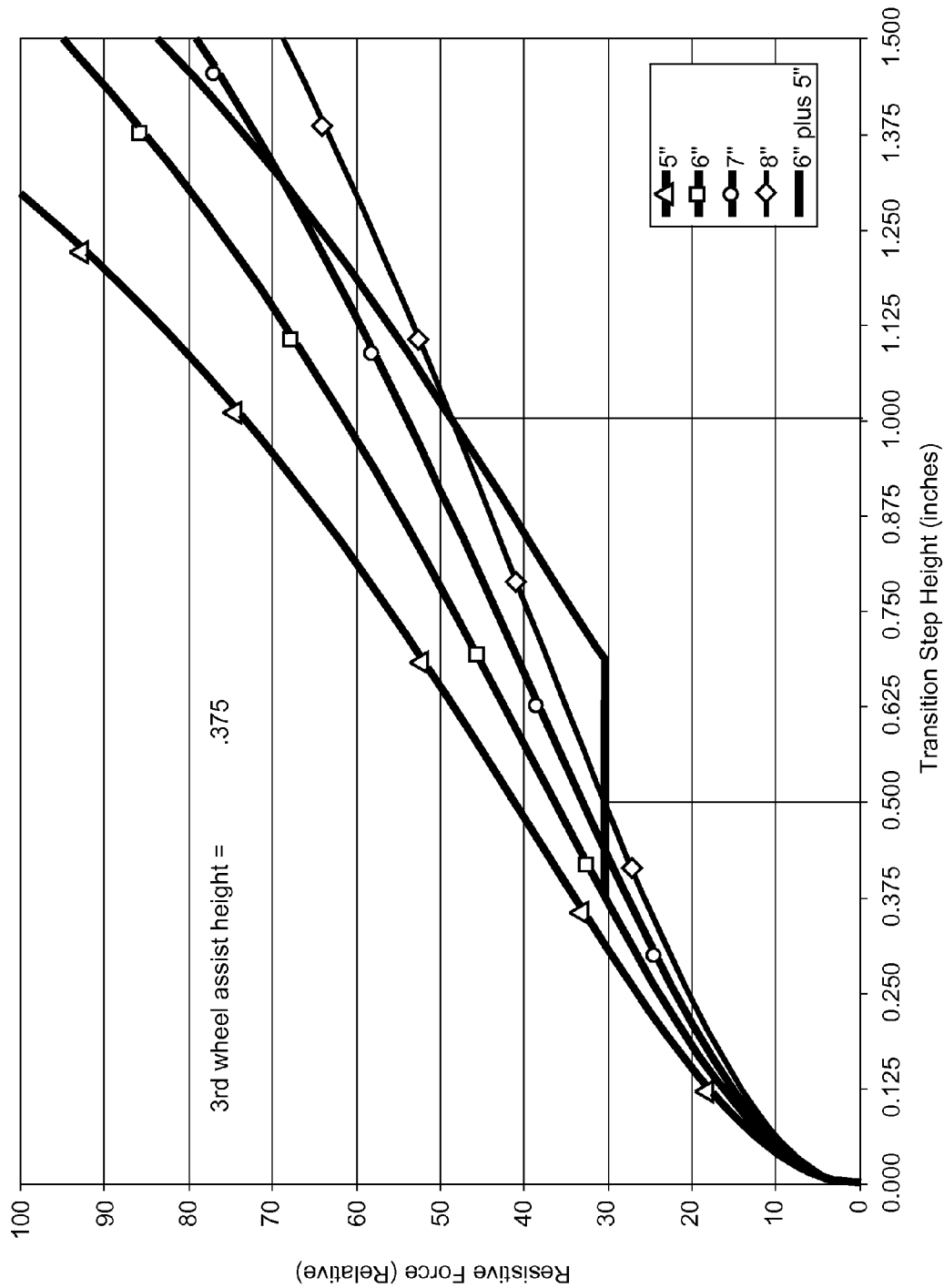
FIG. 12 is a graph mapping the relative resistive force necessary to push a wheel arrangement over a transition height for different wheel sizes.

FIG. 12 shows a graph mapping the relative resistive force necessary to push a wheel arrangement over a transition height for different wheel sizes. A first curve (indicated by a red line with triangles) plots the resistive force required for a five inch diameter caster wheel to transition a range of heights between 0 inches and 1.5 inches. Second, third, and fourth curves (which are indicated by a purple line with squares, a yellow line with circles, and a black line with diamonds) plot the resistive force required for a six inch diameter caster wheel, a seven inch diameter caster wheel, and an eight inch diameter caster wheel, respectively. The triangles, squares, circles, and diamonds do not indicate specific graph points, but rather aid in distinguishing the lines.

A fifth line (indicated by a solid purple line) plots the force required to transition a six inch diameter caster wheel having a five inch diameter leading wheel positioned ⅜th of an inch above the bottom of the caster wheel. The fifth line shows the maximum force that the caster and wheel assist arrangement see as a "system." The resistive force acting on the fifth caster wheel system is defined as the greater of two forces: (1) the resistive force necessary for the wheel assist arrangement to overcome the full transition height, less the amount the wheel assist arrangement is raised off the first surface height (see Fx1 of FIG. 10); and (2) the resistive force necessary for the primary wheel to overcome the raised height (see Fx2 of FIG. 11).

For transition heights that are sufficiently small so that the wheel assist does not interact with the second surface before the primary wheel begins transitioning the height, the fifth caster wheel arrangement behaves the same as the second caster wheel arrangement (i.e., the six inch diameter wheel without the wheel assist). The resistive force levels off at the point where the assist arrangement interacts with the surface step before the primary wheel. Because the primary wheel is a fixed distance away from the leading wheel assist arrangement, the resistive force necessary for the primary wheel to overcome the raised height remains constant for a certain range of transition heights (e.g., see FIG. 11). The resistive force for the fifth caster wheel arrangement begins climbing again when the force necessary to transition the assist arrangement (see FIG. 10) exceeds the constant force necessary to transition the primary wheels.

Increasing the diameter D' of the wheel assist arrangement AD will further aid in overcoming the gap and the rise. However, practical considerations limit the usefulness of the wheel assist arrangement AD as the diameter D' approaches the diameter D of the primary wheels W. For example, if the diameter D' of the wheel assist arrangement AD is enlarged sufficiently so that the wheel assist arrangement AD contacts the same surface as the primary wheels W, then the wheel assist arrangement AD will increase the amount of force necessary to push the wheel arrangement forward (e.g., more mass, more friction, etc.). Such a wheel assist arrangement AD also would increase the turn radius and rotational inertia of the wheel arrangement, thereby lessening maneuverability.

Referring back to FIG. 7, the diameter $D_2$ and position of the first wheel assist arrangement 100 is selected to minimize the horizontal component of the resistive force generated when the wheel arrangement transitions over a height. In accordance with certain aspects, the diameter $D_2$ of the third wheel 114 is selected based on the dimensions of the yoke 101. For example, in one implementation, the diameter $D_2$ of the third wheel 114 can be selected to be the largest diameter that will fit within an existing yoke 101. In another implementation, the diameter $D_2$ of the third wheel 114 can be selected to be the largest diameter that will fit within the yoke 101 without contacting the ground when the wheel arrangement 100 is positioned on a generally flat surface.

In accordance with certain aspects, the third wheel 114 is positioned so that the second rotation axis $A_{R2}$ is located a distance H off the ground (FIG. 7). The distance H is selected to minimize the horizontal resistive force over a desired range of height transitions, while considering that a gap in the ground surface adds to the height transition. For example, in one implementation, the third wheel 114 is positioned at a sufficient distance H so that the second rotation axis $A_{R2}$ is located farther above the ground than the first rotation axis $A_{R1}$ of the primary wheels 110, 112. In other implementations, the third wheel 114 is positioned even higher off the ground.

In accordance with some aspects, the third wheel 114 is positioned so that the second rotation axis $A_{R2}$ is located forwardly of the first rotation axis $A_{R1}$ of the primary wheels 110, 112. In one example implementation, the third wheel 114 is positioned far enough forward of the primary wheels 110, 112 so that a point P on the lower quadrant of the wheel 114 intersects the circumference C of the primary wheels 110, 112 when viewed from a side elevational view (e.g., see FIG. 7). In other implementations, the third wheel 114 is positioned even further forward relative to the primary wheels 110, 112.

Figure 15:
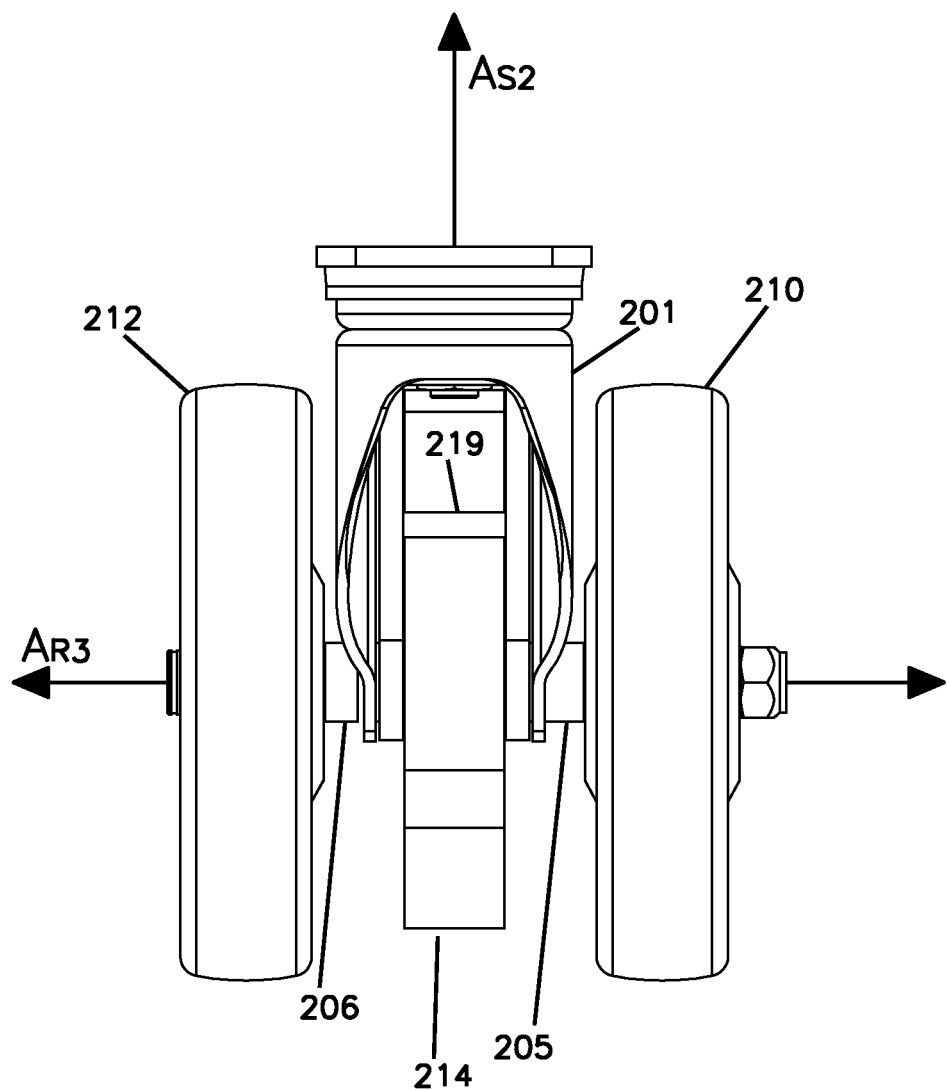
Figure 16:
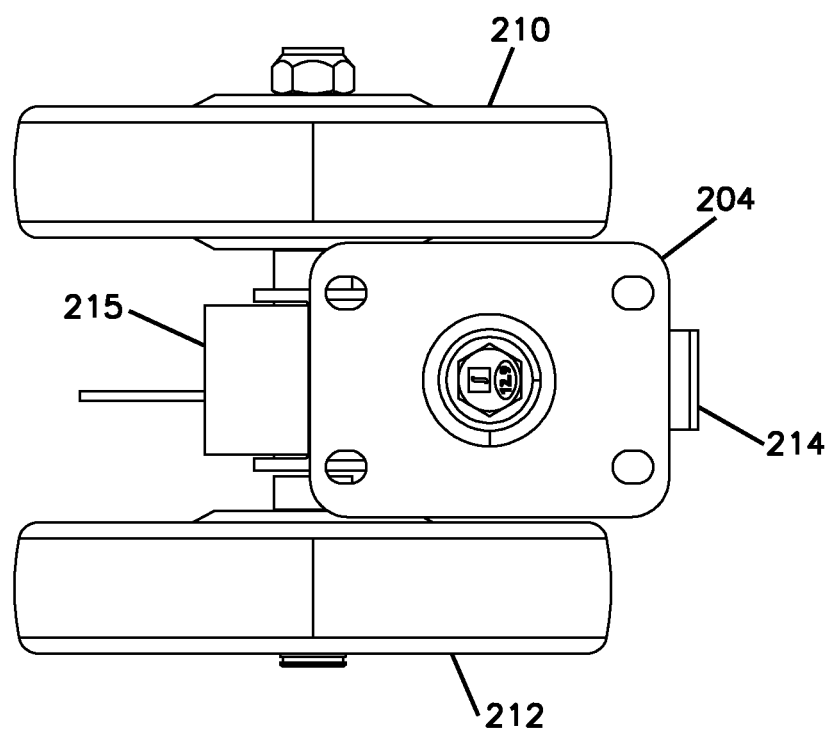

FIGS. 13-17 illustrate another example caster wheel arrangement 200 including a second example assist arrangement 220 configured in accordance with the principles of the disclosure. The second caster wheel arrangement 200 includes yoke 201 rotatably mounted to a base 204 via a kingpin 202 (see FIG. 13). The yoke 201 is configured to rotate about a spin axis $A_{S2}$ (FIG. 15). First and second wheels 210, 212 are rotatably mounted to the yoke 201 via one or more axles 205, 206 (FIG. 15). In some implementations, the kingpin 202 and/or the axles 205, 206 include ball bearings to aid in rotation (see FIG. 17).

The second caster wheel arrangement 200 also includes a second assist arrangement 220 to facilitate overcoming surface transitions. The second assist arrangement 220 includes a step member 214 that is coupled to the yoke 201 so as to enable movement of the step member 214 relative to the yoke 201. In the example shown, the step member 214 can pivot relative to the yoke 201. In other implementations, the step member 214 can slide or otherwise move relative to the yoke 201.

In the example shown, the step member 214 is pivotally mounted to a housing 215, which is mounted to the yoke 201. For example, the housing 215 can be mounted between legs 203 of the yoke 201. In the example shown, the kingpin 202 and the axles 205, 206 mount to the housing 215 through the yoke 201 (see FIG. 13). The housing 215 defines a channel 216 within which the step member 214 can mount. In one implementation, the housing 215 is generally U-shaped. In some implementations, each side of the housing 215 defines a lower shoulder 217 at which the axles 205, 206 can mount and an upper shoulder 218.

The step member 214 mounts to the housing 215 at a pivot point 223. In the example shown, the pivot point 223 is located adjacent to the upper shoulders 218 within the channel 216 of the housing 215. A spring member 225 also mounts within the channel 216 of the housing 215. The spring member 225 is configured to bias the step member 214 forwardly relative to the housing 215. The spring member 225 biases the step member 214 sufficiently forward so that a portion of the step member 214 extends outwardly from the housing 215 and the yoke 201.

Figure 13:
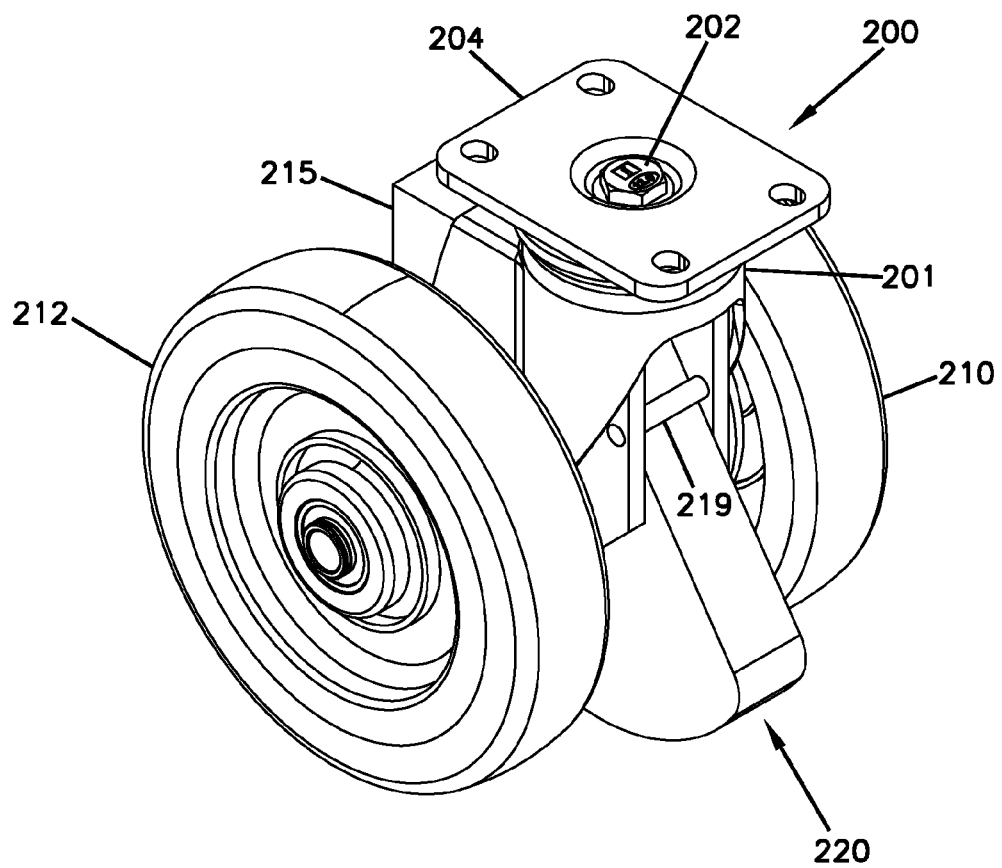
FIGS. 13-17 illustrate a second example caster wheel arrangement including a second example assist arrangement having a variable radius in accordance with the principles of the present disclosure.
Figure 14:
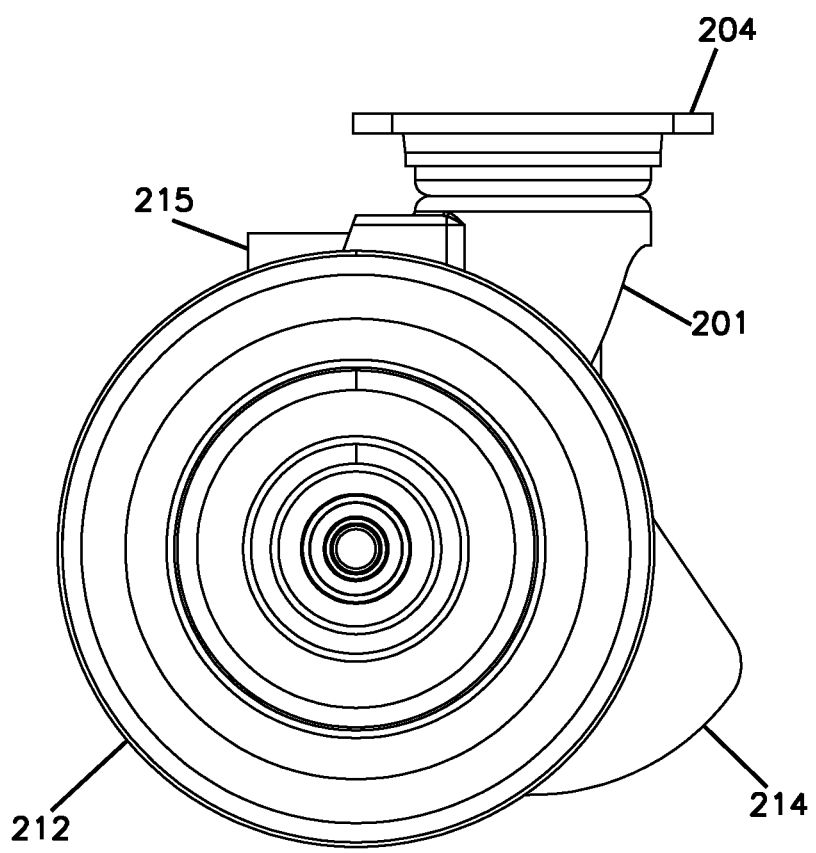
Figure 17:
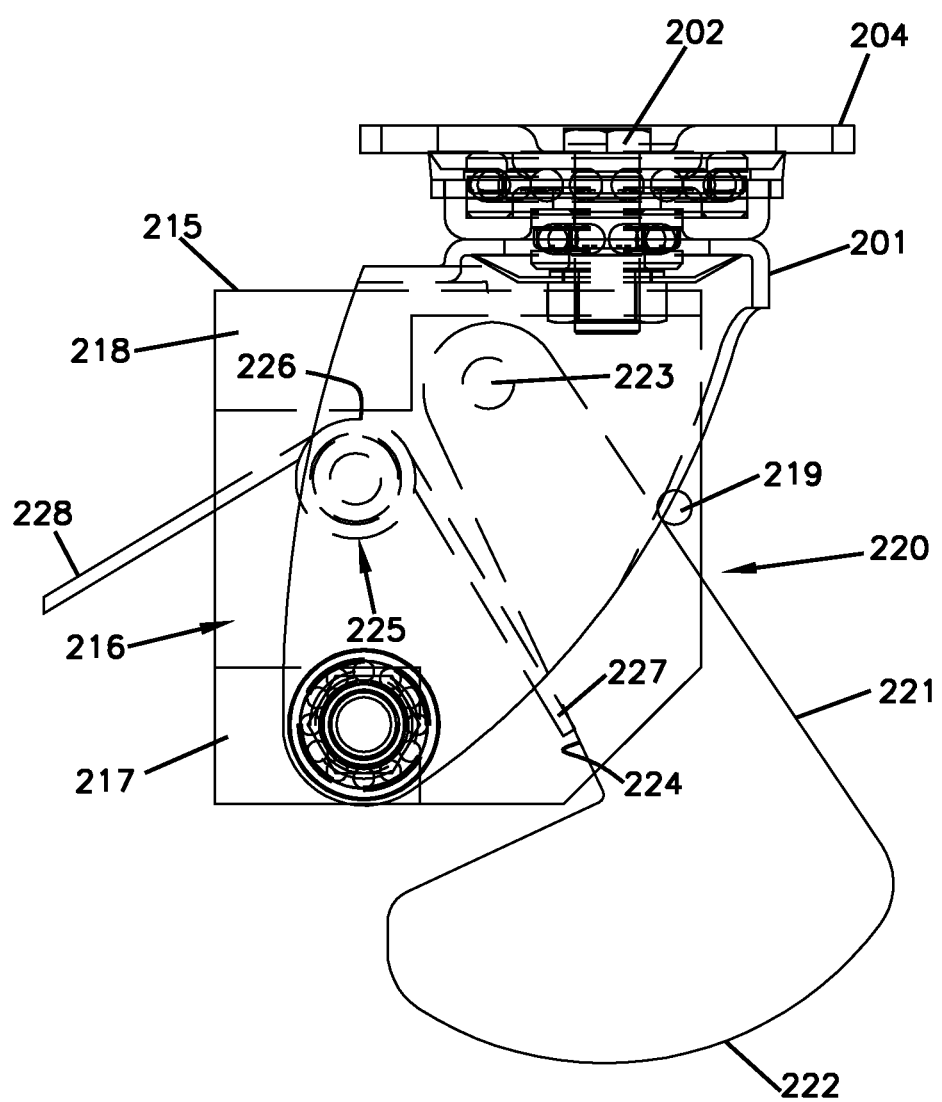

In certain implementations, the housing 215 includes a stop member 219 to counteract the bias of the spring member 225 when the step member 214 reaches a forward position (see FIG. 17). In the example shown, the stop member 219 includes a pin extending across the channel 216 between the legs of the housing 215 (FIG. 13). In other implementations, however, the stop member 219 can include one or more lugs extending partially inward from one or both sides of the housing 215. In yet another implementation, the stop member 219 can be defined by a forward surface of the housing 215 or the yoke 201.

In the example shown, the step member 214 defines an at least partially flat forward side 221, an at least partially flat rearward side 224, and a generally curved bottom side 222. In some implementations, the bottom surface 222 of the step member 214 defines a variable radius curvature (see FIGS. 14 and 17). In other implementations, however, the bottom surface 222 can define a constant radius curvature. In one implementation, the step member 214 defines an arc shape. In another implementation, the step member 214 generally defines an L-shape. In other implementations, however, the step member 214 can define other suitable shapes.

In the example shown, the spring member 225 includes a torsion spring having a central coil 226, a first leg 227 extending from the central coil 226, and a second leg 228 extending from the central coil 226. The first leg 227 contacts the rearward side 224 of the step member 214 to push the step member 214 to the forward position. The second leg 228 extends generally rearwardly relative to the housing 215. In the example shown, the second leg 228 freely extends outside of the housing 215 (see FIGS. 16-17). In another implementation, however, the second leg 228 can be confined within the housing 215.

The first leg 227 of the spring member 225 biases the forward side 221 of the step member 214 against the stop member 219 to maintain the step member 214 in the forward position until the wheel arrangement 200 contacts a surface transition. The spring member 225 enables the step member 214 to be pushed rearwardly against the bias of the spring member 225 sufficient to allow the forward side 221 of the step member 214 to move within the housing cavity 216. In one implementation, the spring member 225 enables the step member to be pushed within the cavity 216 to a position in which the forward side 221 has a generally vertical orientation.

When the wheel arrangement 200 encounters a surface transition from a first surface height to a second surface height, a portion of the bottom surface 222 contacts the second surface height. Pushing the wheel arrangement 200 against the surface transition causes the step member 214 to pivot or otherwise move rearwardly within the housing 215. As the step member 214 moves rearwardly, the step member 214 applies an upward force on the housing 215, which in turn applies an upward force on the base 204. Accordingly, pushing forward on the wheel arrangement 200 at a surface transition aids in lifting the wheel arrangement off the ground, thereby reducing the amount of force necessary to navigate the primary wheels 210, 212 over the surface transition.

In accordance with some aspects, the pivot point 223 of the step member 214 is positioned farther from the ground than the first rotation axis AR3 of the wheels 210, 212. For example, in accordance with certain aspects, the pivot point 223 is positioned sufficiently fart off the ground so as to enable a reduction in the horizontal resistive force component on the primary wheels 210, 212 for a predetermined range of height transitions. In one implementation, the pivot pint 223 of the step member 214 is positioned as far from the ground as possible within the housing 215 based on the constraints of the housing 215 and the yoke 201.

Figure 18:
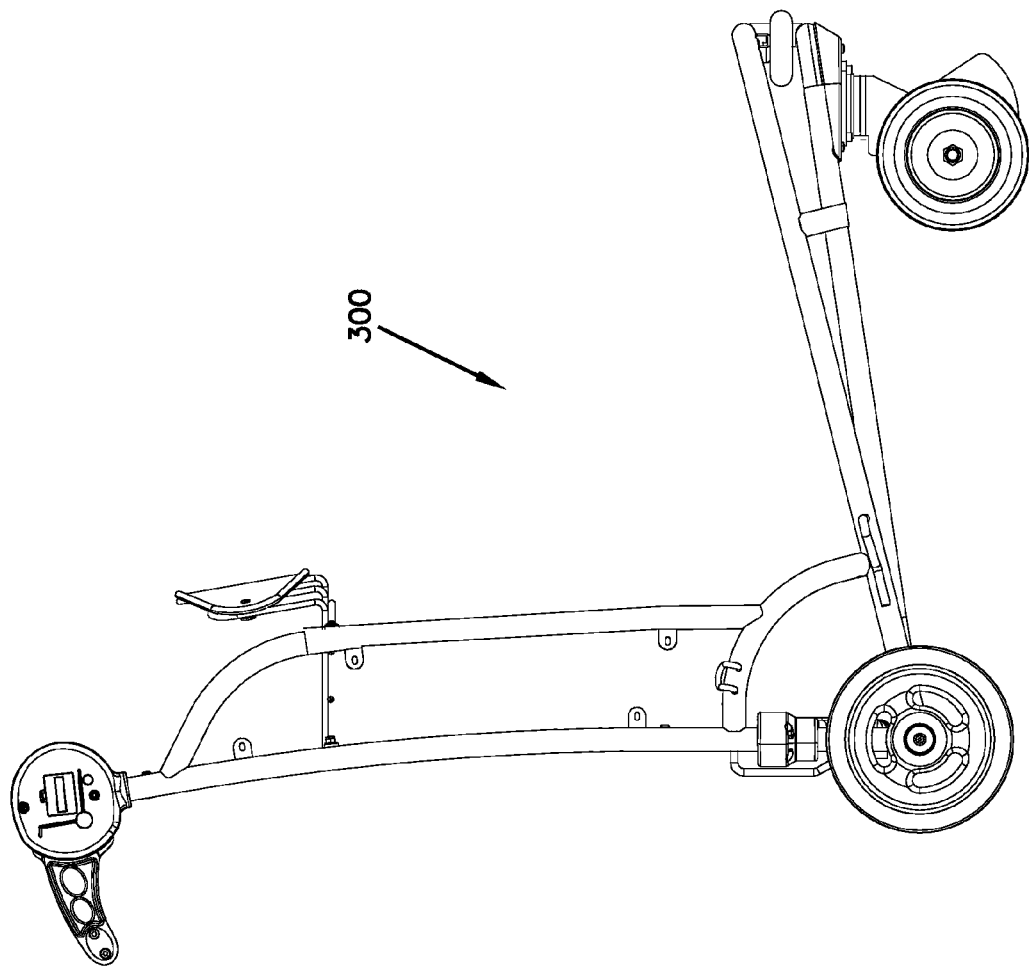
FIG. 18 is a side elevational view of a baggage cart including the second example caster wheel arrangement shown in FIGS. 13-17 in accordance with the principles of the present disclosure.
Figure 19:
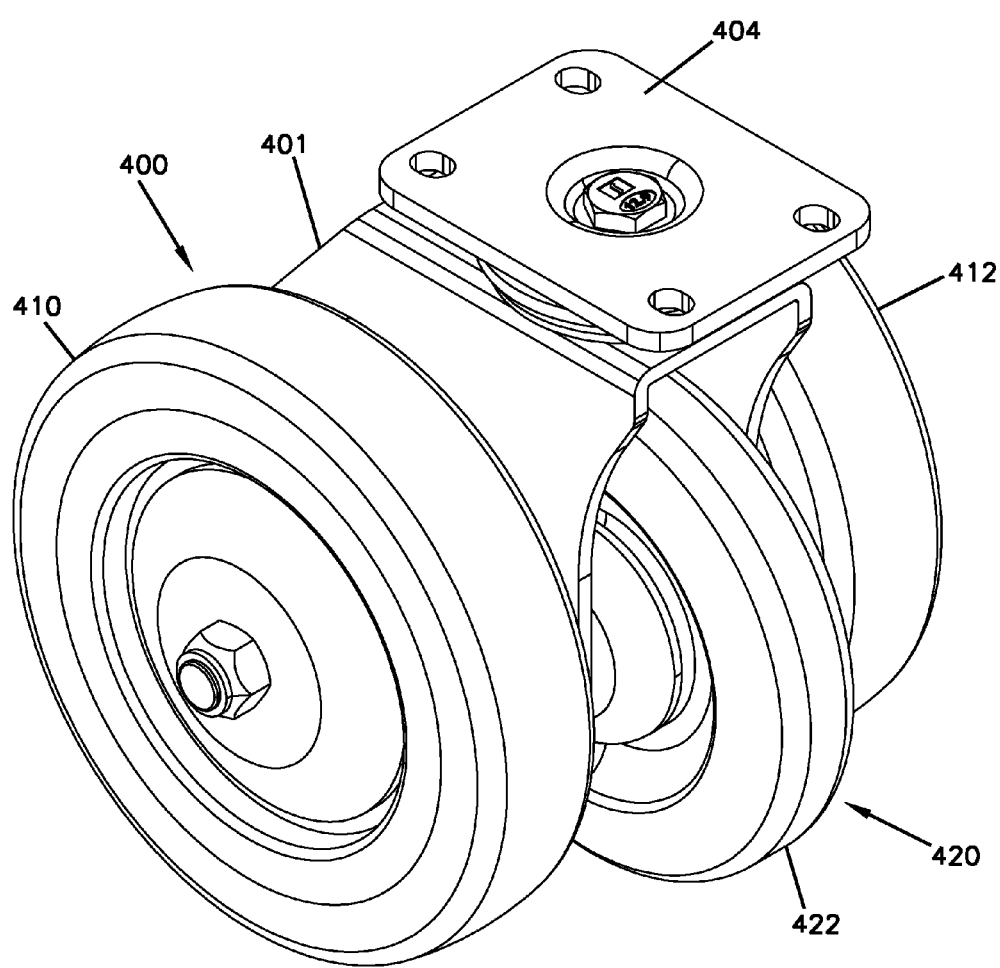
FIG. 19 is a front, top perspective view of another example caster wheel arrangement including a third example assist arrangement configured in accordance with the principles of the present disclosure.

FIG. 18 shows one example baggage cart 300 including the second caster wheel arrangement 200 at a front end and two larger, cantilevered wheels at a rear end. In accordance with other aspects of the disclosure, the example baggage cart 300 can include the caster wheel arrangement 100 at the front end in place of the second caster wheel arrangement 200. In other example implementations, the example baggage cart 300 can include multiple caster wheel arrangements (e.g., two caster wheel arrangements at the front end). In still other example implementations, one or more any of the caster wheel arrangements 100, 200 shown above can be used alone or in combination on the baggage cart 300 or any other suitable transportation equipment.

Figure 20:
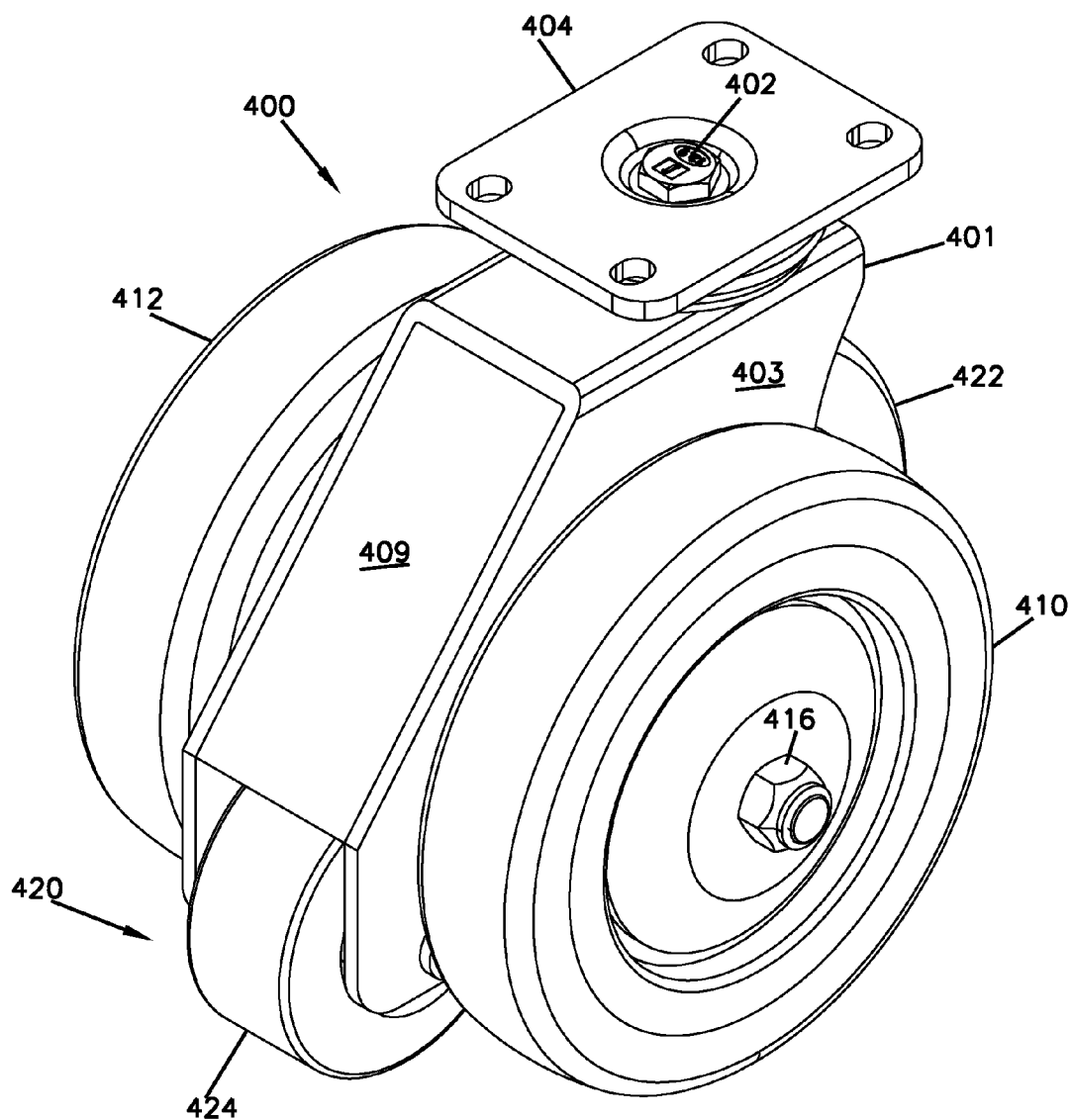
FIG. 20 is a rear, top perspective view of the example caster wheel arrangement of FIG. 19.
Figure 21:
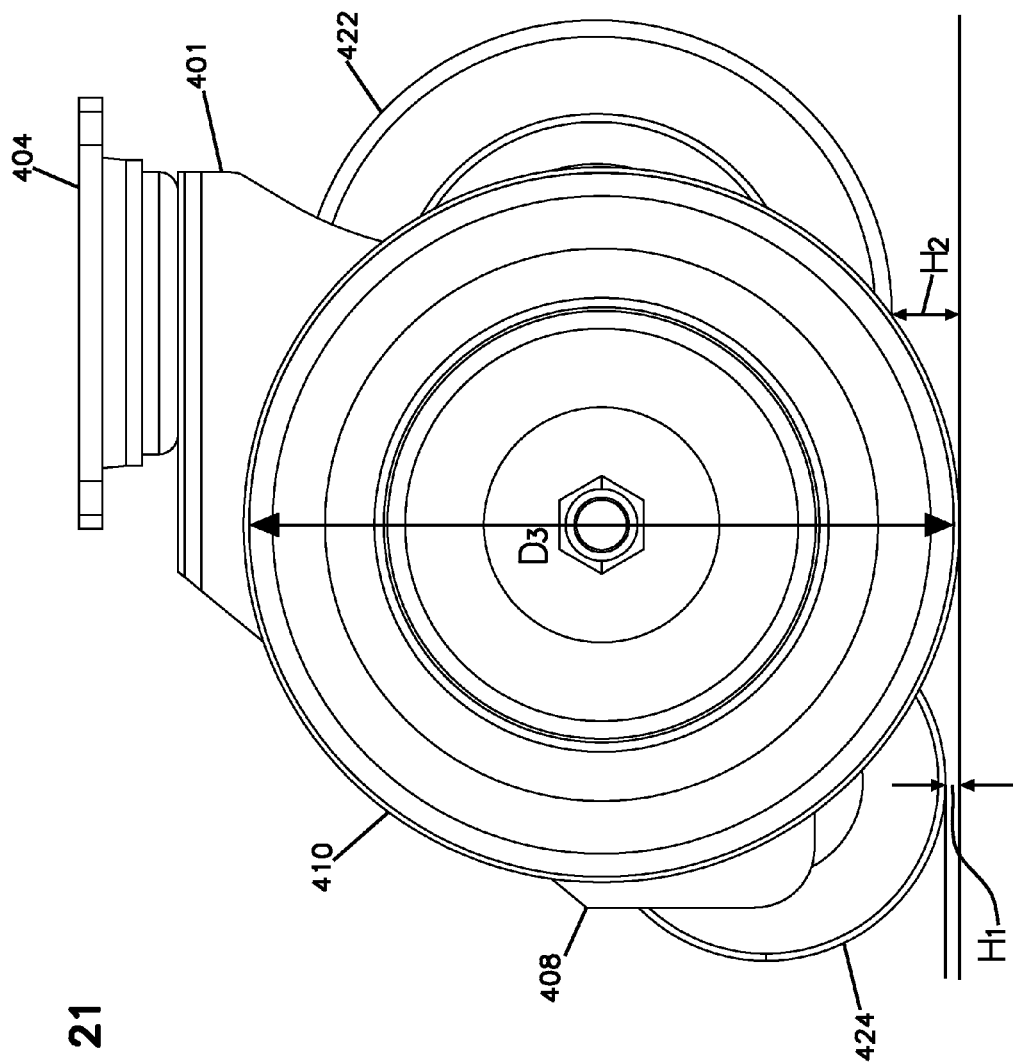
FIG. 21 is a side elevational view of the example caster wheel arrangement of FIG. 19.
Figure 22:
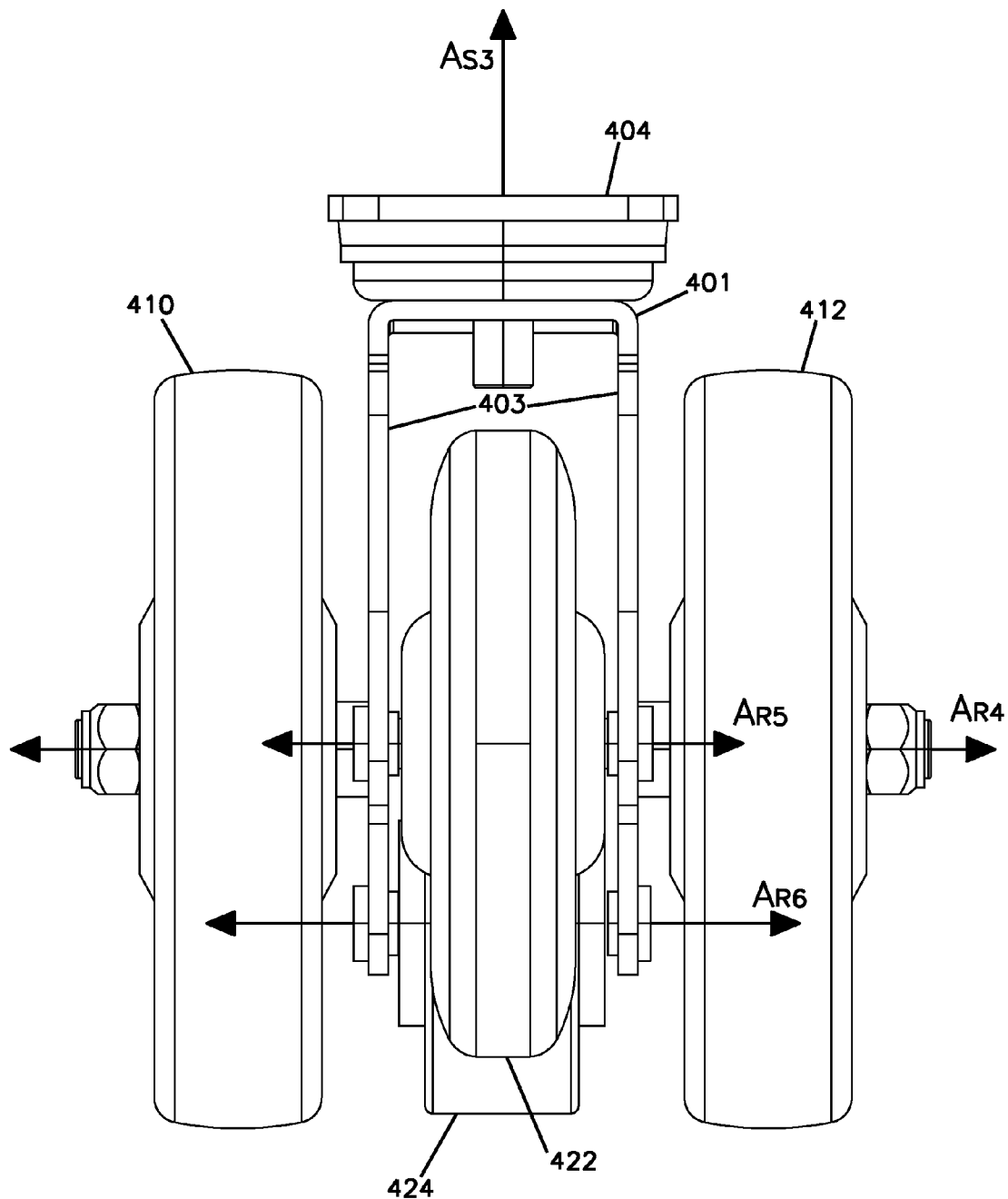
FIG. 22 is a front elevational view of the example caster wheel arrangement of FIG. 19.
Figure 23:
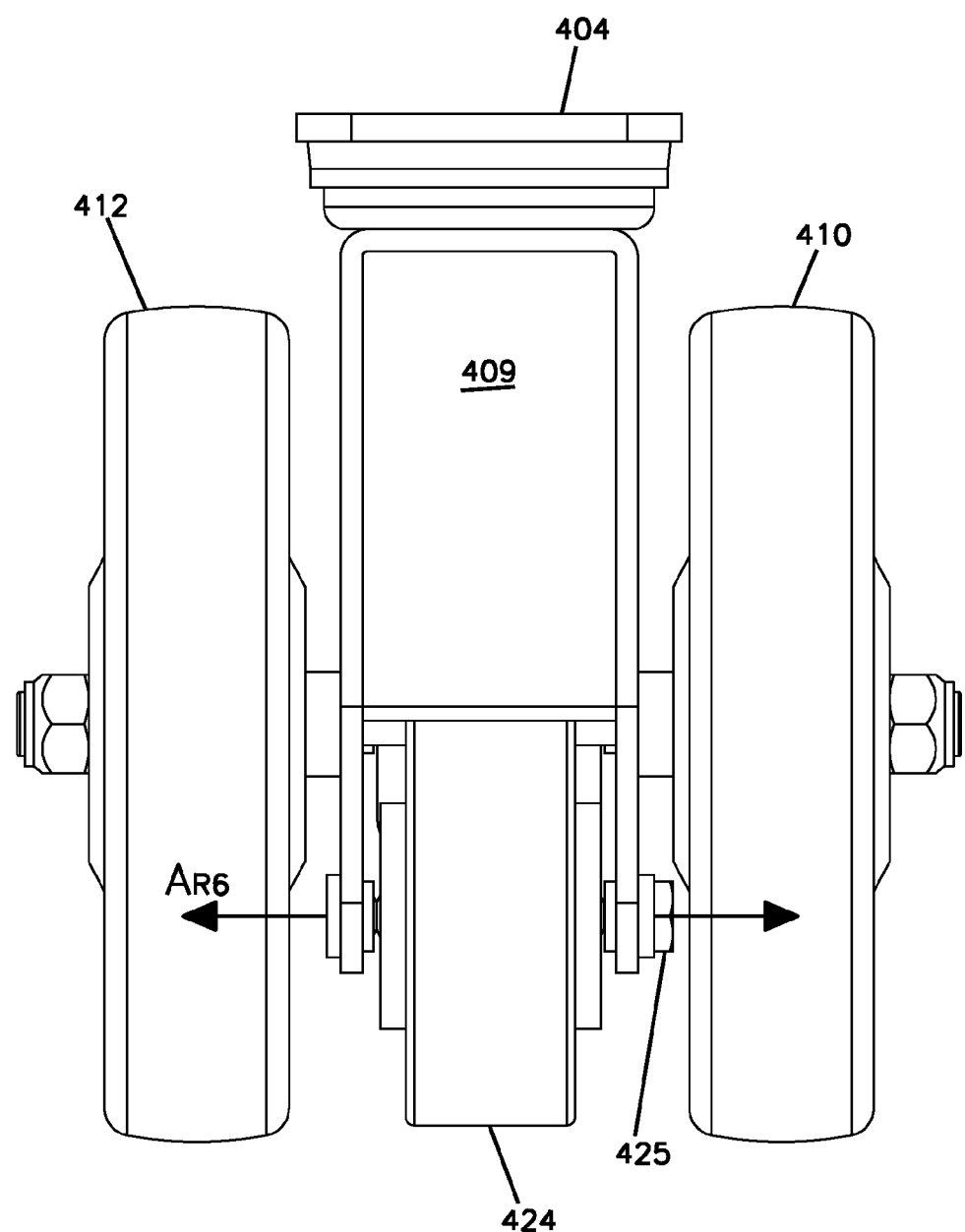
FIG. 23 is a rear elevational view of the example caster wheel arrangement of FIG. 19.
Figure 24:
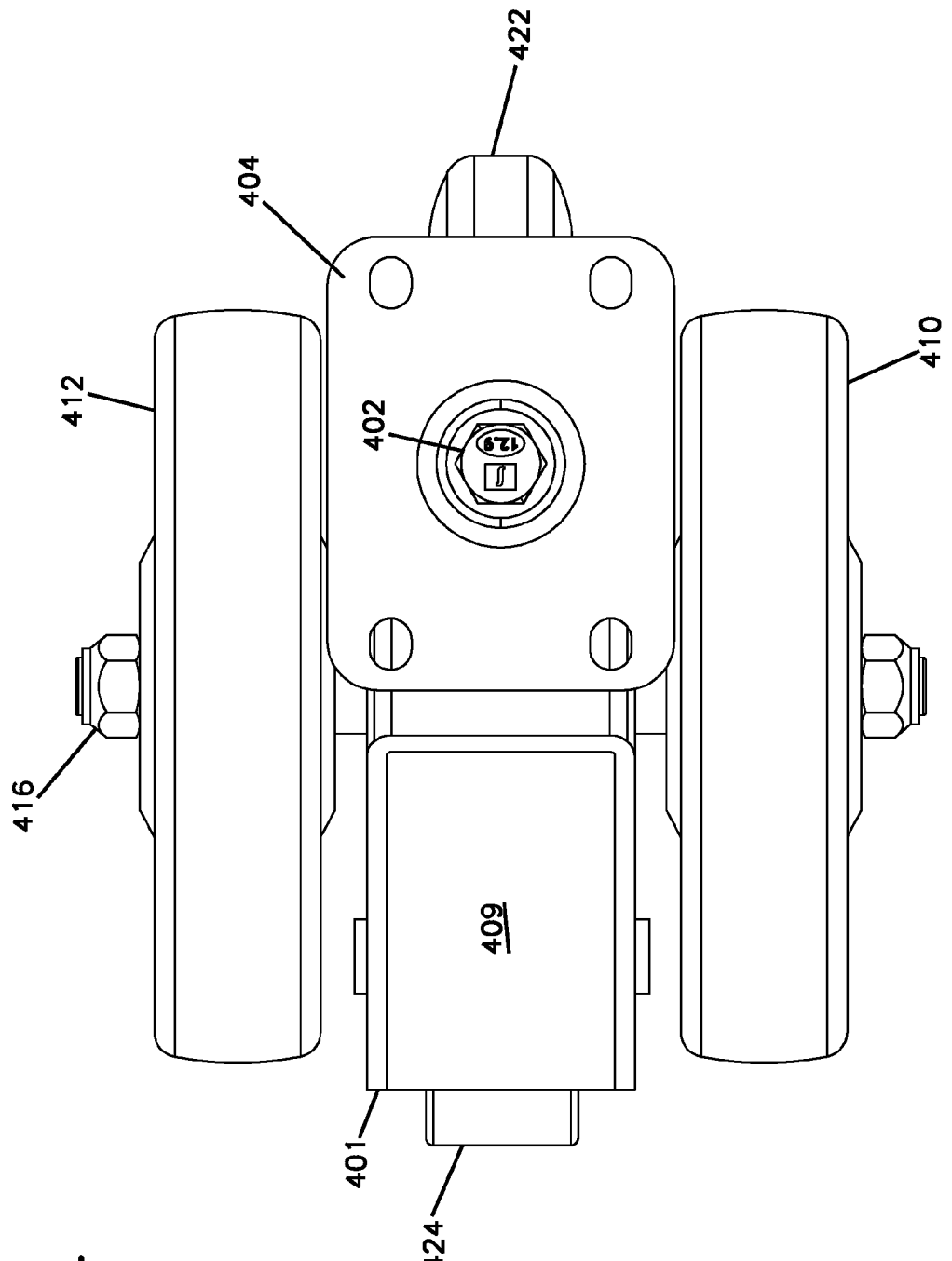
FIG. 24 is a top plan view of the example caster wheel arrangement of FIG. 19.
Figure 25:
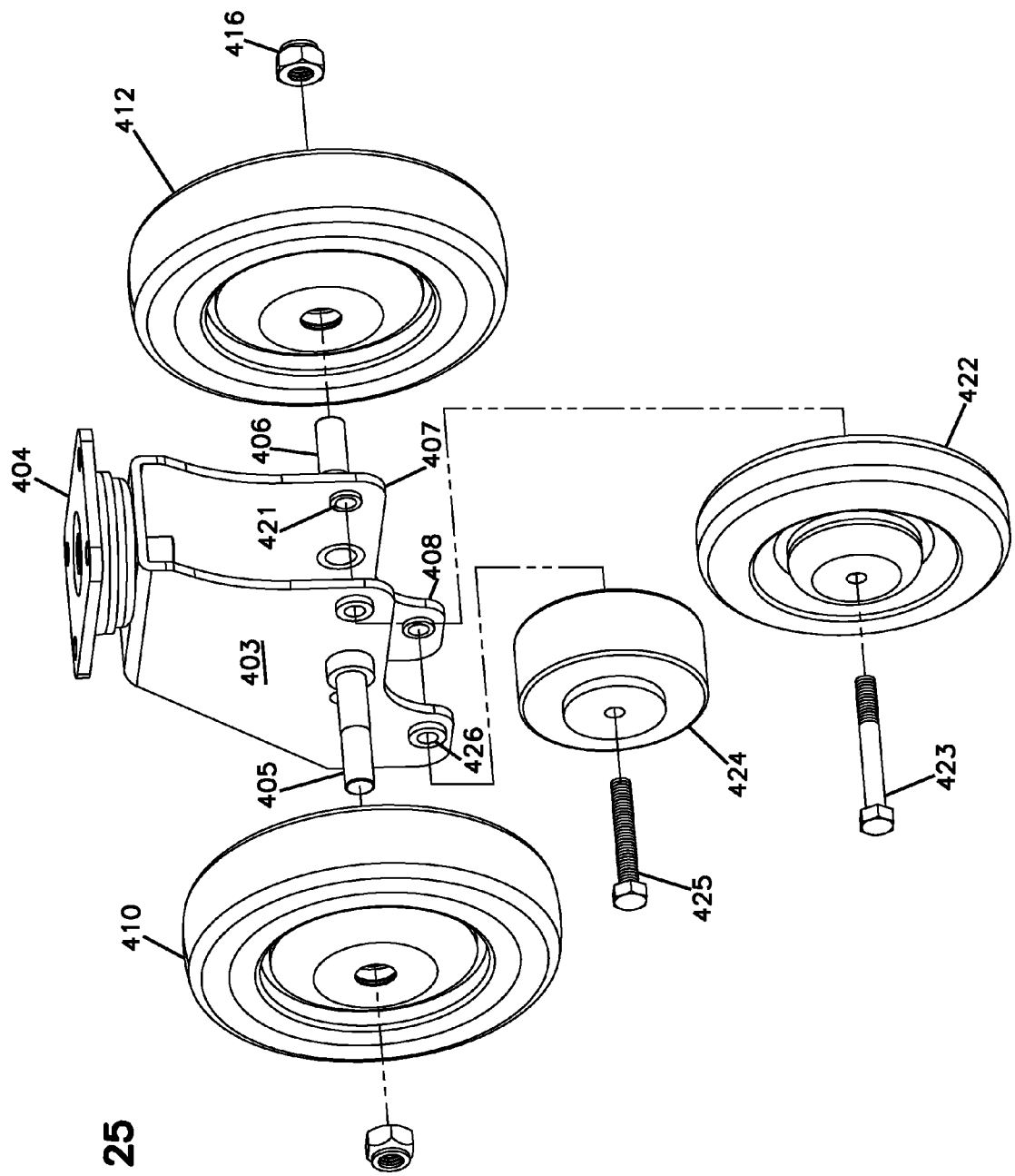
FIG. 25 is an exploded, perspective view of the caster wheel arrangement of FIG. 19 in which the various parts are visible.
Figure 26:
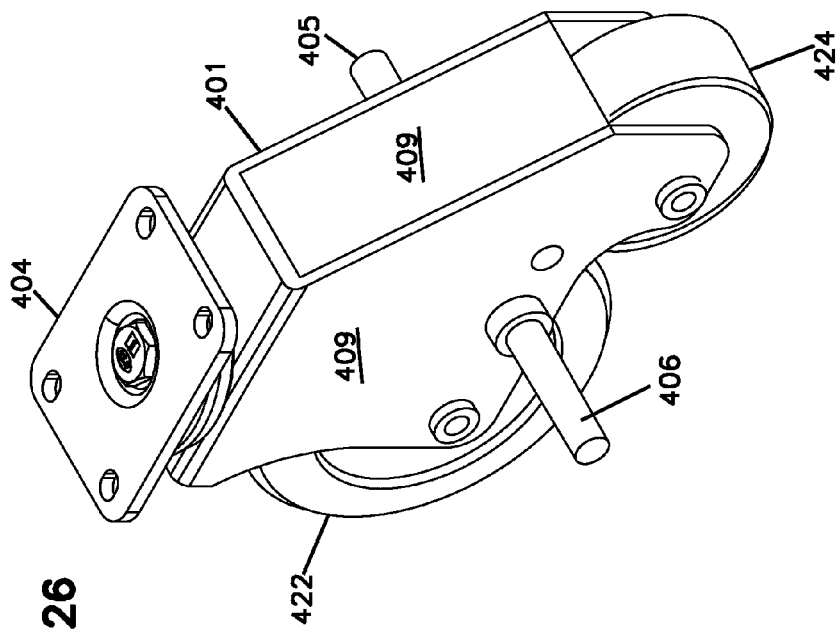
FIG. 26 is a top, rear perspective view of the caster wheel arrangement of FIG. 19 with the primary caster wheels removed.

FIGS. 19-23 illustrate another example caster wheel arrangement 400 including an example assist arrangement 420 configured in accordance with the principles of the disclosure. The first caster wheel arrangement 400 includes a yoke 401 mounted to a base 404 via a kingpin 402 so as to enable the yoke 401 to spin about the kingpin 402 relative to the base 404. One example spin axis $A_{S3}$ about which the yoke 401 spins is shown in FIG. 22. First and second wheels 410, 412 are rotatably mounted to the yoke 401 via one or more axles 405, 406 (FIG. 25). In some implementations, the kingpin 402 and/or the axles 405, 406 include ball bearings to aid in rotation (se FIG. 27).

The yoke 401 includes two generally parallel legs 403 that extend downwardly from a top that connects to the base 404. In some implementations, a sloped surface 409 extends between at least a portion of the legs 403 at a rearward portion 408 of the yoke 401 (FIG. 20). The top, legs 403, and sloped surface 409 of the yoke 401 define an inner space within which the third example assist arrangement 420 can be mounted. In other implementations, however, the legs 403 can be interconnected by strips, ribs, or other interrupted surfaces. In still other implementations, the legs 403 may be connected only at the top of the yoke 401.

In some implementations, the first and second caster wheels 410, 412 are cantilevered off exterior sides of the legs 403 (see FIG. 25). In other implementations, a caster wheel axle can extend between the legs 403. In some such implementations, the first and second wheels 410, 412 can be mounted to ends of the axle extending outwardly from the legs 403. In other such implementations, the first and second wheels 410, 412 can be mounted to the axle within the space defined by the yoke legs 403.

In general, the third example assist arrangement 420 may facilitate navigating surface transitions (e.g., gaps and rises). The third example assist arrangement 420 includes a leading wheel 422 and a trailing wheel 424 that are mounted to the yoke 401. The leading wheel 422 and the trailing wheel 424 can inhibit the amount by which the dual caster wheels 410, 412 fall into a gap in a level surface. The leading wheel 422 and the trailing wheel 424 also can aid in transitioning a rise in a surface.

In accordance with some aspects, the leading wheel 422 and the trailing wheel 424 are positioned at a height H1, H2, respectively, relative to the ground when the dual caster wheels 410, 412 are traveling over a level surface with no gap (FIG. 21). Accordingly, neither the leading wheel 422 nor the trailing wheel 424 inhibits the maneuverability of the caster wheel arrangement 400 and, hence, the cart to which the caster wheel arrangement 400 is mounted. For example, the caster assist arrangement 420 will not affect the swivel radius of the caster arrangement 400 when neither the leading wheel 422 nor the trailing wheel 424 is touching the ground.

In some implementations, the leading wheel 422 is raised about 0-1 inches off the ground. In certain implementations, the leading wheel 422 is raised about ¼ of an inch to ½ of an inch off the ground. In some implementations, the trailing wheel 424 is raised about zero to one (0-1) inches off the ground. In certain implementations, the trailing wheel 424 is raised about 0.1 to 0.5 inches off the ground. For example, in one implementation, the leading wheel 422 can be raised about $3/8^{th}$ of an inch off the ground and the trailing wheel 424 can be raised about $1/8^{th}$ of an inch off the ground. In other implementations, however, the leading and trailing wheels 422, 424 can be raised farther off the ground.

In some implementations, the leading wheel 422 is positioned between the first and second wheels 410, 412. For example, the leading wheel 422 can be mounted between the legs 403 of the yoke 401 at a forward portion 407 of the yoke 401. In the example shown, one or more fasteners (e.g., screws, bolts, rivets, pins, etc.) 423 mount through the wheel 422 and through openings 421 defined in the forward portion 407 of the yoke (see FIG. 25). In certain implementations, the openings 421 are generally horizontally aligned with the openings through which the dual caster wheels 410, 412 mount to the yoke 401 (see FIG. 25). In other implementations, a leading wheel 422 can be positioned in the same plane as one of the dual caster wheels 410, 412.

The leading wheel 422 rotates about a second rotation axis $A_{R5}$ (see FIG. 22). The second rotation axis $A_{R5}$ extends generally parallel to, but displaced from, the first rotation axis $A_{R4}$ of the first and second wheels 410, 412. In various implementations, the second rotation axis $A_{R5}$ can be displaced horizontally and/or vertically from the first rotation axis $A_{R4}$. In some implementations, the position of the leading wheel 422 relative to the primary wheels 410, 412 is selected so as to minimize the resistive force of the caster wheel arrangement 400 as the caster wheel arrangement 400 navigates the expected surface transition dimensions as will be discussed in more detail below.

In some implementations, the trailing wheel 424 also is positioned between the first and second wheels 410, 412. For example, the trailing wheel 424 can be mounted between the legs 403 of the yoke 401 at a rearward portion 408 of the yoke 401 (see FIG. 25). In the example shown, one or more fasteners 425 mount through an opening in the trailing wheel 424 and through openings 426 in the rearward portion 408 of the yoke 401 (see FIG. 25). In certain implementations, the rearward portion 408 of the yoke 401 extends closer to the ground than the forward portion 407 of the yoke 401. The axis of rotation $A_{R6}$ of the trailing wheel 424 is positioned lower than either the axis of rotation $A_{R4}$ of the dual caster wheels 410, 412 or the axis of rotation $A_{R5}$ of the leading wheel 422.

The trailing wheel 424 rotates about a third rotation axis $A_{R6}$ (see FIG. 22). The third rotation axis $A_{R6}$ extends generally parallel to, but displaced from, the first rotation axis $A_{R4}$ of the first and second wheels 410, 412. The third rotation axis $A_{R6}$ also extends generally parallel to, but displaced from, the second rotation axis $A_{R5}$ of the leading wheel 422. In various implementations, the third rotation axis $A_{R6}$ can be displaced horizontally and/or vertically from the first rotation axis $A_{R4}$. In some implementations, the position of the trailing wheel 424 relative to the primary wheels 410, 412 is selected so as to minimize the resistive force of the caster wheel arrangement 400 as the caster wheel arrangement 400 navigates the expected surface transition dimensions as will be discussed in more detail below.

The diameter and position of the third example wheel assist arrangement 420 is selected to minimize the horizontal component of the resistive force generated when the wheel arrangement 400 transitions over a gap and/or a height. In accordance with certain aspects, the diameter $D_4$ of the leading wheel 422 and the diameter $D_5$ of the trailing wheel are selected based on the dimensions of the yoke 401. For example, in one implementation, the diameters $D_4$ and $D_5$ can be selected to be the largest diameter that will fit together within an existing yoke 401. In another implementation, the diameters $D_4$ and $D_5$ of the wheels 422, 424 can be selected to be the largest diameters that will fit within the yoke 401 without contacting the ground when the wheel arrangement 400 is positioned on a generally flat surface.

In accordance with some aspects, suitable example caster wheels 410, 412 have a diameter $D_3$ (FIG. 21) ranging between about one inch and about eight inches. In accordance with certain aspects, suitable example caster wheels 410, 412 have a diameter $D_3$ ranging from about four inches to about seven inches. In one example implementation, suitable example caster wheels 410, 412 have a diameter $D_3$ of about five inches. In another example implementation, suitable example caster wheels 410, 412 have a diameter $D_3$ of about six inches.

Figure 27:
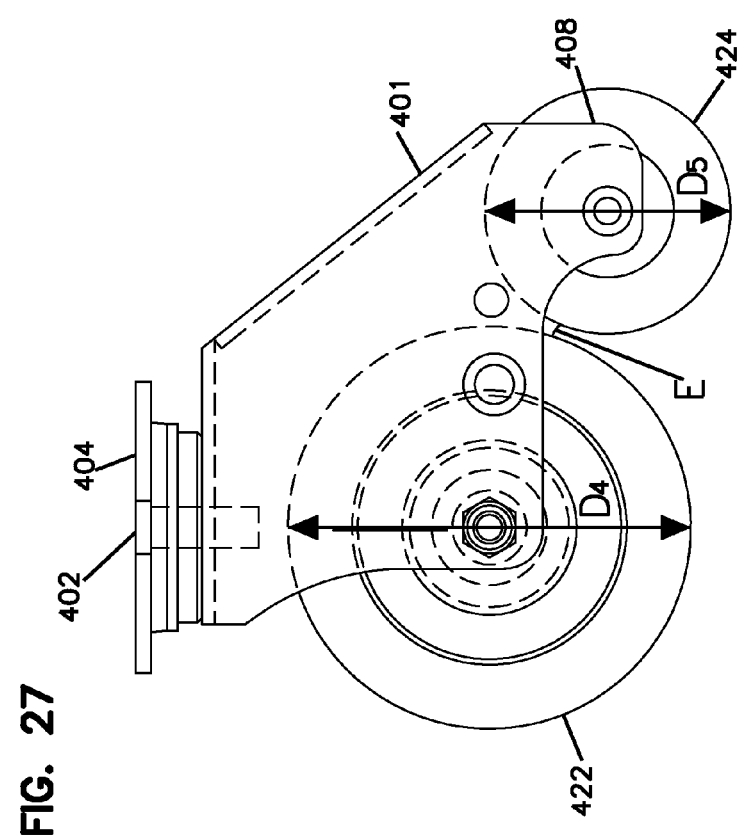
FIG. 27 is a side elevational view of the caster wheel arrangement of FIG. 26.

In some implementations, the leading wheel 422 has a different diameter $D_4$ from a diameter $D_3$ of the first and second wheels 410, 412 (e.g., see FIG. 27). Typically, the diameter $D_4$ of the leading wheel 422 is smaller than the diameter $D_3$ of the first and second wheels 410, 412. In some implementations, the diameter $D_4$ of the leading wheel 422 is selected based on the size of the yoke 401 and the expected surface transition dimensions as will be discussed in more detail below. In one example implementation, the diameter $D_3$ of the first and second primary wheels 410, 412 is about six inches and the diameter $D_4$ of the leading wheel 422 is about five inches.

In some implementations, the trailing wheel 424 has a different diameter $D_5$ from a diameter $D_3$ of the first and second wheels 410, 412 and from a diameter $D_4$ of the leading wheel 422 (e.g., see FIG. 27). Typically, the diameter $D_5$ of the trailing wheel 424 is smaller than the diameter $D_3$ of the first and second wheels 410, 412. In certain implementations, the diameter $D_5$ of the trailing wheel 424 also is smaller than the diameter $D_4$ of the leading wheel 422. In some implementations, the diameter $D_5$ of the trailing wheel 424 is selected based on the size of the yoke 401 and the expected surface transition dimensions as will be discussed in more detail below. In one example implementation, the diameter $D_3$ of the first and second wheels 410, 412 is about six inches and the diameter $D_5$ of the trailing wheel 424 is about three inches.

In accordance with certain aspects, the leading wheel 422 is positioned so that the second rotation axis $A_{R5}$ is located a first distance off the ground and the trailing wheel 424 is positioned so that the third rotation axis $A_{R6}$ is located at a second distance off the ground. In certain implementations, the first distance is greater than the second distance (e.g., see FIG. 27). In general, each distance is selected to minimize the horizontal resistive force over a desired range of height transitions, while considering that a gap in the ground surface adds to the height transition. For example, in one implementation, the second rotation axis $A_{R5}$ of the leading wheel 422 is located farther above the ground than the first rotation axis $A_{R4}$ of the primary wheels 410, 412 and the third rotation axis $A_{R6}$ of the trailing wheel 424 is located closer to the ground than the first rotation axis $A_{R4}$ of the primary wheels 410, 412. In other implementations, the second rotation axis $A_{R5}$ can be lower than the first rotation axis $A_{R4}$ and/or the third rotation axis $A_{R6}$ can be higher than the first rotation axis $A_{R4}$.

In accordance with some aspects, the leading wheel 422 is positioned so that the second rotation axis $A_{R5}$ is located forwardly of the first rotation axis $A_{R4}$ of the primary wheels 410, 412. In one example implementation, the leading wheel 422 is positioned far enough forward of the primary wheels 210, 212 so that a point P on the lower quadrant of the wheel 422 intersects the circumference C of the primary wheels 410, 412 when viewed from a side elevational view (e.g., see FIG. 7). In other implementations, the leading wheel 422 is positioned even further forward relative to the primary wheels 410, 412.

In accordance with some aspects, the trailing wheel 424 is positioned so that the third rotation axis $A_{R6}$ is located rearwardly of the first rotation axis $A_{R4}$ of the primary wheels 410, 412. In one example implementation, the trailing wheel 424 is positioned sufficiently rearward of the primary wheels 410, 412 so that the trailing wheel 424 does not interact with the leading wheel 422, even if the leading and trailing wheels 422, 424 are aligned in the same plane (e.g., see FIG. 27). For example, the trailing wheel 424 can be positioned to allow a gap E between the leading and trailing wheels 422, 424. The gap E can range from about 0.1 inches to about 1 inch. In other implementations, the trailing wheel 424 can be positioned even further rearward.

Figure 28:
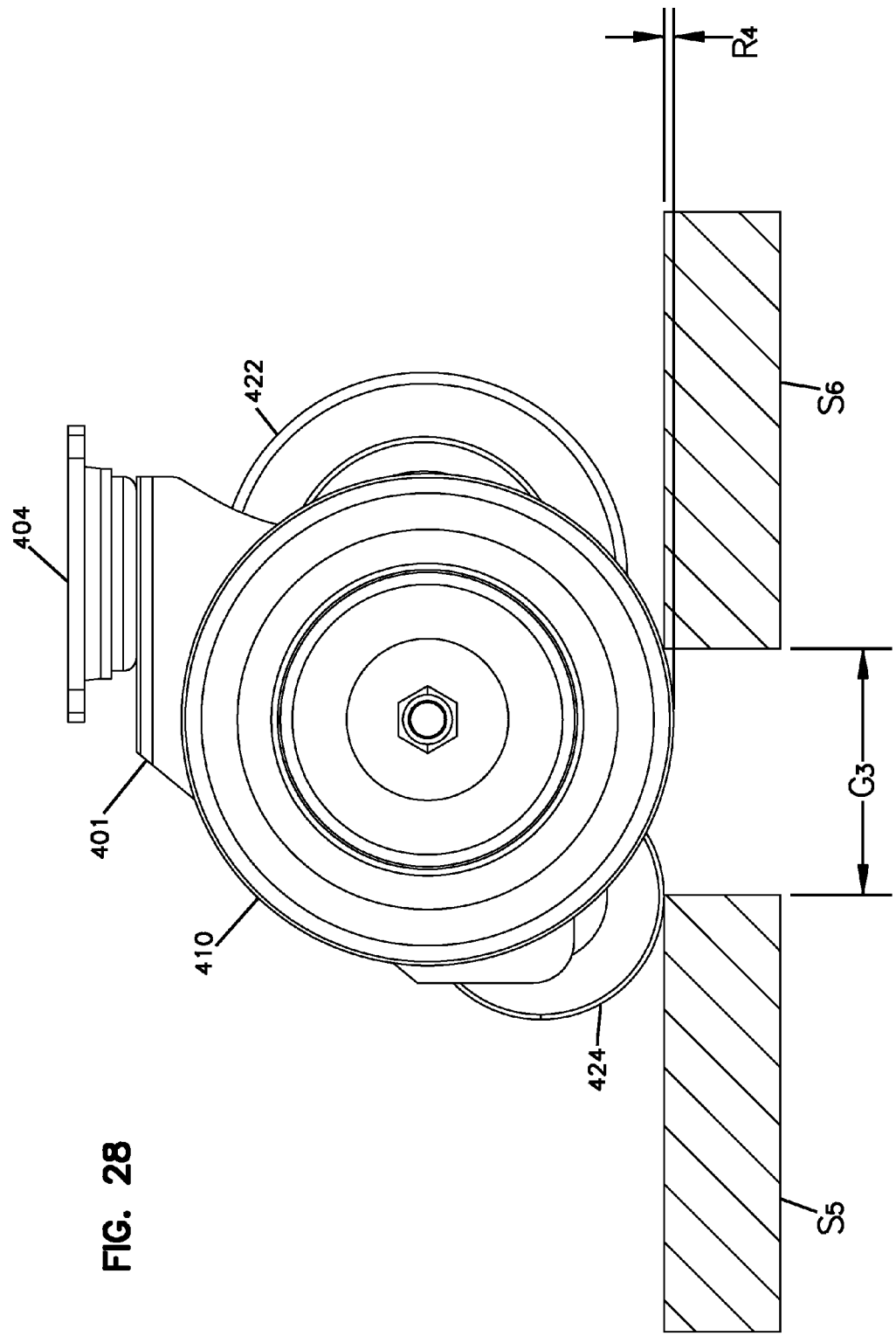
FIG. 28 is a is a side elevational view of the example caster wheel arrangement of FIG. 19 in which the primary wheels are cooperating with the assist device to transition a gap in a generally level surface in accordance with the principles of the present disclosure.

FIG. 28 shows some advantages of adding the third example wheel assist arrangement 420 to a wheel arrangement (e.g., a single caster wheel arrangement, a dual caster wheel arrangement, a triple caster wheel arrangement, etc.) when the wheel arrangement is transitioning a gap $G_3$ between a first surface S5 and a second surface S6. In FIG. 28, the second surface S6 is level with the first surface S5. The gap $G_3$ is sufficiently wide so that the caster wheel 410, by itself, would drop into the gap $G_3$ to create a significant rise.

Adding the trailing wheel 424 effectively creates a larger caster wheel, thereby decreasing how far the caster will fall into the gap $G_3$.

Figure 29:
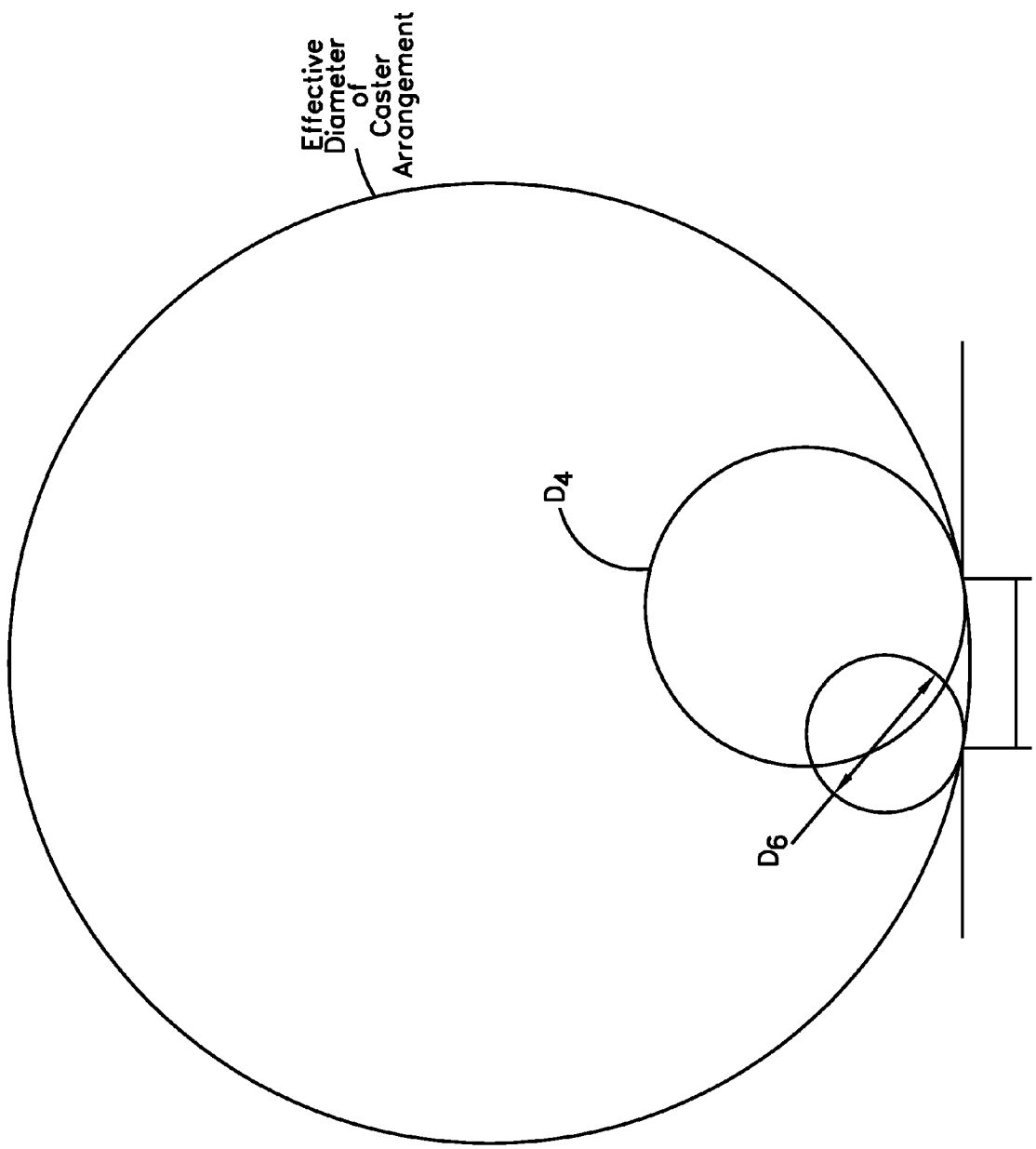
FIG. 29 is a schematic diagram showing the effect of adding an example trailing wheel-type assist device to an example caster wheel arrangement in accordance with the principles of the present disclosure.

Decreasing the rise R4 resulting from the caster dropping into the gap $G_3$ allows for an easy transition across the gap $G_3$, without significantly changing the design parameters for the yoke 401. For example, when a three inch trailing wheel, which is raised off the ground by $\frac{1}{8}^{th}$ of an inch, is added to a six inch caster wheel, the effective diameter size of the caster wheel arrangement becomes about eighteen inches (see FIG. 29). Such a caster diameter facilitates traversing gaps $G_3$ of up to at least four inches. For example, such a caster diameter facilitates traversing a three inch gap $G_3$. Raising or lowering the trailing wheel 424 can change the amount by which the effective diameter is increased.

Figure 30:
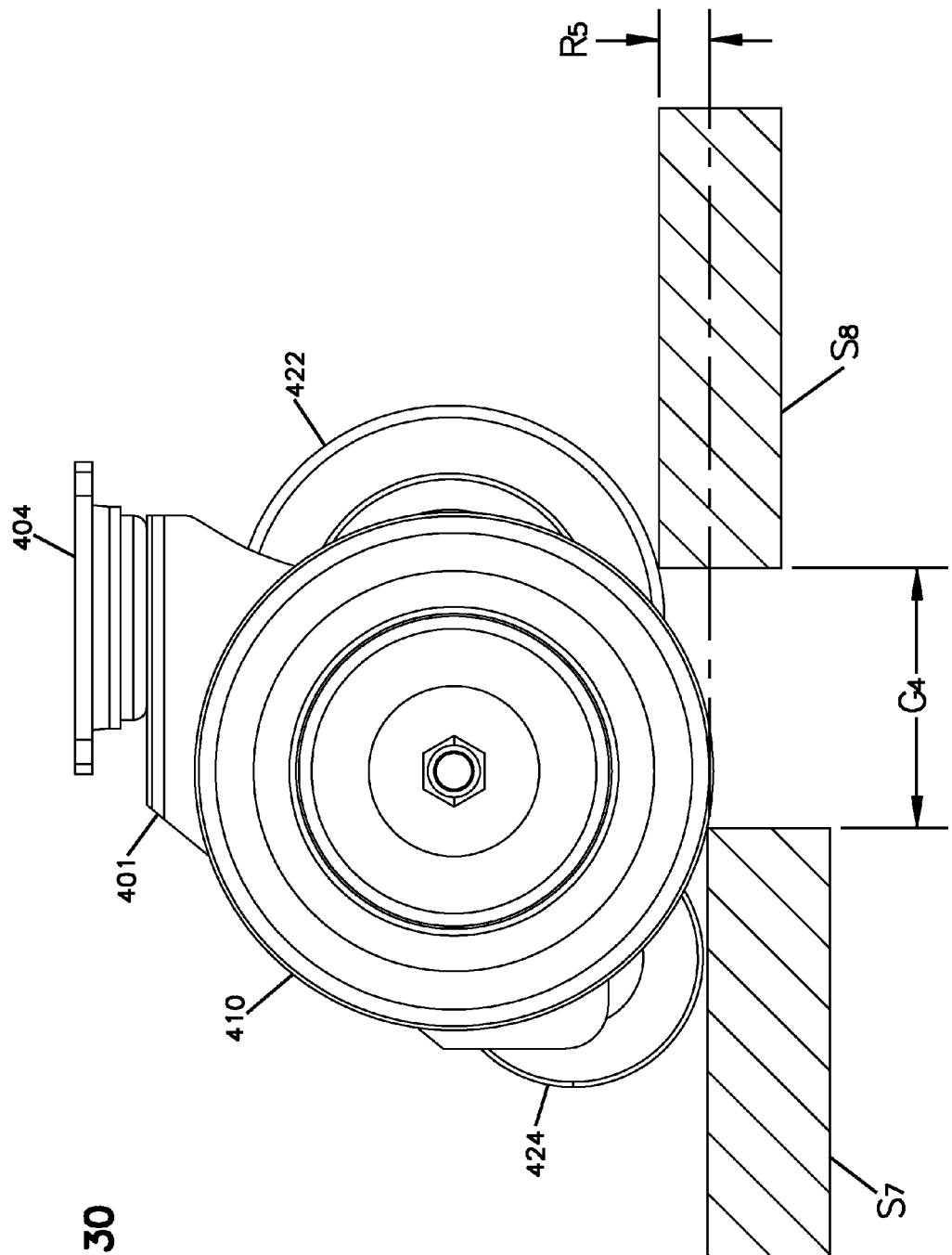
FIG. 30 is a is a side elevational view of the example caster wheel arrangement of FIG. 19 in which the primary wheels are cooperating with the assist device to transition a surface gap and a surface rise in accordance with the principles of the present disclosure.
Figure 31:
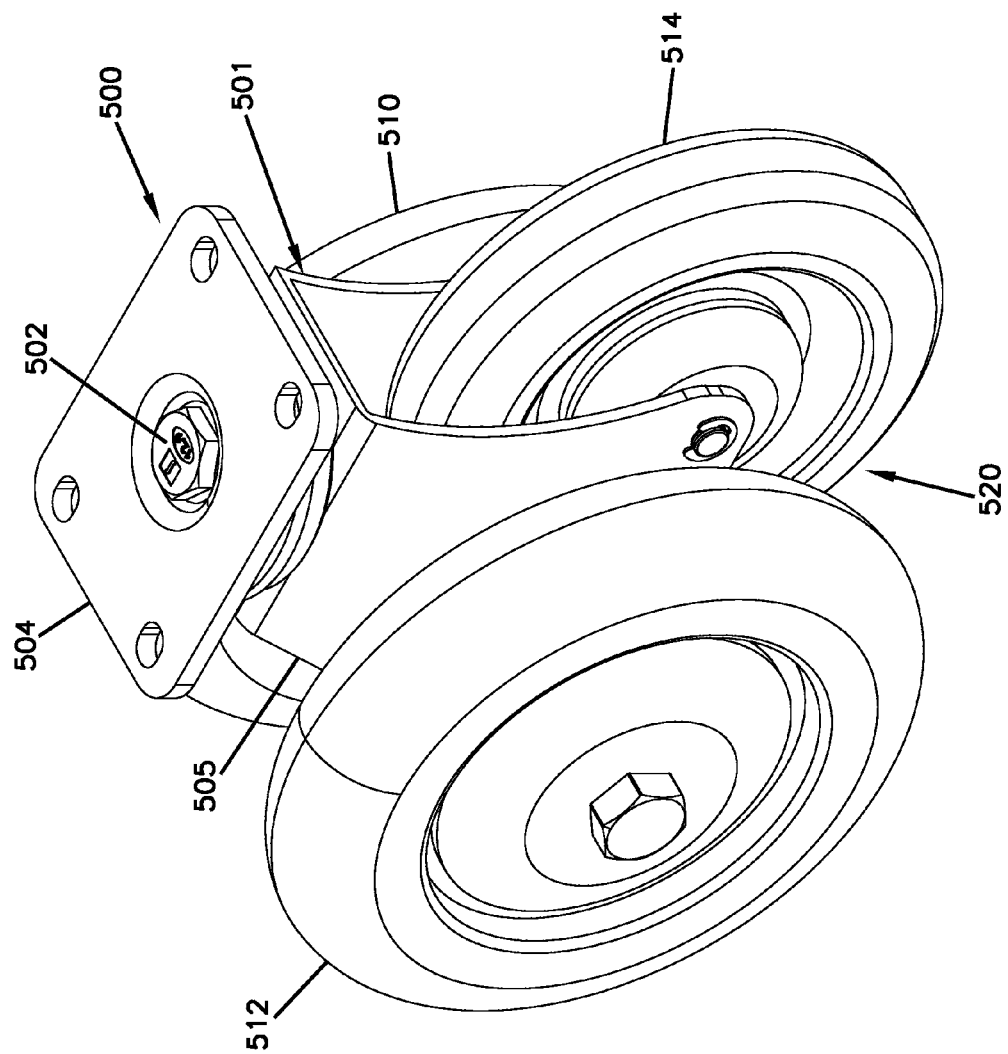
FIG. 31 is a front, top perspective view of another example caster wheel arrangement including a fourth example assist arrangement configured in accordance with the principles of the present disclosure.

FIG. 30 shows the caster wheel arrangement 400 with the third example wheel assist arrangement 420 transitioning a gap $G_4$ between a first surface S7 and a second surface S8. In FIG. 30, the second surface S8 is raised above the surface S7 by a rise R5. The gap $G_4$ is sufficiently wide so that the caster wheel 410, by itself, would drop into the gap $G_4$ to further increase the rise R5. As discussed above, the leading wheel 422 will contact the third surface S3, thereby decreasing how far the caster will fall into the gap $G_4$. If the gap $G_4$ is sufficiently narrow, then the trailing wheel 424 will not contact the ground as the caster transitions the gap $G_4$. If the gap $G_4$ is sufficiently wide, however, then the trailing wheel 424 will limit the distance the caster drops into the gap $G_4$.

Figure 32:
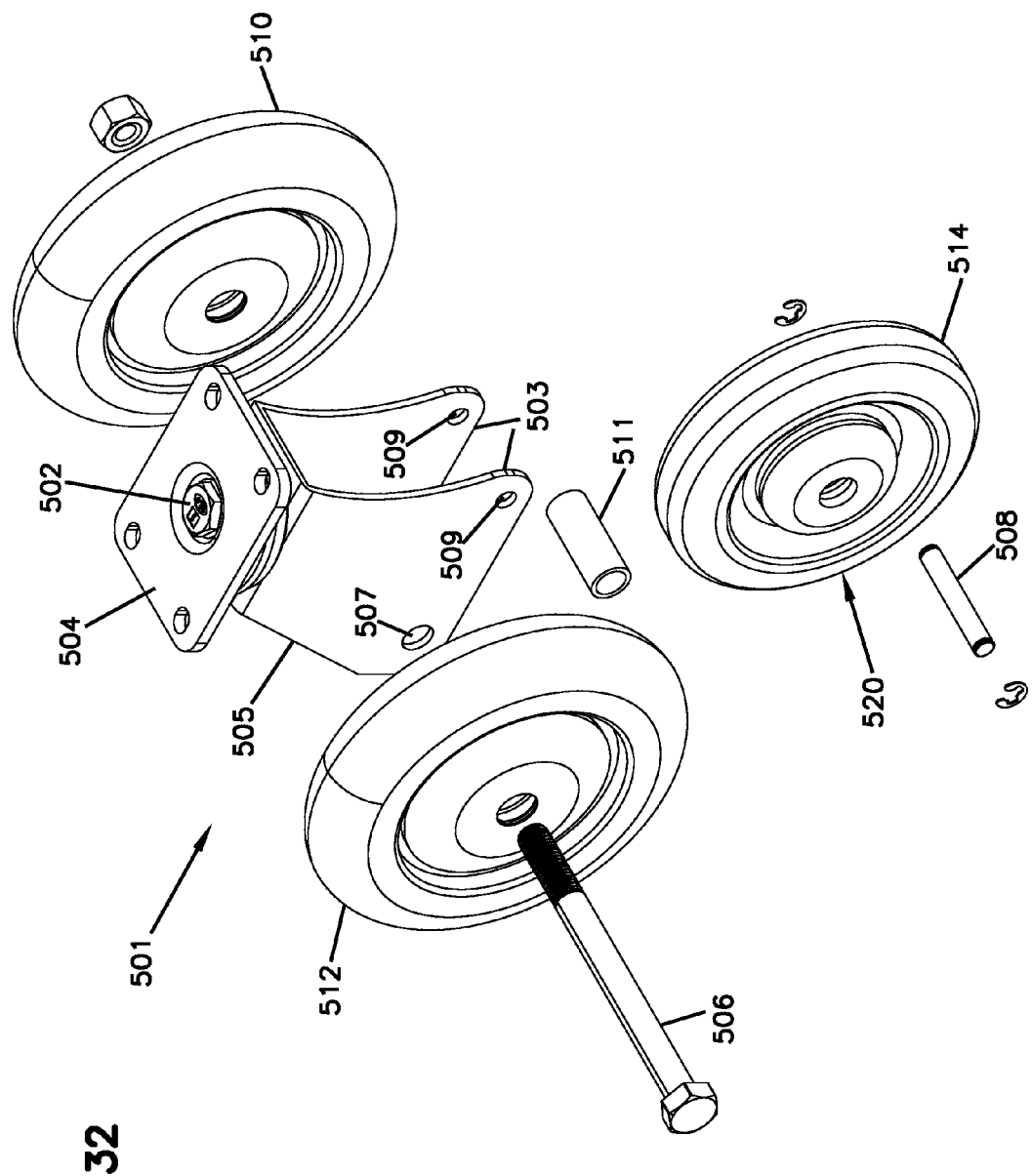
FIG. 32 is an exploded, perspective view of the caster wheel arrangement of FIG. 31 in which the various parts are visible.
Figure 33:
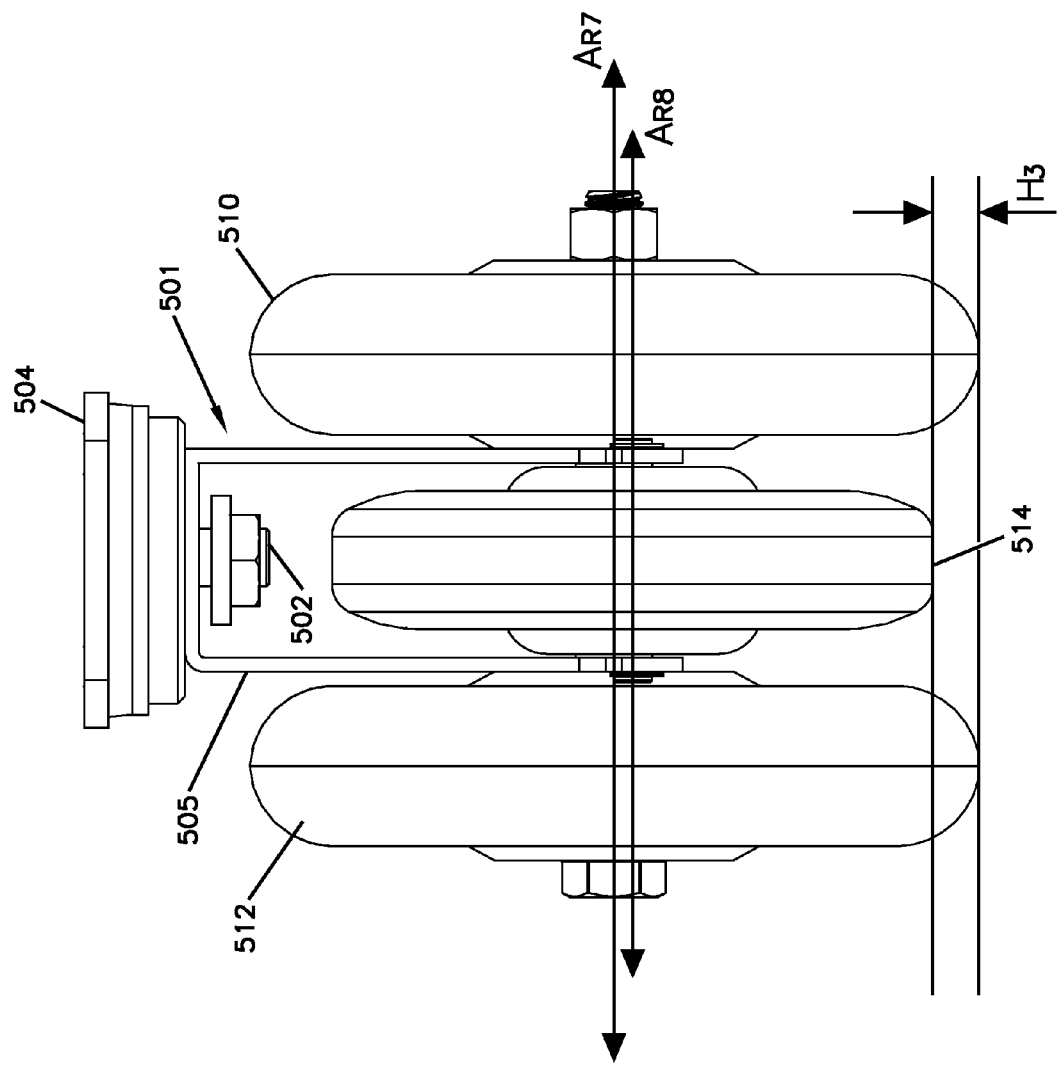
FIG. 33 is a front elevational view of the caster wheel arrangement of FIG. 31.

FIGS. 31-37 illustrate a fourth example caster wheel arrangement 500 including a fourth example assist arrangement 520 configured in accordance with the principles of the disclosure. The fourth caster wheel arrangement 500 includes at least one primary wheel coupled to a support frame 501 to rotate about a rotation axis $A_{R7}$ (FIG. 33). The support frame 501 includes a yoke 505 that is mounted to a base 504 via a kingpin 502 so as to enable the yoke 505 to spin about the kingpin 502 relative to the base 504. In the example shown, the yoke 505 defines two laterally spaced legs 503 (FIG. 32). In some implementations, the kingpin 502 and/or other axles attached to the support frame 501 include ball bearings to aid in rotation.

In the example shown, a first primary wheel 510 and a second primary wheel 512 are mounted to one or more axles attached to the yoke 505 (see FIG. 32). In some implementations, both wheels 510, 512 are coupled to the same axle 506 that extends through openings 507 defined at a rearward portion of the yoke 505 (see FIG. 32). In the example shown, the axle 506 has a bolt head at one end and is threaded at the opposite end. A nut may be received at the threaded end to secure the first and second primary wheels to the axle 506. A sleeve 511 may be received over the axle 506 between the two legs 503 to protect the axle 506 during use (see FIG. 34). In other implementations, each of the wheels 510, 512 may be mounted to a separate, cantilevered axle. In other implementations, the first and second wheels 510, 512 are otherwise mounted to rotate about the common axis $A_{R7}$.

In accordance with some aspects, suitable example caster wheels 510, 512 have a diameter $D_6$ ranging between about one inch and about eight inches. In accordance with certain aspects, suitable example caster wheels 510, 512 have a diameter $D_6$ ranging from about four inches to about seven inches. In one example implementation, suitable example caster wheels 510, 512 have a diameter $D_6$ of about five inches. In another example implementation, suitable example caster wheels 510, 512 have a diameter $D_6$ of about six inches.

The fourth caster wheel arrangement 500 also includes a fourth example assist arrangement 520 to facilitate navigating surface transitions. The fourth example assist arrangement 520 includes a leading wheel 514 that is mounted to the support frame 501. In the example shown, the leading wheel 514 is positioned between the first and second primary wheels 510, 512. For example, the leading wheel 514 can be mounted between the legs 503 of the yoke 505 at a forward portion of the yoke 505. In the example shown, a second axle 508 extends between openings 509 defined in a forward portion of the yoke 505 (see FIG. 32). One or more fasteners couple a hub of the leading wheel 514 to the axle 508.

The leading wheel 514 is raised off the ground a height $H_3$ relative to the primary wheels 510, 512 (FIG. 33). Accordingly, the leading wheel 514 does not inhibit the maneuverability of the caster wheel arrangement 500 and, hence, a cart (e.g., see cart 300 of FIG. 18) to which the caster wheel arrangement 500 is mounted. For example, the caster assist arrangement 520 will not affect the swivel radius of the caster arrangement 500 when the leading wheel 514 is not touching the ground. In some implementations, the leading wheel 514 is raised about 0-1 inches off the ground. In certain implementations, the leading wheel 514 is raised about ¼ of an inch to ½ of an inch off the ground. For example, in one implementation, the leading wheel 514 can be raised about $\frac{3}{8}^{th}$ of an inch off the ground. In other implementations, however, the leading 514 can be raised farther off the ground.

Figure 34:
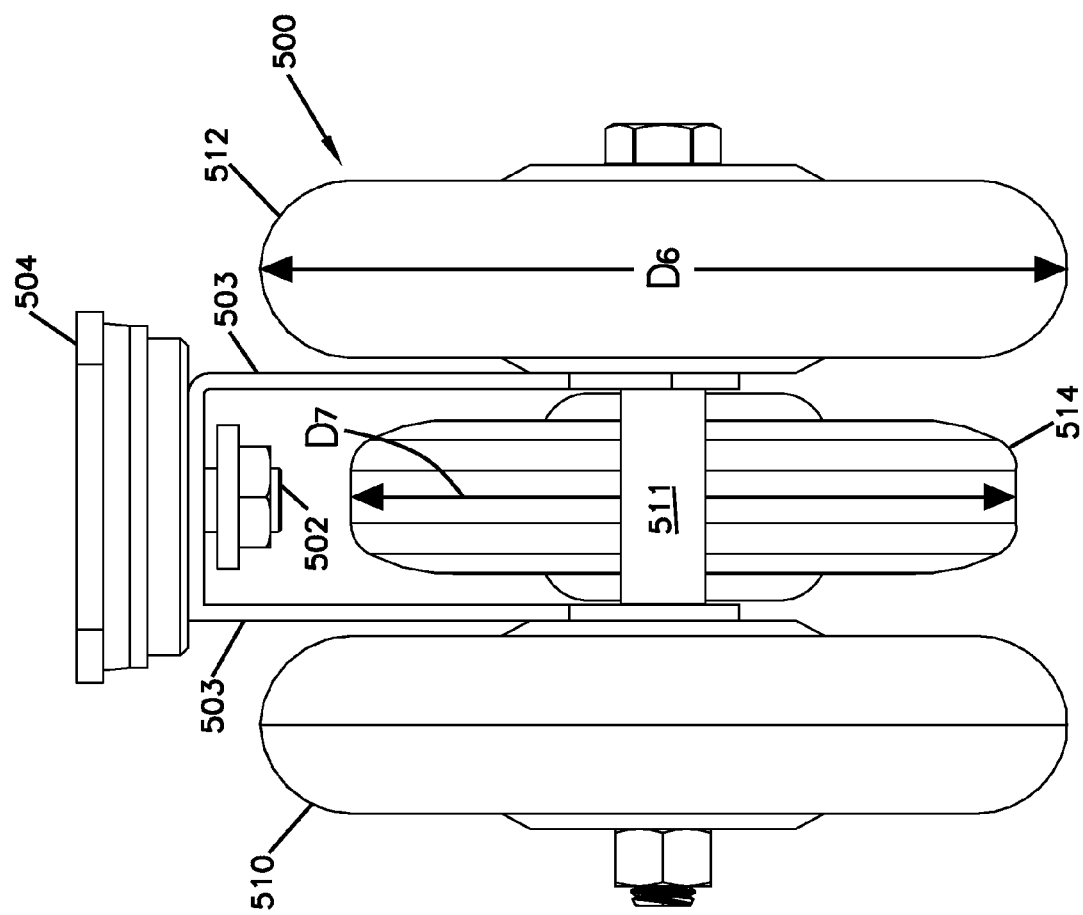
FIG. 34 is a rear elevational view of the caster wheel arrangement of FIG. 31.
Figure 35:
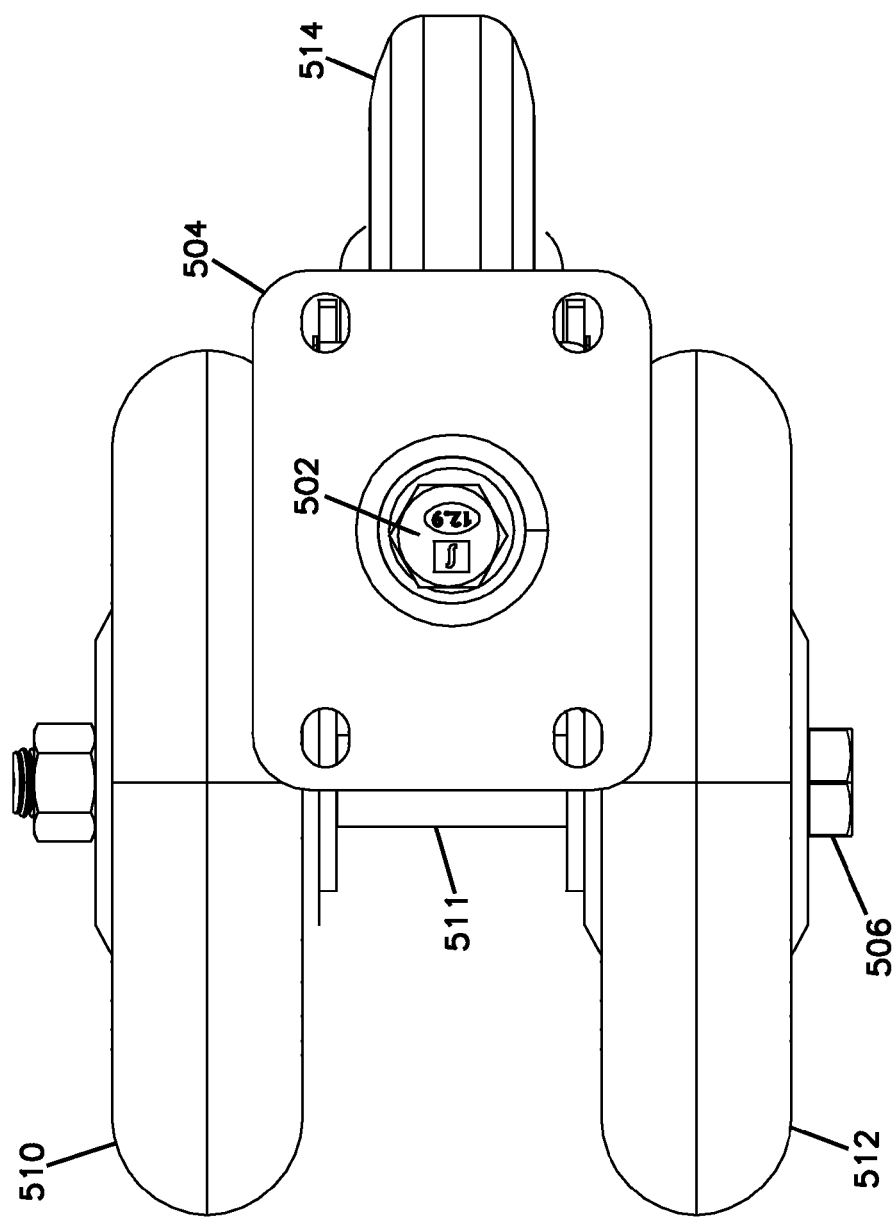
FIG. 35 is a top plan view of the caster wheel arrangement of FIG. 31.
Figure 36:
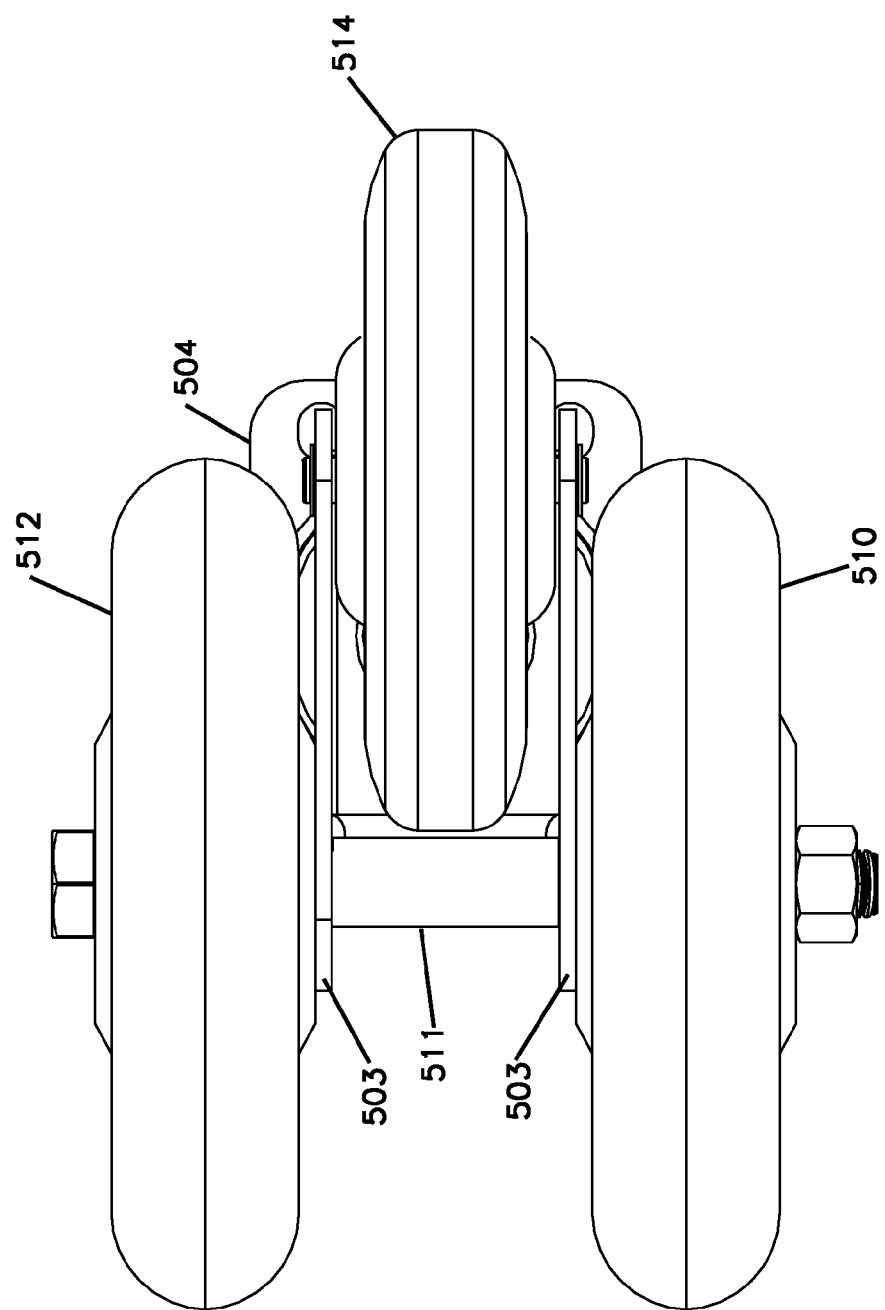
FIG. 36 is a bottom plan view of the caster wheel arrangement of FIG. 31.

In some implementations, the third wheel 514 has a different diameter $D_7$ from the diameter $D_6$ of the primary wheels 510, 512 (FIG. 34). Typically, the diameter $D_7$ of the third wheel 514 is smaller than the diameter $D_6$ of the primary wheels 510, 512. In some implementations, the diameter $D_7$ of the third wheel 514 is selected based on the size of the yoke 505 and the expected surface transition dimensions. In one example implementation, the diameter $D_6$ of the primary wheels 510, 512 is about six inches and the diameter $D_7$ of the third wheel 514 is about five inches.

The third wheel 514 rotates about a second rotation axis $A_{R8}$ (FIG. 33). The second rotation axis $A_{R8}$ extends generally parallel to, but displaced from, the first rotation axis $A_{R7}$ of the primary wheels 510, 512 (see FIG. 33). In different implementations, the second rotation axis $A_{R8}$ can be displaced horizontally and/or vertically from the first rotation axis $A_{R7}$. In some implementations, the second rotation axis $A_{R8}$ is positioned forward of and lower than the first rotation axis $A_{R7}$. In the example shown in FIG. 37, the second rotation axis $A_{R8}$ is located adjacent a forward edge of the primary wheels 510, 512.

In certain implementations, the position of the third wheel 514 relative to the primary wheels 510, 512 is selected so as to minimize the resistive force of the caster wheel arrangement 500 as the caster wheel arrangement 500 navigates the expected surface transition dimensions as will be discussed in more detail below.

Figure 37:
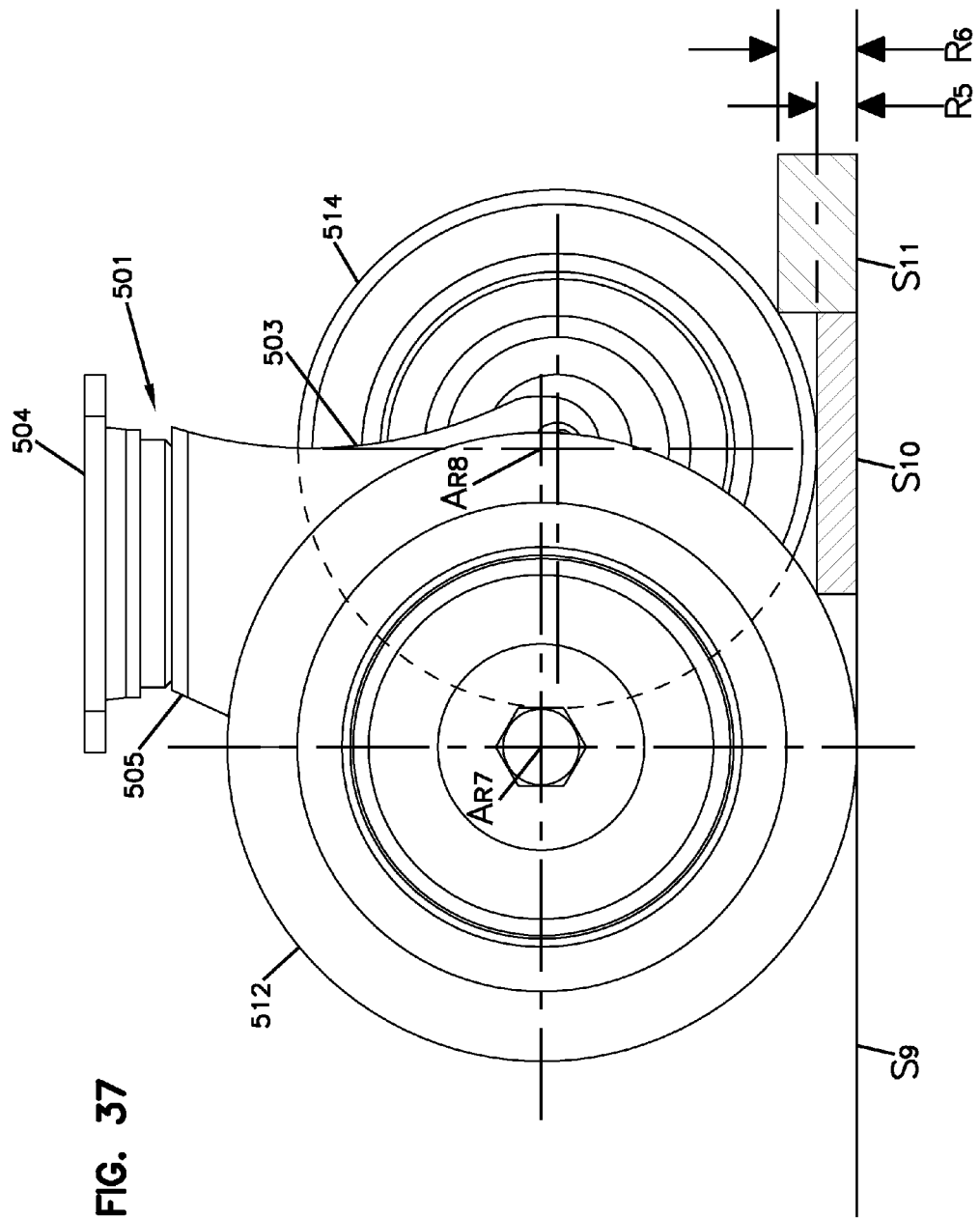
FIG. 37 is a side elevational view of the caster wheel arrangement of FIG. 31 transitioning a surface rise in accordance with the principles of the present disclosure.
Figure 38:
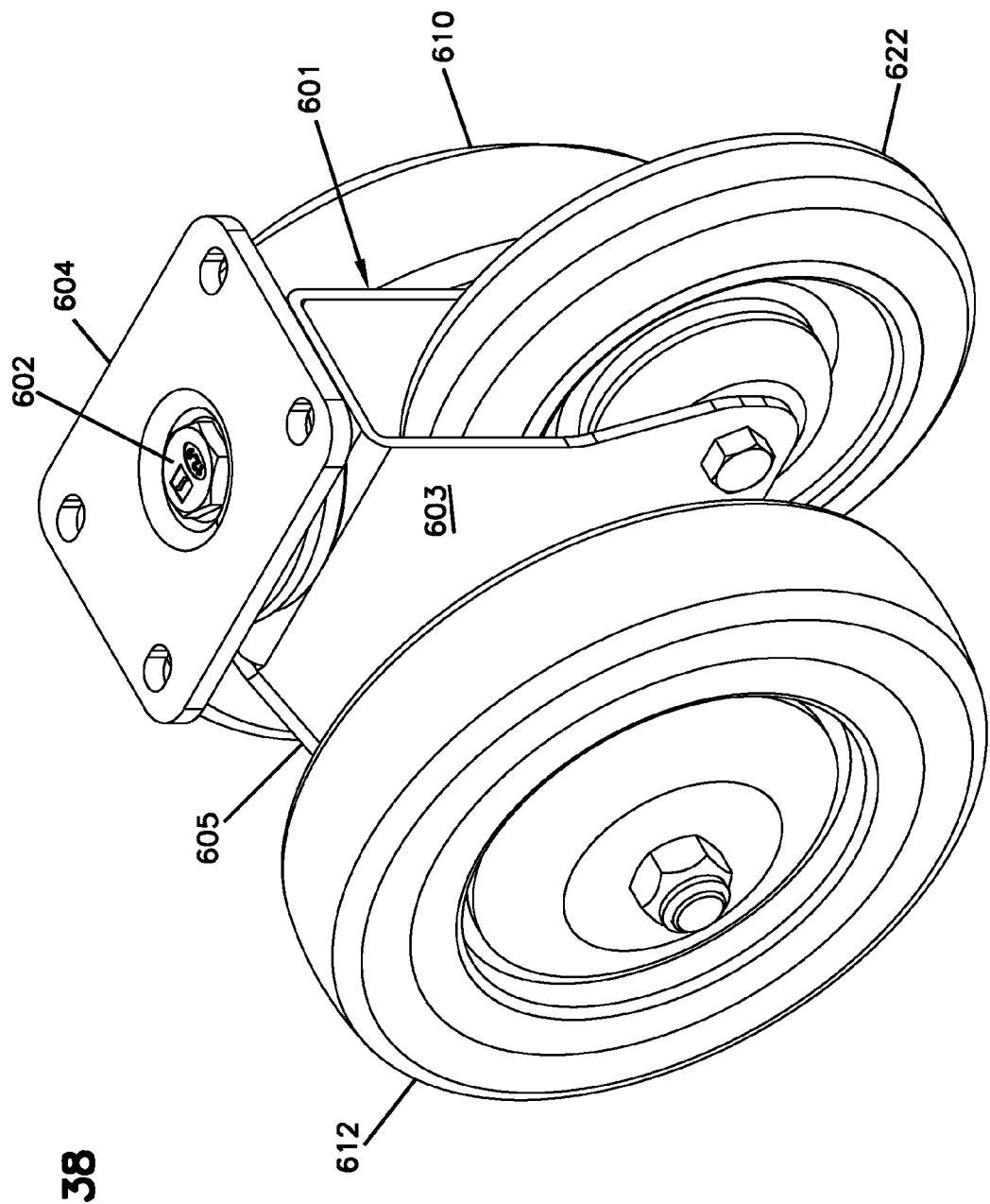
FIG. 38 is a front, top perspective view of another example caster wheel arrangement including a fifth example assist arrangement configured in accordance with the principles of the present disclosure.

FIG. 37 shows the caster wheel arrangement 500 attempting to travel over a height transition R between a first surface S9 and a second surface S10. When the leading wheel 514 contacts the step between the surfaces S9 and S10, the leading wheel 514 experiences a resistive force. However, since the leading wheel 514 is raised above the surface S9, less force is required to transition the leading wheel 514 onto the second surface S10. The horizontal vector component of the resistive force for the leading wheel 514 is smaller than the horizontal vector component of the resistive force for the primary wheels 510, 512. When the primary wheels 510, 512 reach the step between surfaces S9, S10, the leading wheel 514 has already transitioned the step. Accordingly, the leading wheel 514 raises the primary wheels 510, 512 off the surface S9. Accordingly, the force required to push the primary wheels 510, 512 over the step is less than it would have been without the leading wheel 514. The leading wheel 514 similarly aids the caster wheel arrangement 500 over the rise R6 from surface S10 to surface S11.

Figure 43:
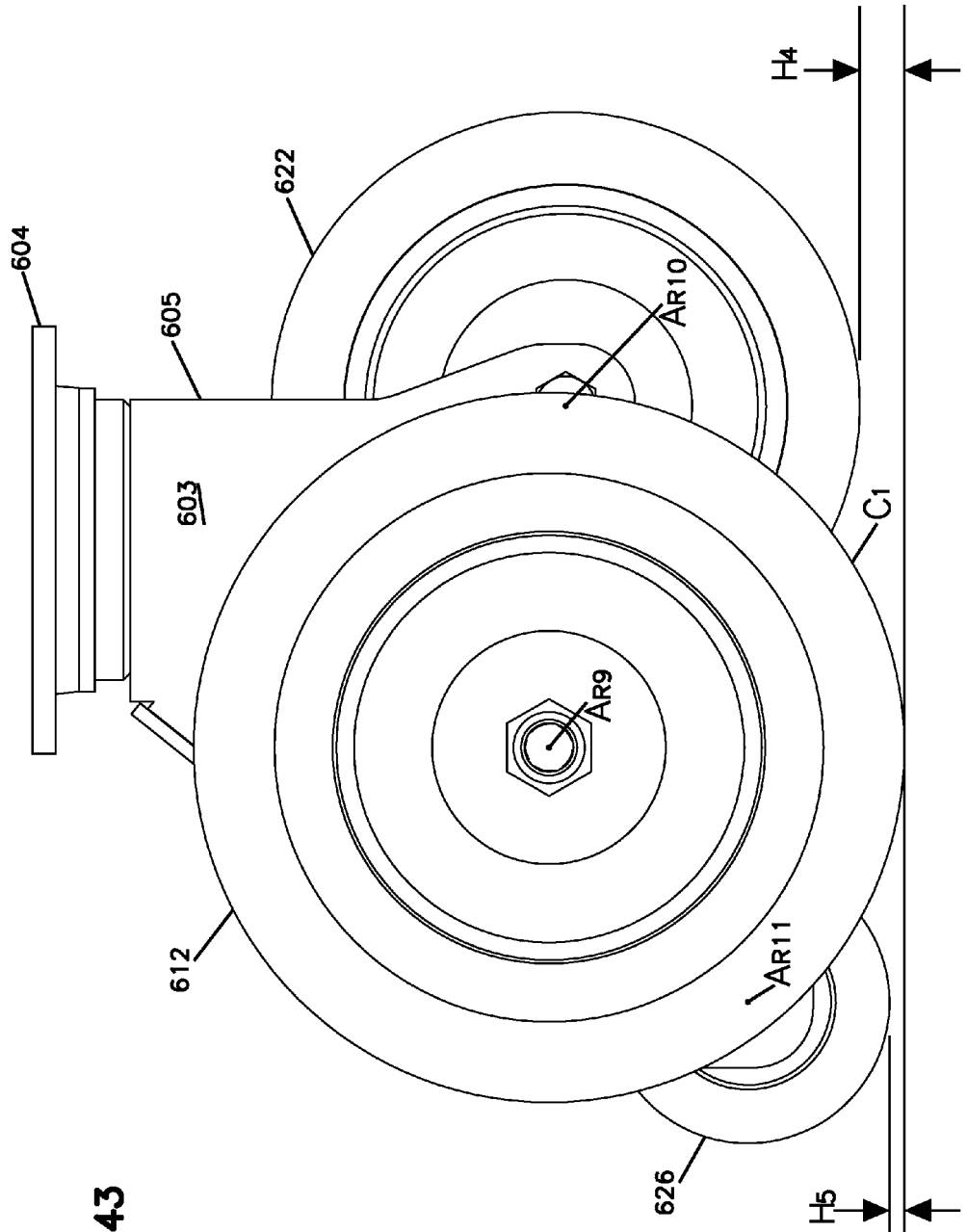
FIG. 43 is a side elevational view of the caster wheel arrangement of FIG. 38 positioned on a level surface.
Figure 44:
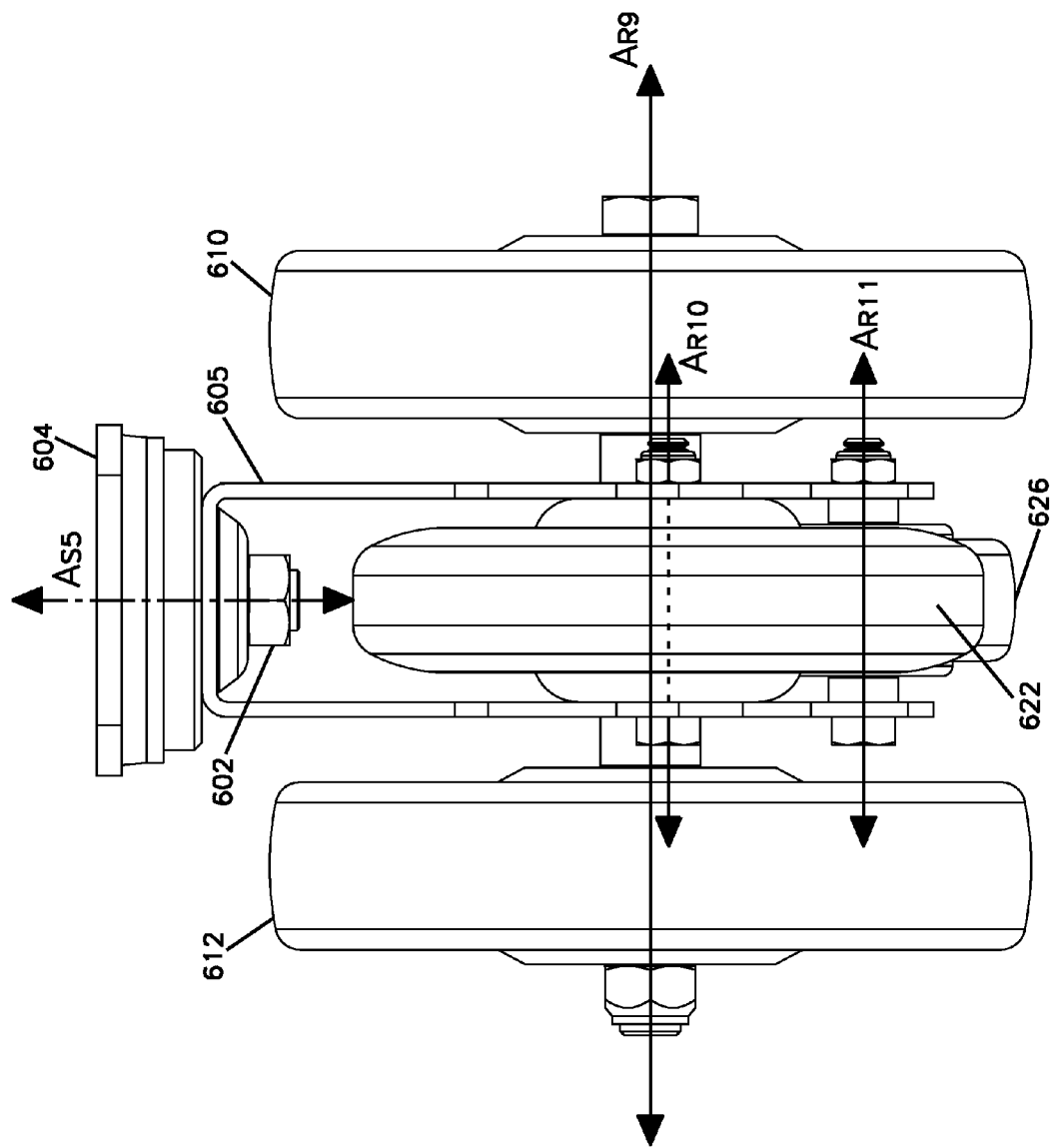
FIG. 44 is a front elevational view of the caster wheel arrangement of FIG. 38.
Figure 45:
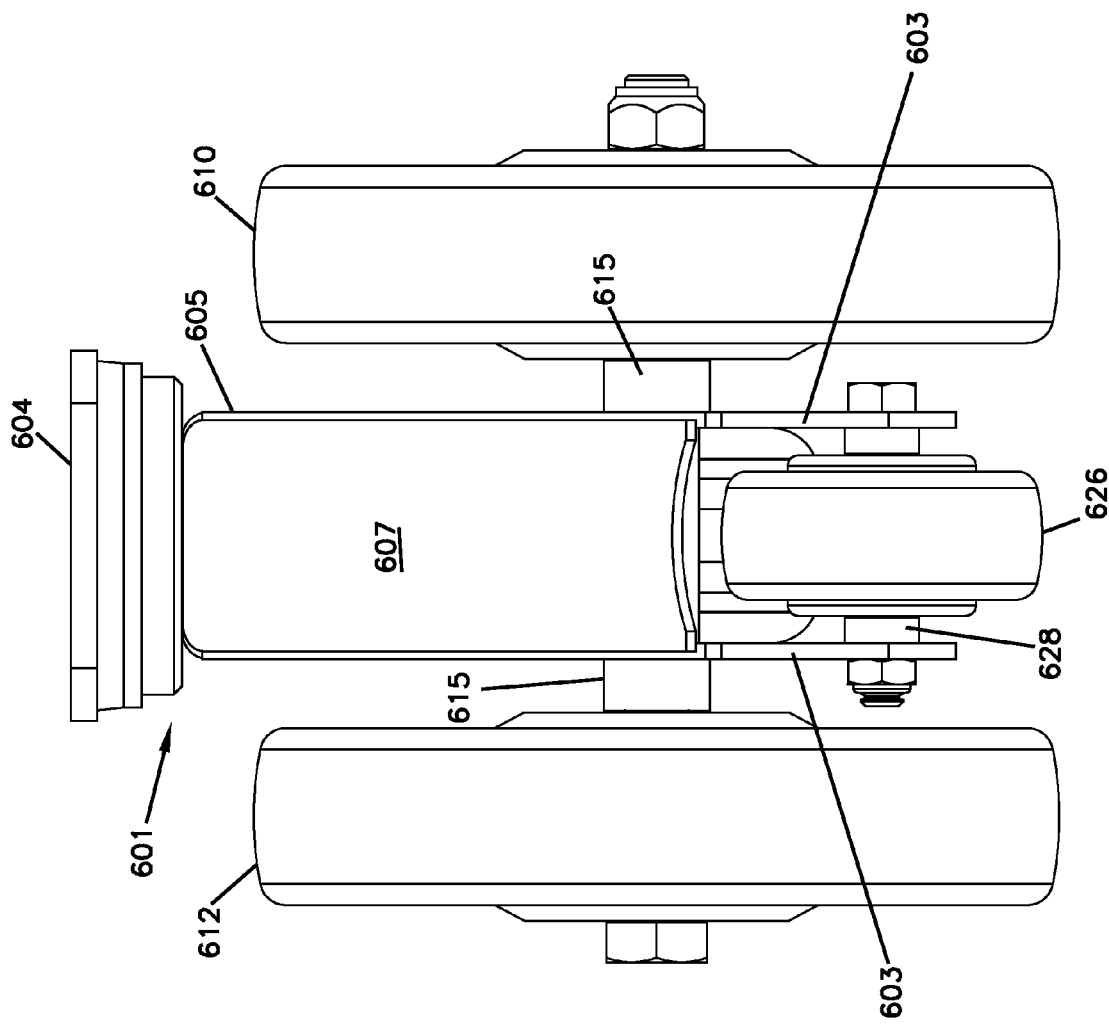
FIG. 45 is a rear elevational view of the caster wheel arrangement of FIG. 38.

FIGS. 38-47 illustrate a fifth example caster wheel arrangement 600 including an example assist arrangement 620 (FIG. 41) configured in accordance with the principles of the disclosure. The fifth caster wheel arrangement 600 includes at least a first primary wheel 610 mounted to a support frame 601 to rotate about a rotation axis $A_{R9}$ (FIG. 44). The support frame 601 includes a yoke 605 that is mounted to a base 604 via a kingpin 602 so as to enable the yoke 605 to spin about the kingpin 602 relative to the base 604. One example spin axis $A_{S5}$ about which the yoke 605 spins is shown in FIG. 45. In some implementations, the kingpin 602 and/or other axles attached to the support frame 601 include ball bearings to aid in rotation.

Figure 39:
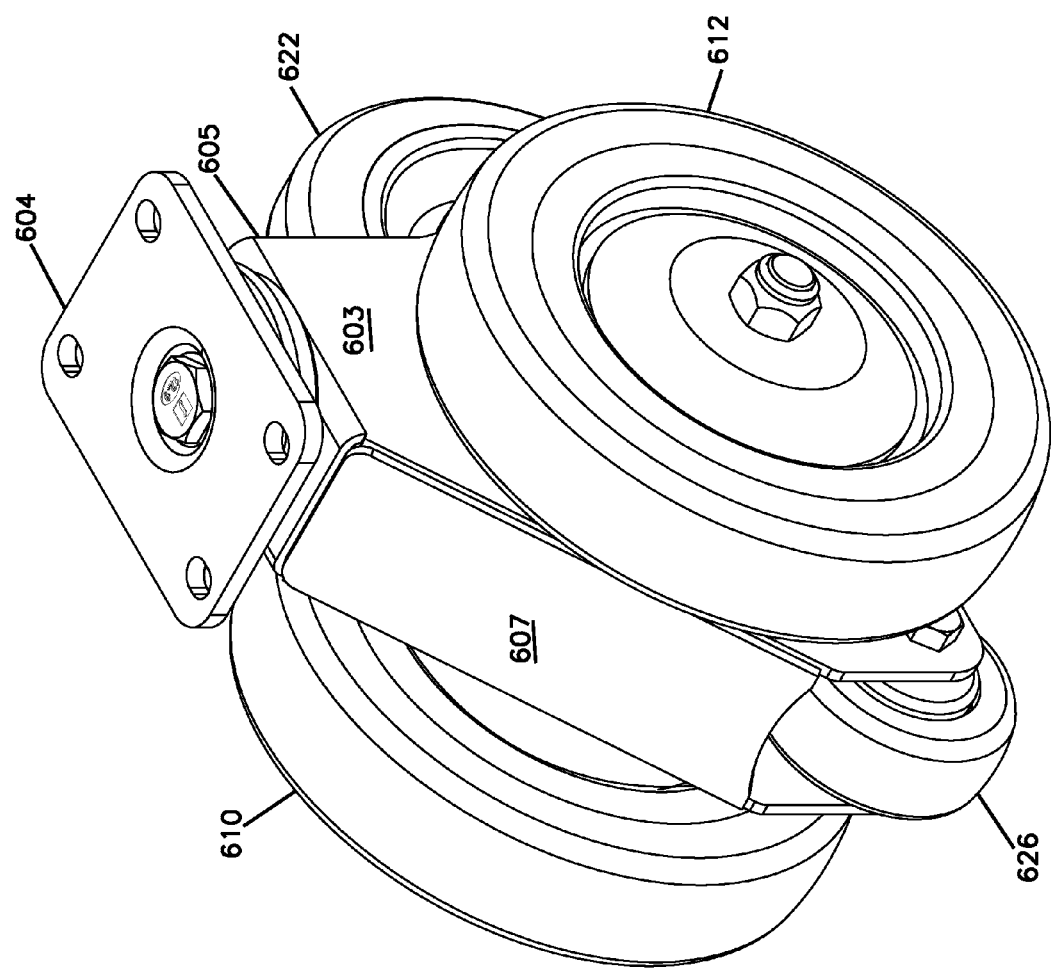
FIG. 39 is a rear, top perspective view of another example caster wheel arrangement including a fifth example assist arrangement configured in accordance with the principles of the present disclosure.

The yoke 605 includes two spaced, generally parallel legs 603 that extend downwardly from a top that couples to the base 604. In some implementations, a sloped surface 607 extends between at least a portion of the legs 603 at a rearward portion of the yoke 605 (FIG. 39). In other implementations, however, the legs 603 can be interconnected by strips, ribs, or other interrupted surfaces. In still other implementations, the legs 603 may be connected only at the top of the yoke 605. The top, legs 603, and sloped surface 607 of the yoke 605 define an inner space within which the third example assist arrangement 620 can be mounted (e.g., see FIGS. 41 and 42).

In some implementations, first and second primary wheels 610, 612 are rotatably mounted to the support frame 601 via one or more axles. For example, in some implementations, the first and second primary wheels 610, 612 are cantilevered off exterior sides of the legs 603. In other implementations, a caster wheel axle 613 extends between the legs 603. The first and second primary wheels 610, 612 are mounted to ends of the axle 613 extending outwardly from the legs 603. A sleeve 611 may be mounted over the axle 613 between the legs 603 to protect the axle 613. Buffers 615 may be mounted over the axle 613 between the wheels 610, 612 and the yoke 605. In the example shown, a nut 614 threads over one end of the axle 613 to secure the primary wheels 610, 612 to the yoke 605. In other implementations, the first and second primary wheels 610, 612 can be mounted to the axle 613 within the space defined by the yoke legs 603.

In general, the fifth example assist arrangement 620 may facilitate navigating surface transitions (e.g., gaps and/or rises). The fifth example assist arrangement 620 includes a leading wheel 622 and a trailing wheel 626 that are mounted to the yoke 605. The leading wheel 622 and the trailing wheel 626 can inhibit the amount by which the primary wheels 610, 612 fall into a gap in a level surface. The leading wheel 622 and the trailing wheel 624 also can aid in transitioning a rise in a surface.

In accordance with some aspects, the leading wheel 622 and the trailing wheel 626 are positioned at a height $H_4$, $H_5$, respectively, relative to the ground when the primary wheels 610, 612 are traveling over a level surface with no gap (e.g., see FIG. 43). Accordingly, neither the leading wheel 622 nor the trailing wheel 626 inhibits the maneuverability of the caster wheel arrangement 600 and, hence, a cart 700 to which the caster wheel arrangement 600 is mounted (e.g., see FIGS. 48-51). For example, the caster assist arrangement 620 will not affect the swivel radius of the caster arrangement 600 when neither the leading wheel 622 nor the trailing wheel 626 is touching the ground.

In some implementations, the leading wheel 622 is raised about 0-1 inches off the ground. In certain implementations, the leading wheel 622 is raised about ¼ of an inch to ½ of an inch off the ground. In some implementations, the trailing wheel 626 is raised about zero to one (0-1) inches off the ground. In certain implementations, the trailing wheel 626 is raised about 0.1 to 0.5 inches off the ground. For example, in one implementation, the leading wheel 622 can be raised about $\frac{3}{8}^{th}$ of an inch off the ground and the trailing wheel 626 can be raised about $\frac{1}{8}^{th}$ of an inch off the ground. In other implementations, however, the leading and trailing wheels 622, 626 can be raised more or less off the ground.

In some implementations, the leading wheel 622 is positioned at least partially between the first and second primary wheels 610, 612. For example, the leading wheel 622 can be mounted between the legs 603 of the yoke 605 at a forward portion of the yoke 605. In the example shown, one or more fasteners (e.g., screws, bolts, rivets, pins, etc.) 621 mount through the leading wheel 622 and through openings 608 defined in the forward portion of the yoke legs 603 (e.g., see FIG. 40). A nut 623 is configured to thread onto a distal end of bolt 621 to secure the leading wheel 622 to the yoke 605. In other implementations, a leading wheel 622 can be positioned in the same plane as one of the primary wheels 610, 612.

The leading wheel 622 rotates about a second rotation axis $A_{R10}$ (FIG. 44). The second rotation axis $A_{R10}$ of the leading wheel 622 extends generally parallel to, but displaced from, the first rotation axis $A_{R9}$ of the first and second primary wheels 610, 612. In various implementations, the second rotation axis $A_{R10}$ can be displaced horizontally and/or vertically from the first rotation axis $A_{R9}$. Generally, the openings 608 at which the leading wheel 622 mounts are located at a forward portion of the yoke 605 and the openings 606 at which the primary wheels 610, 612 mount are located at an intermediate portion of the yoke 605. In certain implementations, the openings 608 at which the leading wheel 622 mounts to the yoke 605 can be raised or lowered relative to the openings 606 through which the primary wheels 610, 612 mount to the yoke 605. In the example shown, the openings 608 are lowered, thereby lowering the second rotation axis $A_{R10}$ (see FIG. 44).

In some implementations, the position of the leading wheel 622 relative to the primary wheels 610, 612 is selected so as to minimize the resistive force of the caster wheel arrangement 600 as the caster wheel arrangement 600 navigates the expected surface transition dimensions as will be discussed in more detail below.

In some implementations, the trailing wheel 626 also is positioned at least partially between the first and second wheels 610, 612. For example, the trailing wheel 626 can be mounted between the legs 603 of the yoke 605 at a rearward portion of the yoke 605 (see FIG. 40). In certain implementations, the rearward portion of the yoke 605 extends downwardly closer to the ground than the forward portion of the yoke 605. For example, rearward portions of the legs 603 of the yoke 605 may extend downwardly past the downward edge of the sloped member 607.

Figure 40:
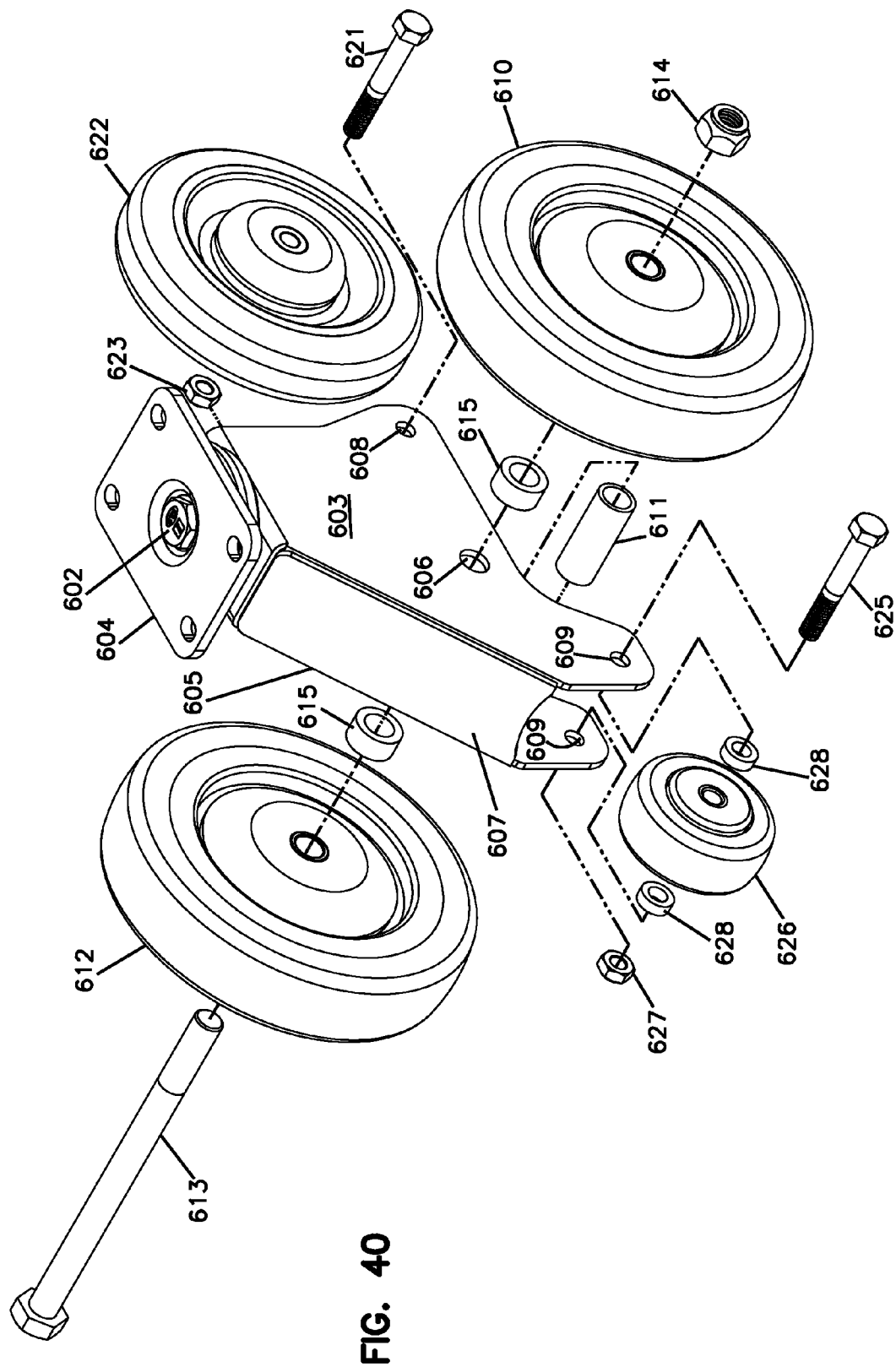
FIG. 40 is an exploded, perspective view of the caster wheel arrangement of FIG. 38 in which the various parts are visible.

In the example shown, one or more fasteners (e.g., bolts, screws, etc.) 625 mount through an opening in the trailing wheel 626 and through openings 609 in the rearward portion of the yoke 605 (see FIG. 40). A nut 627 or other holder threads to an end of the bolt 625 to secure the trailing wheel 626 to the yoke 605. In certain implementations, buffers 628 may secure to either side of the trailing wheel 626 within the yoke 605 (e.g., see FIG. 44).

The trailing wheel 626 rotates about a third rotation axis $A_{R11}$ (see FIG. 44). The third rotation axis $A_{R11}$ extends generally parallel to, but displaced from, the first rotation axis $A_{R9}$ of the first and second primary wheels 610, 612. The third rotation axis $A_{R11}$ also extends generally parallel to, but displaced from, the second rotation axis $A_{R10}$ of the leading wheel 622. In various implementations, the third rotation axis $A_{R11}$ can be displaced horizontally and/or vertically from the first rotation axis $A_{R9}$. In the example shown, the axis of rotation $A_{R11}$ of the trailing wheel 626 is positioned lower than either the axis of rotation $A_{R9}$ of the primary wheels 610, 612 or the axis of rotation $A_{R10}$ of the leading wheel 622.

In some implementations, the position of the trailing wheel 626 relative to the primary wheels 610, 612 is selected so as to minimize the resistive force of the caster wheel arrangement 600 as the caster wheel arrangement 600 navigates the expected surface transition dimensions as will be discussed in more detail below.

In accordance with some aspects, suitable example caster wheels 610, 612 have a diameter $D_8$ (FIG. 46) ranging between about one inch and about eight inches. In accordance with certain aspects, suitable example caster wheels 610, 612 have a diameter $D_8$ ranging from about four inches to about seven inches. In one example implementation, suitable example caster wheels 610, 612 have a diameter $D_8$ of about five inches. In another example implementation, suitable example caster wheels 610, 612 have a diameter $D_8$ of about six inches.

Figure 46:
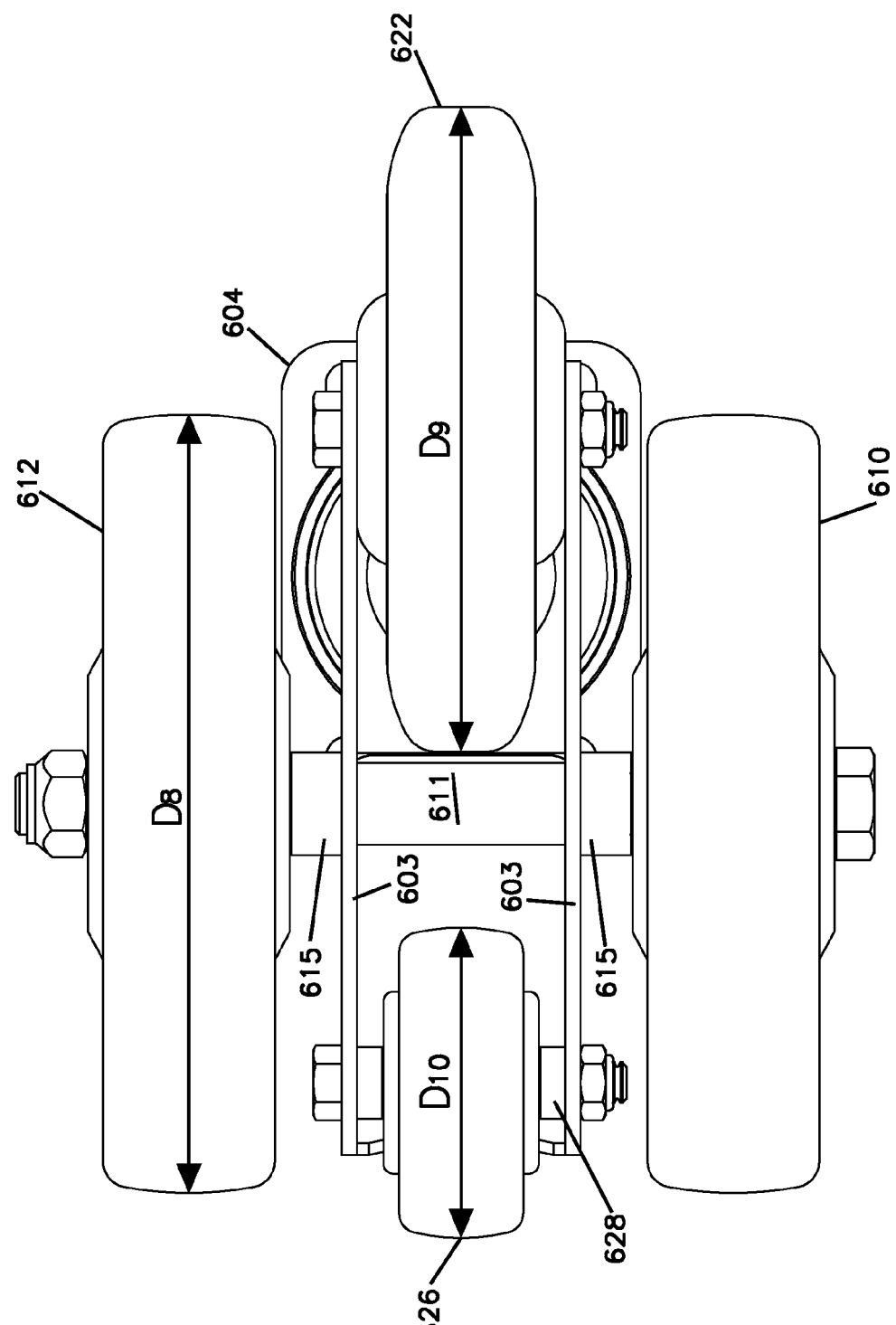
FIG. 46 is a bottom plan view of the caster wheel arrangement of FIG. 38.

The diameter and position of the third example wheel assist arrangement 620 is selected to minimize the horizontal component of the resistive force generated when the wheel arrangement 600 transitions over a gap and/or a rise. In some implementations, the leading wheel 622 has a different diameter $D_9$ from a diameter $D_8$ of the first and second wheels 610, 612 (FIG. 46). Typically, the diameter $D_9$ of the leading wheel 622 is smaller than the diameter $D_8$ of the first and second wheels 610, 612. In some implementations, the trailing wheel 626 has a different diameter $D_{10}$ from a diameter $D_8$ of the first and second primary wheels 610, 612 and from the diameter $D_9$ of the leading wheel 622 (FIG. 46). Typically, the diameter $D_{10}$ of the trailing wheel 626 is smaller than the diameter $D_8$ of the first and second primary wheels 610, 612. In certain implementations, the diameter $D_{10}$ of the trailing wheel 626 also is smaller than the diameter $D_9$ of the leading wheel 622.

In some implementations, the diameter $D_9$ of the leading wheel 622 and the diameter $D_{10}$ of the trailing wheel 626 are selected based on the size of the yoke 605 and the expected surface transition dimensions as will be discussed in more detail below. For example, in one implementation, the diameter $D_9$ can be selected to be the largest diameter that will fit at the forward portion of an existing yoke 605 without interfering with the axle 613 of the primary wheels 610, 612. In another implementation, the diameters $D_9$ and $D_{10}$ of the leading and trailing wheels 622, 626 can be selected to be the largest diameters that will fit within the yoke 605 without contacting the ground when the wheel arrangement 600 is positioned on a generally flat surface. In one example implementation, the diameter $D_8$ of the first and second primary wheels 610, 612 is about six inches, the diameter $D_9$ of the leading wheel 622 is about five inches, and the diameter $D_{10}$ of the trailing wheel 626 is about three inches.

In accordance with certain aspects, the leading wheel 622 is positioned so that the second rotation axis $A_{R10}$ is located a first distance off the ground and the trailing wheel 626 is positioned so that the third rotation axis $A_{R11}$ is located at a second distance off the ground. In certain implementations, the first distance is greater than the second distance (e.g., see FIG. 44). In general, each distance is selected to minimize the horizontal resistive force over a desired range of height transitions, while considering that a gap in the ground surface adds to the height transition. In one implementation, the second rotation axis $A_{R10}$ of the leading wheel 622 is located closer to the ground than the first rotation axis $A_{R9}$ of the primary wheels 610, 612 and the third rotation axis $A_{R11}$ of the trailing wheel 626 is located closer to the ground than the second rotation axis $A_{R10}$ of the leading wheel 622. In other implementations, the second rotation axis $A_{R10}$ can be positioned above the first rotation axis $A_{R9}$ and/or the third rotation axis $A_{R11}$ can be positioned above the second rotation axis $A_{R10}$.

In accordance with some aspects, the leading wheel 622 is positioned so that the second rotation axis $A_{R10}$ is located forwardly of the first rotation axis $A_{R9}$ of the primary wheels 610, 612 (see FIG. 43). In some implementations, forward portions of the legs 603 of the yoke 605 extend forwardly of the top part of the yoke 605. The leading wheel 622 is mounted to these forward portions (see FIG. 43). In one example implementation, the leading wheel 622 is positioned far enough forward of the primary wheels 610, 612 so that the second rotation axis $A_{R10}$ intersects or extends adjacent to the circumference C1 of the primary wheels 610, 612 when viewed from a side elevational view (e.g., see FIG. 43). In one example implementation, the second rotation axis $A_{R10}$ extends a distance ranging from about $\frac{1}{8}^{th}$ of an inch to about half an inch away from the circumference C1 of the primary wheels 610, 612. In other implementations, the leading wheel 622 is positioned even further forward or rearward on the yoke 605 relative to the primary wheels 610, 612.

In accordance with some aspects, the trailing wheel 626 is positioned so that the third rotation axis $A_{R11}$ is located rearwardly of the first rotation axis $A_{R9}$ of the primary wheels 610, 612. In one example implementation, the trailing wheel 626 is positioned sufficiently rearward of the primary wheels 610, 612 so that the trailing wheel 626 does not interact with the leading wheel 622, even if the leading and trailing wheels 622, 626 are aligned in the same plane (e.g., see FIG. 46). For example, the trailing wheel 626 can be positioned to allow a gap E (FIG. 42) between the leading and trailing wheels 622, 626. The gap E can range from about 0.1 inches to about 1.5 inches. In certain implementations, the gap E ranges from about 0.5 inches to about 1 inch. In other implementations, the trailing wheel 626 can be positioned even further rearward of the leading wheel 622.

Figure 47:
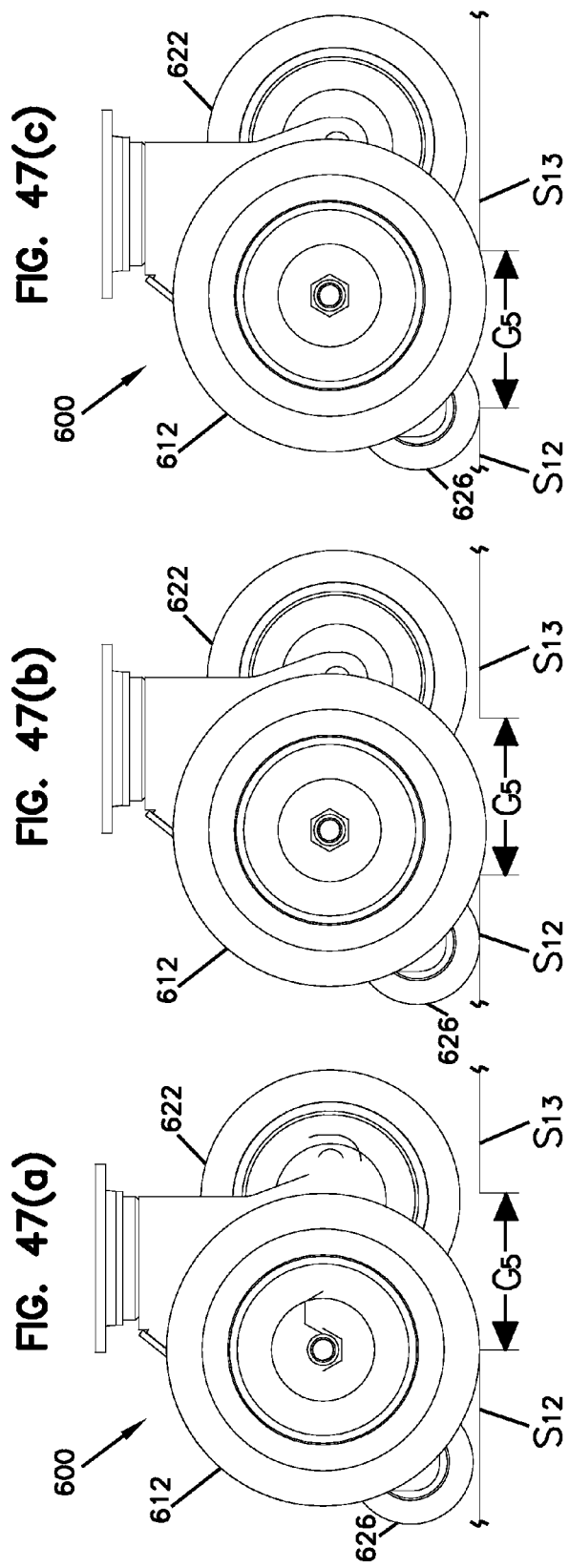
FIG. 47 illustrates the caster wheel arrangement of FIG. 38 transitioning over a gap between two generally level surfaces in accordance with the principles of the present disclosure.
Figure 48:
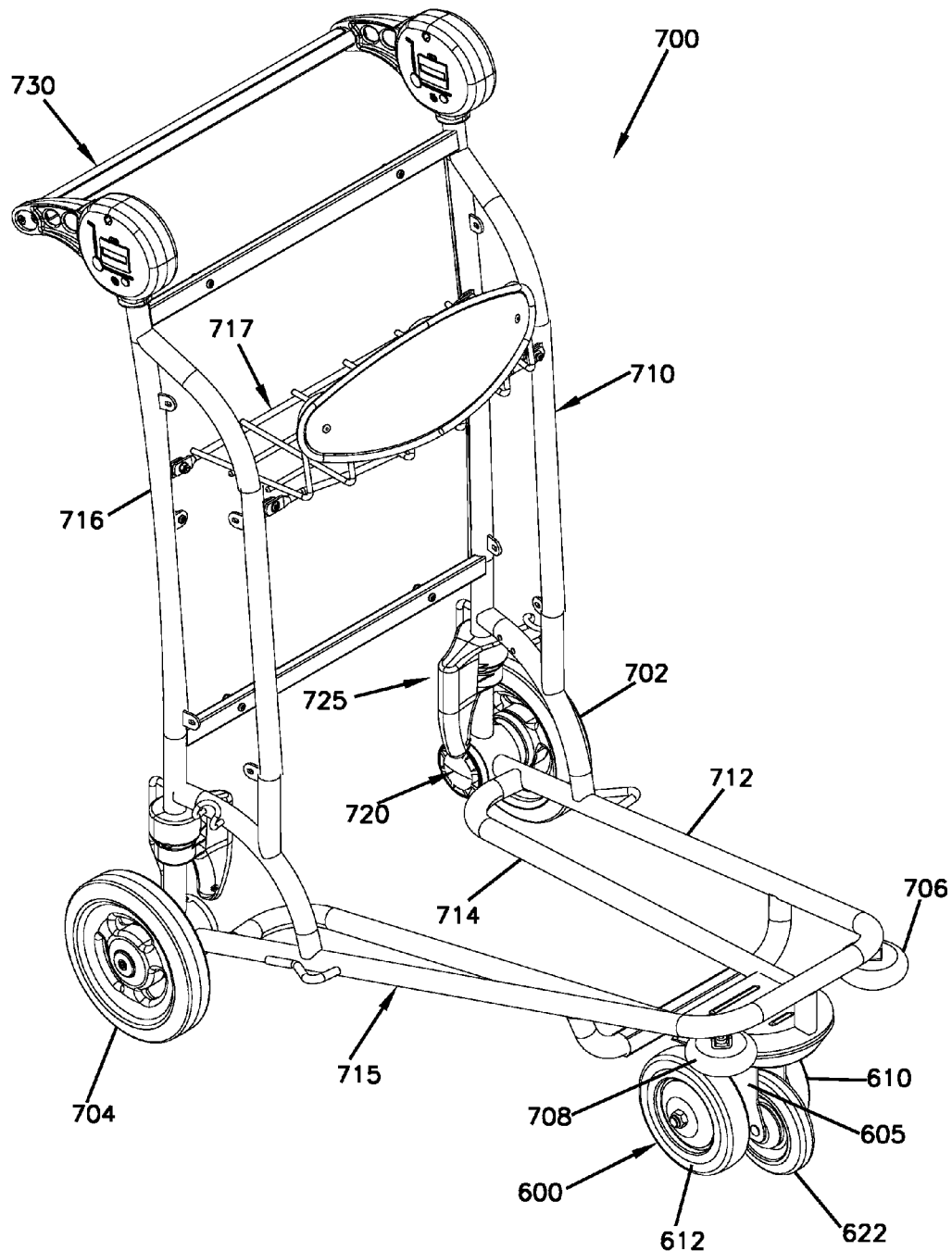
FIG. 48 is a front, top perspective view of an example cart including at least one caster wheel arrangement in accordance with the principles of the present disclosure.

FIG. 47 shows some advantages of adding the third example wheel assist arrangement 620 to the caster wheel arrangement 600 when the caster wheel arrangement 600 is transitioning a gap $G_5$ between a first surface $S_{12}$ and a second surface $S_{13}$. In FIG. 47, the second surface $S_{13}$ is level with the first surface $S_{12}$. The gap $G_5$ is sufficiently wide so that the primary wheels 610, 612 would drop into the gap $G_5$ to create a rise between the surfaces (e.g., see FIG. 1 and corresponding text). For example, in some implementations, the width of the gap $G_5$ is at least a quarter of the diameter $D_9$ of the primary wheels 610, 612. In certain implementations, the width of the gap $G_5$ is about half of the diameter $D_9$ of the primary wheels 610, 612. In other implementations, the width of the gap $G_5$ may be even greater.

A user pushes a cart or other vehicle to which the caster arrangement 600 is mounted forward along the first surface $S_{12}$ to the gap $G_5$. The user begins to transition the cart over the gap $G_5$ by pushing the cart forward as the leading wheel 622 crosses the gap $G_5$. For example, in FIG. 47(a), the leading wheel 622 of the caster wheel arrangement 600 extends over the gap $G_5$. The leading wheel 622 is raised above the first and second surfaces $S_{12}$, $S_{13}$. The primary wheels 610, 612 fully support the caster wheel arrangement 600 on the first surface $S_{12}$ and the trailing wheel 626 also is raised off the first surface $S_{12}$.

As the user continues to push the cart forward, the primary wheels 610, 612 of the caster wheel arrangement 600 may begin to sink into the gap $G_5$. For example, in FIG. 47(b), the primary wheels 610, 612 is crossing the edge of the first surface $S_{12}$ and has sunken a small amount into the gap $G_5$. The primary wheels 610, 612 sink sufficiently to lower the trailing wheel 626 to the first surface $S_{12}$. Accordingly, the trailing wheel 626 supports the caster wheel arrangement 600 at least partially on the first surface $S_{12}$ as the first primary wheels 610, 612 are moved forwardly over the gap $G_5$.

As the user continues to push the cart forward, the primary wheels 610, 612 of the caster wheel arrangement 600 reach the edge of the second surface $S_{13}$. For example, in FIG. 47(c), forward portions of the primary wheels 610, 612 contact the second surface $S_{13}$ and begin to lift the caster wheel arrangement 600 out of the gap $G_5$. In some implementations, the primary wheels 610, 612 support the caster wheel arrangement 600 at least partially on the second surface $S_{13}$ until the trailing wheel 626 reaches the gap $G_5$. In other implementations, the primary wheels 610, 612 raise the caster wheel arrangement 600 upward sufficiently to lift the trailing wheel 626 off the first surface $S_{12}$ while the caster wheel arrangement 600 is still transitioning the gap $G_5$. The primary wheels 610, 612 fully support the caster wheel arrangement 600 as the trailing wheel 626 is moved forwardly over the gap $G_5$.

Adding the wheel assist arrangement 620 produces the effect of larger primary wheels, thereby decreasing how far the caster 600 will fall into the gap $G_5$ without increasing the force necessary to propel or steer the caster arrangement 600. Decreasing the rise resulting from the caster 600 dropping into the gap $G_5$ allows for an easy transition across the gap $G_5$. For example, when a three inch trailing wheel 626, which is raised off the ground by $\frac{1}{8}^{th}$ of an inch, is added to six inch primary wheels 610, 612, the effective diameter size of the caster wheel arrangement becomes about eighteen inches. Such a caster diameter facilitates traversing gaps $G_5$ of up to at least four inches. For example, such a caster diameter facilitates traversing a three inch gap $G_5$. Raising or lowering the trailing wheel 626 can change the amount by which the effective diameter is increased.

FIGS. 48-51 shows another example baggage cart 700 including the fifth caster wheel arrangement 600 at a front end and two larger wheels 702, 704 at a rear end of a frame 710. In some implementations, the rearward wheels 702, 704 are cantilevered on the frame 710. The cart frame 710 includes a lower section 715 that is configured to hold at least one object. In the example shown, the lower section 715 includes frame members 712, 714 that define a holding area for luggage or other objects. The frame 710 also includes support members 716 extending upwardly from the lower section 715. A basket 717 may be provided on the upper portion of the frame 710. A steering handle 730 is attached to a top of the cart frame 710 (e.g., at a top of the support members 716).

In some implementations, a cart 700 includes a brake assembly 720 for each of the rearward wheels 702, 704. When actuated, the brake assemblies 720 inhibit the rearward wheels 702, 704 from spinning, thereby providing a braking function for the cart 700. In some implementations, the handle 730 controls actuation of the brake assemblies 720. For example, in some implementations, the brake assemblies 720 normally brake the cart 700 until a user presses downwardly on the handle 730. The cart 700 also may include a brake release device 725 that releases the rear wheels 702, 704 even when the handle 730 is not depressed. Further details regarding suitable types of brake assemblies 720 and brake release devices 725 may be found in U.S. Pat. No. 7,448,476, issued Nov. 11, 2008, titled Brake Assembly and Control Mechanism for a Cart, and Method, the disclosure of which is hereby incorporated herein by reference.

Figure 49:
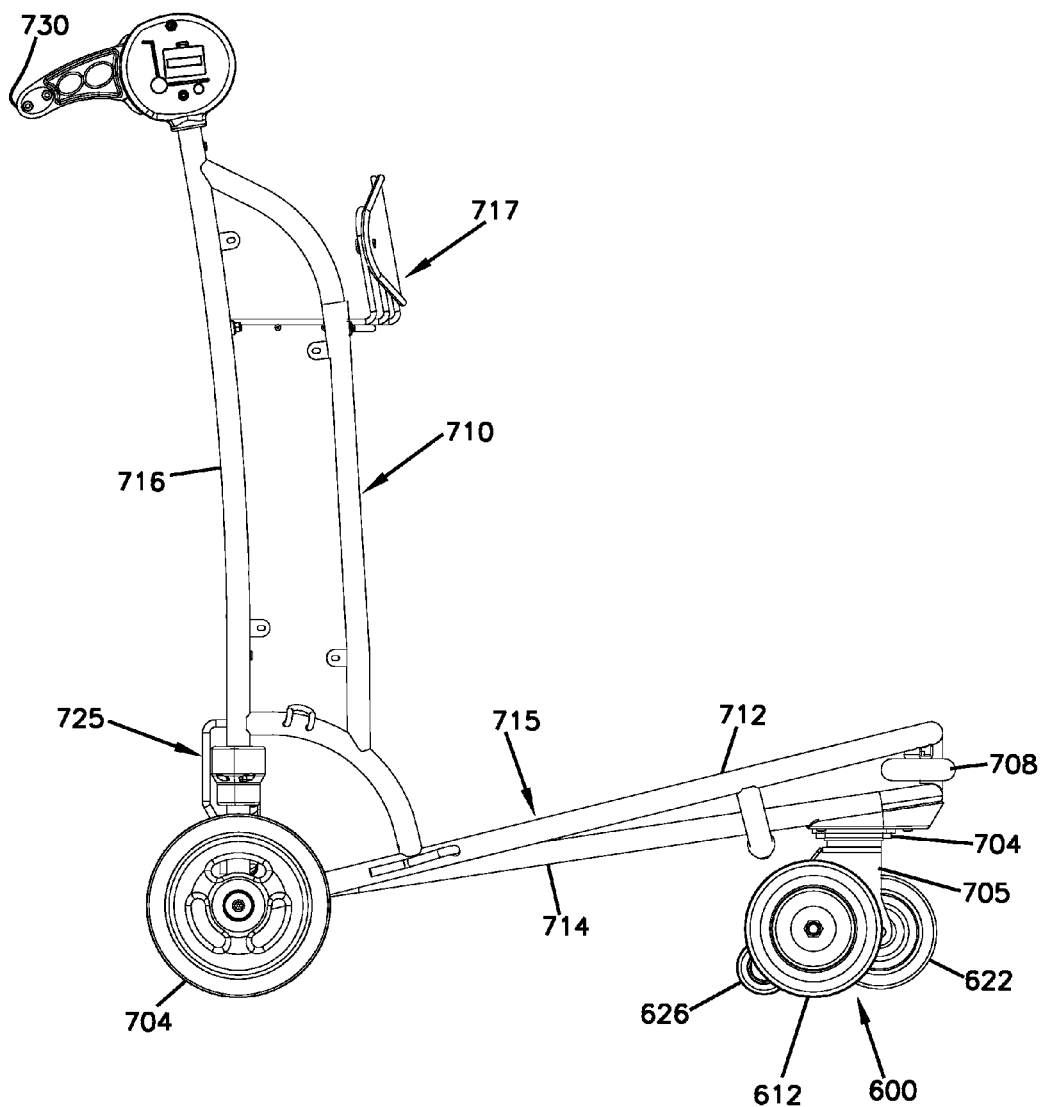
FIG. 49 is a side elevational view of the cart of FIG. 48.
Figure 50:
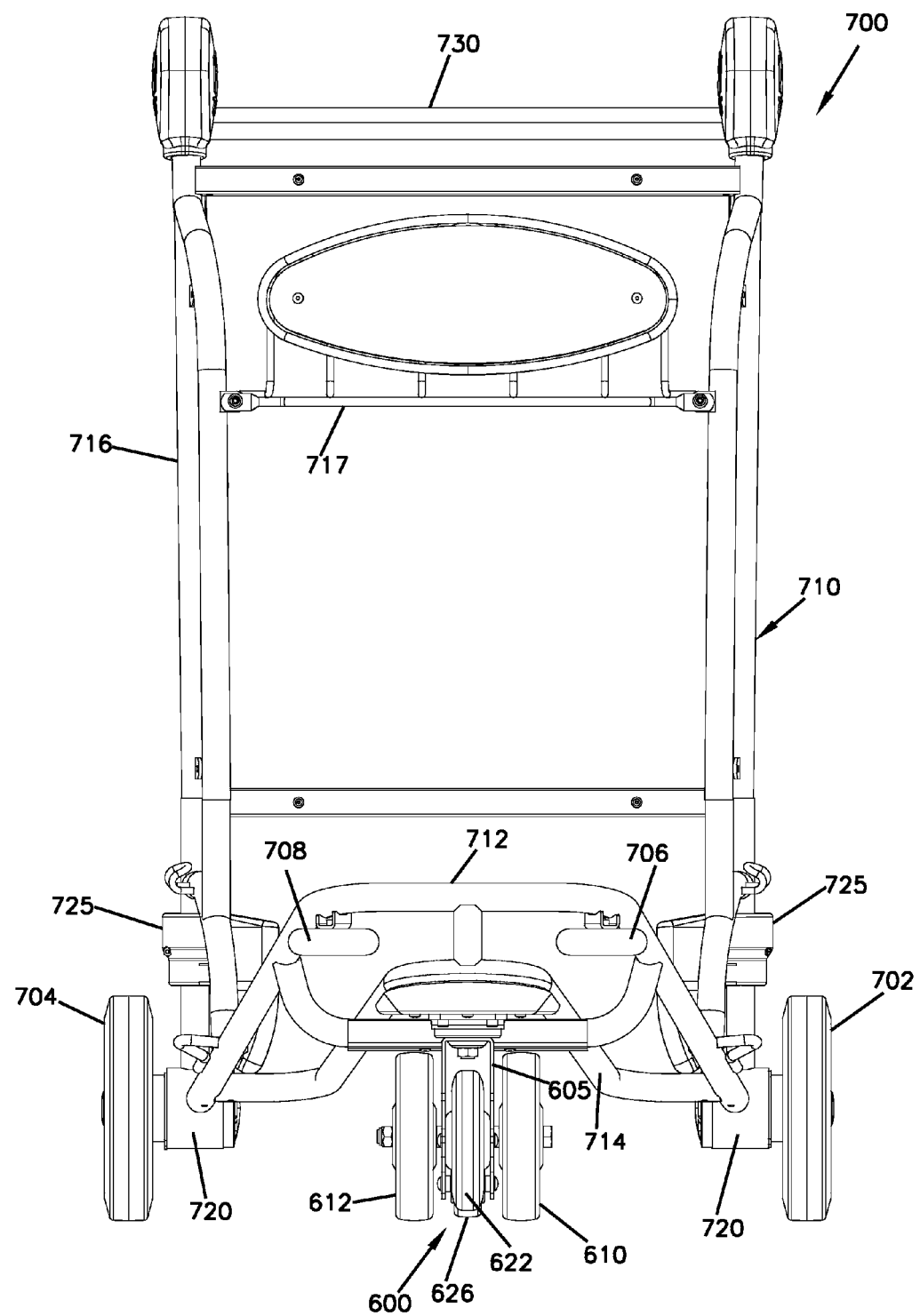
FIG. 50 is a front elevational view of the cart of FIG. 48.
Figure 51:
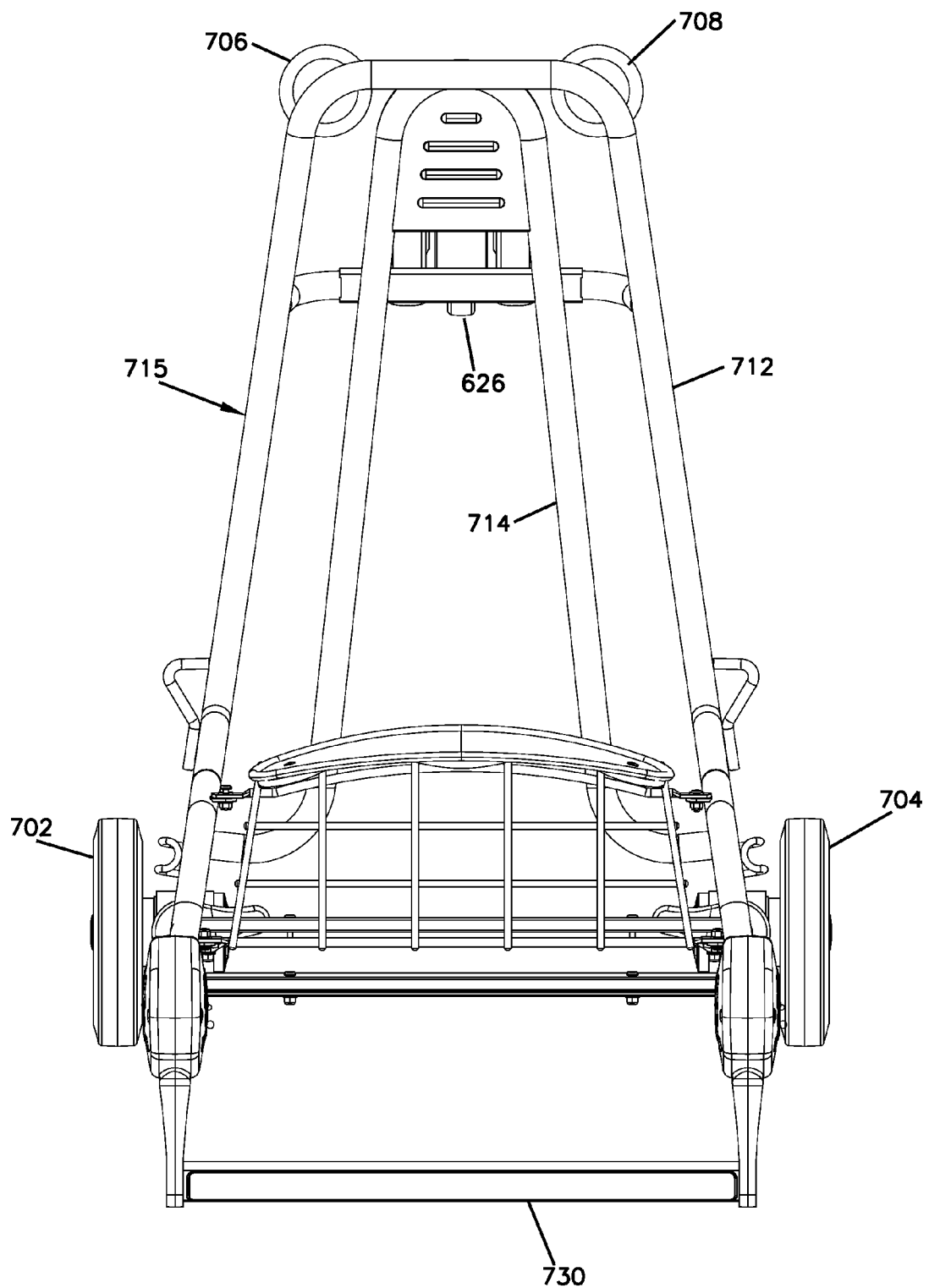
FIG. 51 is a top, plan view of the cart of FIG. 48.

In accordance with some aspects of the disclosure, the example baggage cart 700 can include a single caster wheel arrangement 600 positioned at a central location at the front end of the cart 700. In the example shown, the base 604 of the caster wheel arrangement 600 is coupled to the support members 714 (FIG. 49). Bumpers 706, 708 are provided on either side of the frame 710 at the front of the cart 700 to protect the caster wheel arrangement 600. In accordance with other aspects, the example cart 700 can include multiple caster wheel arrangements. For example, in one implementation, the cart 700 includes two spaced caster wheel arrangements 600 at the front end of the frame 710. In still other example implementations, one or more of any of the caster wheel arrangements 100, 200, 400, 500, 600 shown above may be used, alone or in combination, on the cart 700 or any other suitable transportation equipment.

The above specification, examples and data provide a complete description of the manufacture and use of the composition of the invention. Since many embodiments of the invention can be made without departing from the spirit and scope of the invention, the invention resides in the claims hereinafter appended.

The invention claimed is:

1. A caster wheel arrangement comprising:
a support frame;
at least a first primary wheel coupled to the support frame, the first primary wheel having a first radius;
a leading wheel coupled to the support frame at a position forward of the first primary wheel, the leading wheel having a second radius that is smaller than the first radius of the first primary wheel, and the leading wheel being raised relative to the first primary wheel while the caster wheel arrangement travels over flat ground; and
a trailing wheel coupled to the support frame at a position rearward of the first primary wheel, the trailing wheel having a third radius that is smaller than the first radius of the first primary wheel, and the trailing wheel being raised relative to the first primary wheel, wherein the third radius of the trailing wheel is smaller than the second radius of the leading wheel.

2. The caster wheel arrangement of claim 1, wherein the leading wheel is raised relative to the trailing wheel.

3. The caster wheel arrangement of claim 1, wherein a first rotation axis of the first primary wheel is raised relative to a second rotation axis of the leading wheel.

4. The caster wheel arrangement of claim 3, wherein the first rotation axis of the first primary wheel is raised relative to a third rotation axis of the trailing wheel.

5. The caster wheel arrangement of claim 1, further comprising a second primary wheel coupled to the support frame, wherein the first and second primary wheels are configured to rotate about a common rotation axis.

6. The caster wheel arrangement of claim 5, wherein the first and second primary wheels are cantilevered to the support frame.

7. The caster wheel arrangement of claim 5, wherein at least portions of the leading wheel and trailing wheel extend between the first and second primary wheels.

8. The caster wheel arrangement of claim 1, wherein the support frame includes a base; and a yoke rotatably mounted to the base, wherein the first primary wheel is coupled to the yoke, the leading wheel is coupled to the yoke at a first location on the yoke forward of the first primary wheel, and the trailing wheel is coupled to the yoke at a second location on the yoke rearward of the first primary wheel.

9. A cart for transporting an object, the cart comprising:
a cart frame configured to hold at least one object, the cart frame having a front and a rear;
first and second wheels rotatably coupled to the rear of the cart frame;
a steering handle coupled to the cart frame; and
a caster wheel arrangement coupled to the front of the cart frame, the caster wheel arrangement including at least a first caster wheel, a leading wheel positioned forward of the first caster wheel, and a trailing wheel positioned rearward of the first caster wheel, the leading and trailing wheels being raised relative to the first caster wheel, wherein a radius of the trailing wheel is smaller than a radius of the leading wheel.

10. The cart of claim 9, wherein the trailing wheel is positioned in a same plane as the leading wheel.

11. The cart of claim 10, wherein the first caster wheel arrangement also includes a second caster wheel positioned relative to the first caster wheel so as to rotate with the first caster wheel about a common rotation axis.

12. The cart of claim 11, wherein the first and second caster wheels are spaced from the plane in which the trailing wheel and leading wheel are positioned.

13. The cart of claim 12, wherein at least portions of the leading wheel and trailing wheel extend between the first and second caster wheels.

14. The cart of claim 11, wherein the second caster wheel arrangement also includes a fourth caster wheel positioned relative to the third caster wheel so as to rotate with the third caster wheel about another common rotation axis that is coaxial with the common rotation axis of the first caster wheel arrangement.

15. The cart of claim 9, wherein the leading wheel has a diameter that is smaller than a diameter of the first caster wheel.

16. The cart of claim 9, wherein the leading wheel is positioned so that an axis of rotation of the leading wheel is raised higher than an axis of rotation of the first caster wheel.

17. The cart of claim 9, wherein the caster wheel arrangement is located at a central portion of the front of the cart frame.

18. The cart of claim 9, further comprising a second caster wheel arrangement coupled to the front of the cart frame, the second caster wheel arrangement including at least a third caster wheel, a second leading wheel positioned forward of the third caster wheel, and a second trailing wheel positioned rearward of the third caster wheel, the second leading wheel and second trailing wheel being raised relative to the third caster wheel.

19. A caster wheel arrangement comprising:
a support frame;
at least a first primary wheel coupled to the support frame, the first primary wheel having a first radius and a first rotation axis;
a leading wheel coupled to the support frame at a position forward of the first primary wheel so that the leading wheel has a second rotation axis that is fixed relative to the first rotation axis, the leading wheel having a second radius that is smaller than the first radius of the first primary wheel, and the leading wheel being raised relative to the first primary wheel, wherein the first rotation axis of the first primary wheel is raised relative to a second rotation axis of the leading wheel; and
a trailing wheel coupled to the support frame at a position rearward of the first primary wheel, the trailing wheel having a third radius that is smaller than the first radius of the first primary wheel, the leading wheel being raised relative to the trailing wheel, and the trailing wheel being raised relative to the first primary wheel.

20. The caster wheel arrangement of claim 19, wherein the first rotation axis of the first primary wheel is raised relative to a third rotation axis of the trailing wheel.

21. The caster wheel arrangement of claim 19, further comprising a second primary wheel coupled to the support frame, wherein the first and second primary wheels are configured to rotate about a common rotation axis.

22. The caster wheel arrangement of claim 21, wherein the first and second primary wheels are cantilevered to the support frame.

23. The caster wheel arrangement of claim 21, wherein at least portions of the leading wheel and trailing wheel extend between the first and second primary wheels.

24. The caster wheel arrangement of claim 19, wherein the support frame includes a base; and a yoke rotatably mounted to the base, wherein the first primary wheel is coupled to the yoke, the leading wheel is coupled to the yoke at a first location on the yoke forward of the first primary wheel, and the trailing wheel is coupled to the yoke at a second location on the yoke rearward of the first primary wheel.

25. A caster wheel arrangement comprising:
a support frame including a base and a yoke rotatably mounted to the base;
at least a first primary wheel coupled to the yoke of the support frame, the first primary wheel having a first radius;
a leading wheel coupled to the yoke of the support frame at a position forward of the first primary wheel, the leading wheel having a second radius that is smaller than the first radius of the first primary wheel, and the leading wheel being raised relative to the first primary wheel; and
a trailing wheel coupled to the yoke of the support frame at a position rearward of the first primary wheel, the trailing wheel having a third radius that is smaller than the first radius of the first primary wheel, and the trailing wheel being raised relative to the first primary wheel, wherein the third radius of the trailing wheel is smaller than the second radius of the leading wheel.

26. A caster wheel arrangement comprising:
a support frame;
at least a first primary wheel coupled to the support frame, the first primary wheel having a first radius;
a second primary wheel coupled to the support frame, wherein the first and second primary wheels are configured to rotate about a common rotation axis;
a leading wheel coupled to the support frame at a position forward of the first primary wheel, the leading wheel having a second radius that is smaller than the first radius of the first primary wheel, and the leading wheel being raised relative to the first primary wheel; and
a trailing wheel coupled to the support frame at a position rearward of the first primary wheel, the trailing wheel having a third radius that is smaller than the first radius of the first primary wheel, and the trailing wheel being raised relative to the first primary wheel, wherein the third radius of the trailing wheel is smaller than the second radius of the leading wheel;
wherein at least portions of the leading wheel and trailing wheel extend between the first and second primary wheels.

27. A caster wheel arrangement comprising:
- a support frame including a base and a yoke rotatably mounted to the base;
- at least a first primary wheel coupled to the yoke of the support frame, the first primary wheel having a first radius and a first rotation axis;
- a leading wheel coupled to the yoke of the support frame at a position forward of the first primary wheel, the leading wheel having a second radius that is smaller than the first radius of the first primary wheel, and the leading wheel being raised relative to the first primary wheel, wherein the first rotation axis of the first primary wheel is raised relative to a second rotation axis of the leading wheel; and
- a trailing wheel coupled to the yoke of the support frame at a position rearward of the first primary wheel, the trailing wheel having a third radius that is smaller than the first radius of the first primary wheel, and the trailing wheel being raised relative to the first primary wheel.

28. A caster wheel arrangement comprising:
- a support frame;
- at least a first primary wheel coupled to the support frame, the first primary wheel having a first radius and a first rotation axis;
- a second primary wheel coupled to the support frame, the first and second primary wheels being configured to rotate about a common rotation axis;
- a leading wheel coupled to the support frame at a position forward of the first primary wheel, the leading wheel having a second radius that is smaller than the first radius of the first primary wheel, and the leading wheel being raised relative to the first primary wheel, wherein the first rotation axis of the first primary wheel is raised relative to a second rotation axis of the leading wheel; and
- a trailing wheel coupled to the support frame at a position rearward of the first primary wheel, the trailing wheel having a third radius that is smaller than the first radius of the first primary wheel, and the trailing wheel being raised relative to the first primary wheel;
- wherein at least portions of the leading wheel and trailing wheel extend between the first and second primary wheels.

29. A caster wheel arrangement comprising:
- a support frame;
- at least a first primary wheel coupled to the support frame, the first primary wheel having a first radius and a first rotation axis;
- a second primary wheel coupled to the support frame, wherein the first and second primary wheels are configured to rotate about a common rotation axis.
- a leading wheel coupled to the support frame at a position forward of the first primary wheel so that the leading wheel has a second rotation axis that is fixed relative to the first rotation axis, the leading wheel having a second radius that is smaller than the first radius of the first primary wheel, and the leading wheel being raised relative to the first primary wheel, wherein the first rotation axis of the first primary wheel is raised relative to a second rotation axis of the leading wheel; and
- a trailing wheel coupled to the support frame at a position rearward of the first primary wheel, the trailing wheel having a third radius that is smaller than the first radius of the first primary wheel, and the trailing wheel being raised relative to the first primary wheel, wherein at least portions of the leading wheel and trailing wheel extend between the first and second primary wheels.

30. A caster wheel arrangement comprising:
- a support frame, wherein the support frame includes a base and a yoke rotatably mounted to the base;
- at least a first primary wheel coupled to the yoke of the support frame, the first primary wheel having a first radius and a first rotation axis;
- a leading wheel coupled to the yoke of the support frame at a first location forward of the first primary wheel so that the leading wheel has a second rotation axis that is fixed relative to the first rotation axis, the leading wheel having a second radius that is smaller than the first radius of the first primary wheel, and the leading wheel being raised relative to the first primary wheel, wherein the first rotation axis of the first primary wheel is raised relative to a second rotation axis of the leading wheel; and
- a trailing wheel coupled to the yoke of the support frame at a second location rearward of the first primary wheel, the trailing wheel having a third radius that is smaller than the first radius of the first primary wheel, and the trailing wheel being raised relative to the first primary wheel.

\* \* \* \* \*